United States Patent
Seal et al.

(10) Patent No.: US 12,455,930 B1
(45) Date of Patent: Oct. 28, 2025

(54) CRAWLING ELECTRONIC (WEB) DOCUMENTS

(71) Applicant: Dell Products L.P., Round Rock, TX (US)

(72) Inventors: Brennan Troy Robert Seal, Austin, TX (US); Chris Everett Peterson, Austin, TX (US); Nicholas Anthony Esposito, Round Rock, TX (US); Rachel Gabrielle Mazzini, Dallas, TX (US); Sandeep Bola Ratnakar, Bangalore (IN); Siddharth Sreekumar, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/647,208

(22) Filed: Apr. 26, 2024

(51) Int. Cl.
| | |
|---|---|
| G06F 16/951 | (2019.01) |
| G06F 16/9538 | (2019.01) |
| G06F 16/953 | (2019.01) |
| G06F 16/9532 | (2019.01) |
| G06F 40/205 | (2020.01) |

(52) U.S. Cl.
CPC ......... *G06F 16/951* (2019.01); *G06F 16/953* (2019.01); *G06F 16/9532* (2019.01); *G06F 16/9538* (2019.01); *G06F 40/205* (2020.01)

(58) Field of Classification Search
CPC .. G06F 16/951; G06F 16/953; G06F 16/9532; G06F 16/9538; G06F 16/2228; G06F 16/901; G06F 40/30; G06F 40/205; G06F 16/35; G06F 16/9577; G06F 40/186; G06F 40/14; G06F 16/957; G06F 2218/12
See application file for complete search history.

(56) References Cited

U.S. PATENT DOCUMENTS

| | | | | |
|---|---|---|---|---|
| 10,673,802 | B2 * | 6/2020 | Volach | H04L 51/52 |
| 10,789,282 | B1 * | 9/2020 | Bocaletti | G06F 16/355 |
| 11,392,663 | B2 * | 7/2022 | Levi | G06F 16/9577 |
| 12,306,816 | B1 * | 5/2025 | Sreekumar | G06F 16/2228 |
| 2020/0117709 | A1 * | 4/2020 | Galitsky | G06N 20/00 |
| 2021/0312474 | A1 * | 10/2021 | Yu | G06F 16/958 |
| 2022/0292143 | A1 * | 9/2022 | Mehta | G06F 16/953 |
| 2022/0292160 | A1 * | 9/2022 | Mehta | G06F 16/972 |
| 2024/0111942 | A1 * | 4/2024 | Prebble | G06F 40/106 |
| 2024/0419976 | A1 * | 12/2024 | Gross | G06N 3/045 |

* cited by examiner

*Primary Examiner* — Marcin R Filipczyk
(74) *Attorney, Agent, or Firm* — McDermott Will & Schulte LLP

(57) ABSTRACT

Crawling electronic documents, including: for each electronic document of a plurality of electronic documents: obtaining the electronic document including obtaining an entirety of the HyperText Markup Language (HTML) of the electronic document; analyzing the electronic document to identify a plurality of elements of the electronic document, each element of the plurality of elements including HTML tags, text associated with the HTML tags, and HTML attributes; creating a plurality of clusters of texts based on a similarity of the HTML tags, the text associated with the HTML tags, and the HTML attributes of each of the plurality of elements; labeling, for each cluster of the plurality of clusters, the cluster based on the text associated with the HTML tags of one element of the cluster; and updating, for each cluster of the plurality of clusters, an electronic document crawling model with data indicating the label of the cluster.

18 Claims, 27 Drawing Sheets

FIG. 11

CRAWLING ELECTRONIC (WEB) DOCUMENTS

BACKGROUND

Field of the Disclosure

The disclosure relates generally to crawling electronic documents.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes, thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

Innovative aspects of the subject matter described in this specification may be embodied in a method of crawling electronic documents, including: for each electronic document of a plurality of electronic documents: obtaining the electronic document including obtaining an entirety of the HyperText Markup Language (HTML) of the electronic document; analyzing the electronic document to identify a plurality of elements of the electronic document, each element of the plurality of elements including HTML tags, text associated with the HTML tags, and HTML attributes; creating a plurality of clusters of texts based on a similarity of the HTML tags, the text associated with the HTML tags, and the HTML attributes of each of the plurality of elements; labeling, for each cluster of the plurality of clusters, the cluster based on the text associated with the HTML tags of one element of the cluster; and updating, for each cluster of the plurality of clusters, an electronic document crawling model with data indicating the label of the cluster.

Other embodiments of these aspects include corresponding systems, apparatus, and computer programs, configured to perform the actions of the methods, encoded on computer storage devices.

These and other embodiments may each optionally include one or more of the following features. For instance, analyzing the electronic document further includes, for each element of the plurality of elements, identifying a start HTML tag and an end HTML tag to define the element. The text associated with the HTML tags is defined between the start HTML tag and the end HTML tag. The HTML attributes include class and identification (ID) associated with the element. Analyzing the electronic document, for each element of the plurality of elements, includes identifying JavaScript and jQuery of the element. Creating the plurality of clusters of texts further includes creating the clusters of texts based on a cosine similarity between the HTML tags, the text associated with the HTML tags, and the HTML attributes of each of the plurality of elements. Reducing the electronic document by i) removing portions of the electronic document related to headers, footers, navigation panes, and scripts that do not expose functionality of the electronic document and ii) maintaining the plurality of elements. The plurality of electronic documents are associated with product datasheets.

The details of one or more embodiments of the subject matter described in this specification are set forth in the accompanying drawings and the description below. Other potential features, aspects, and advantages of the subject matter will become apparent from the description, the drawings, and the claims.

BRIEF DESCRIPTION OF DRAWINGS

FIG. 11 illustrates a data table.

DESCRIPTION OF PARTICULAR EMBODIMENT(S)

Figure 1:
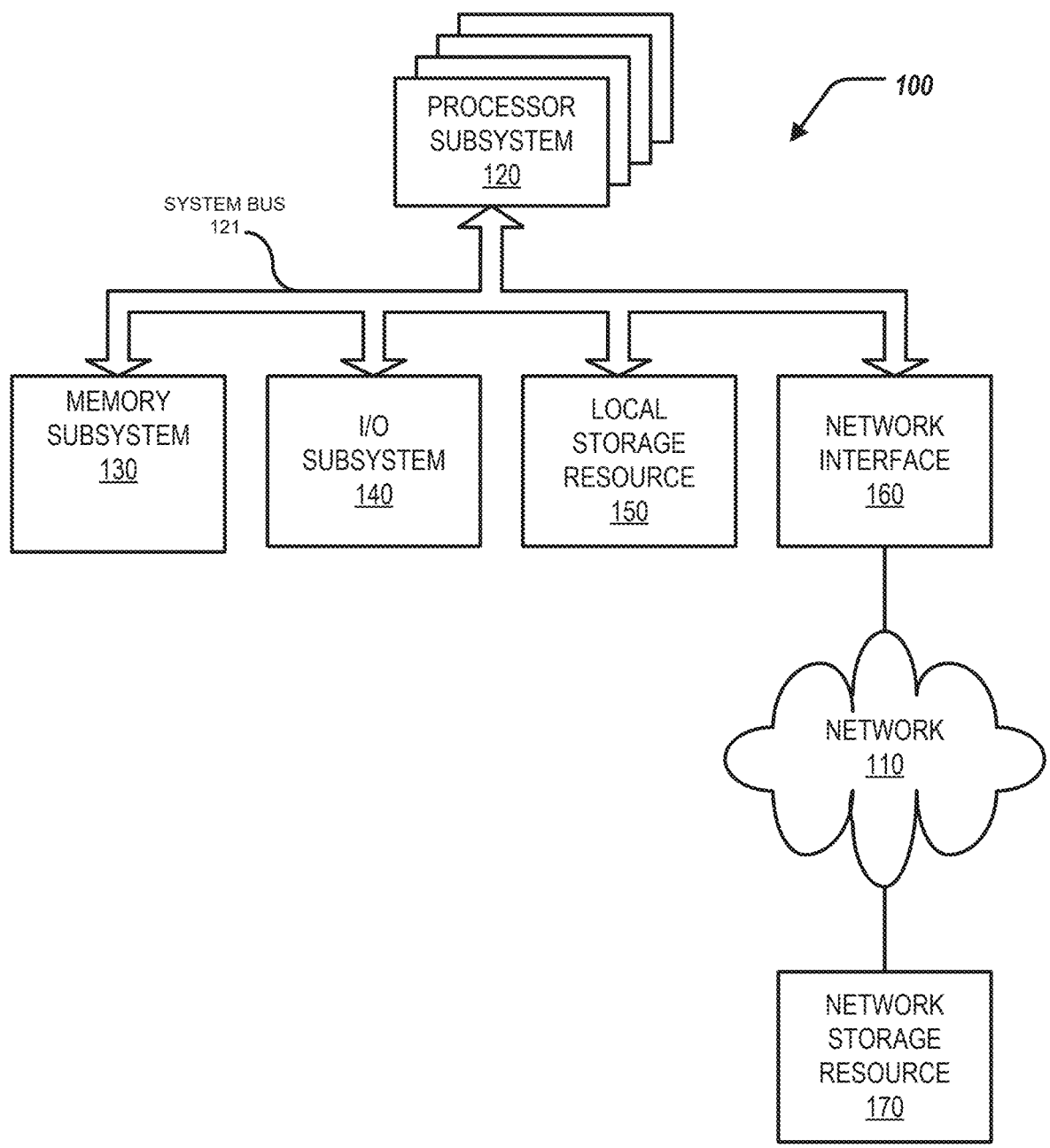
FIG. 1 is a block diagram of selected elements of an embodiment of an information handling system.

This disclosure discusses crawling electronic (web) documents. Specifically, this disclosure discusses a system and a method for crawling electronic documents, including, for each electronic document of a plurality of electronic documents: obtaining the electronic document including obtaining an entirety of the HyperText Markup Language (HTML) of the electronic document; analyzing the electronic document to identify a plurality of elements of the electronic document, each element of the plurality of elements including HTML tags, text associated with the HTML tags, and HTML attributes; creating a plurality of clusters of texts based on a similarity of the HTML tags, the text associated with the HTML tags, and the HTML attributes of each of the plurality of elements; labeling, for each cluster of the plurality of clusters, the cluster based on the text associated with the HTML tags of one element of the cluster; and updating, for each cluster of the plurality of clusters, an electronic document crawling model with data indicating the label of the cluster.

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such as wires, optical fibers, microwaves, radio waves, and other electromagnetic and/or optical carriers; and/or any combination of the foregoing.

Particular embodiments are best understood by reference to FIGS. 1-26 wherein like numbers are used to indicate like and corresponding parts.

Turning now to the drawings, FIG. 1 illustrates a block diagram depicting selected elements of an information handling system 100 in accordance with some embodiments of the present disclosure. In various embodiments, information handling system 100 may represent different types of portable information handling systems, such as, display devices, head mounted displays, head mount display systems, smart phones, tablet computers, notebook computers, media players, digital cameras, 2-in-1 tablet-laptop combination computers, and wireless organizers, or other types of portable information handling systems. In one or more embodiments, information handling system 100 may also represent other types of information handling systems, including desktop computers, server systems, controllers, and microcontroller units, among other types of information handling systems. Components of information handling system 100 may include, but are not limited to, a processor subsystem 120, which may comprise one or more processors, and system bus 121 that communicatively couples various system components to processor subsystem 120 including, for example, a memory subsystem 130, an I/O subsystem 140, a local storage resource 150, and a network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

As depicted in FIG. 1, processor subsystem 120 may comprise a system, device, or apparatus operable to interpret and/or execute program instructions and/or process data, and may include one or more processing resources such as a central processing unit (CPU), microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process storage devices locally (e.g., in memory subsystem 130 and/or another component of information handling system). In the same or alternative embodiments, processor subsystem 120 may interpret and/or execute program instructions and/or process storage devices remotely (e.g., in network storage resource 170).

Also in FIG. 1, memory subsystem 130 may comprise a system, device, or apparatus operable to retain and/or retrieve program instructions and/or data for a period of time (e.g., computer-readable media). Memory subsystem 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 100, is powered down.

In information handling system 100, I/O subsystem 140 may comprise a system, device, or apparatus generally operable to receive and/or transmit data to/from/within information handling system 100. I/O subsystem 140 may represent, for example, a variety of communication interfaces, graphics interfaces, video interfaces, user input interfaces, and/or peripheral interfaces. In various embodiments, I/O subsystem 140 may be used to support various peripheral devices, such as a touch panel, a display adapter, a keyboard, an accelerometer, a touch pad, a gyroscope, an IR sensor, a microphone, a sensor, a camera, or another type of peripheral device.

Local storage resource 150 may comprise computer-readable media (e.g., hard disk drive, floppy disk drive, CD-ROM, and/or other types of rotating storage media, flash memory, EEPROM, and/or another type of solid state storage media) and may be generally operable to store instructions and/or data. Likewise, the network storage resource may comprise computer-readable media (e.g., hard disk drive, floppy disk drive, CD-ROM, and/or other types of rotating storage media, flash memory, EEPROM, and/or other types of solid state storage media) and may be generally operable to store instructions and/or data.

In FIG. 1, network interface 160 may be a suitable system, apparatus, or device operable to serve as an interface between information handling system 100 and a network 110. Network interface 160 may enable information handling system 100 to communicate over network 110 using a suitable transmission protocol and/or standard, including, but not limited to, transmission protocols and/or standards enumerated below with respect to the discussion of network 110. In some embodiments, network interface 160 may be communicatively coupled via network 110 to a network storage resource 170. Network 110 may be a public network or a private (e.g., corporate) network. The network may be implemented as, or may be a part of, a storage area network (SAN), a personal area network (PAN), a local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Network interface 160 may enable wired and/or wireless communications (e.g., NFC or Bluetooth) to and/or from information handling system 100.

In particular embodiments, network 110 may include one or more routers for routing data between client information handling systems 100 and server information handling systems 100. A device (e.g., a client information handling system 100 or a server information handling system 100) on network 110 may be addressed by a corresponding network address including, for example, an Internet protocol (IP) address, an Internet name, a Windows Internet name service (WINS) name, a domain name or other system name. In particular embodiments, network 110 may include one or more logical groupings of network devices such as, for example, one or more sites (e.g., customer sites) or subnets. As an example, a corporate network may include potentially thousands of offices or branches, each with its own subnet (or multiple subnets) having many devices. One or more client information handling systems 100 may communicate with one or more server information handling systems 100 via any suitable connection including, for example, a modem connection, a LAN connection including the Ethernet, or a broadband WAN connection including DSL, Cable, Ti, T3, Fiber Optics, Wi-Fi, or a mobile network connection including GSM, GPRS, 3G, or WiMax.

Network 110 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 110 and its various components may be implemented using hardware, software, or any combination thereof.

Figure 2:
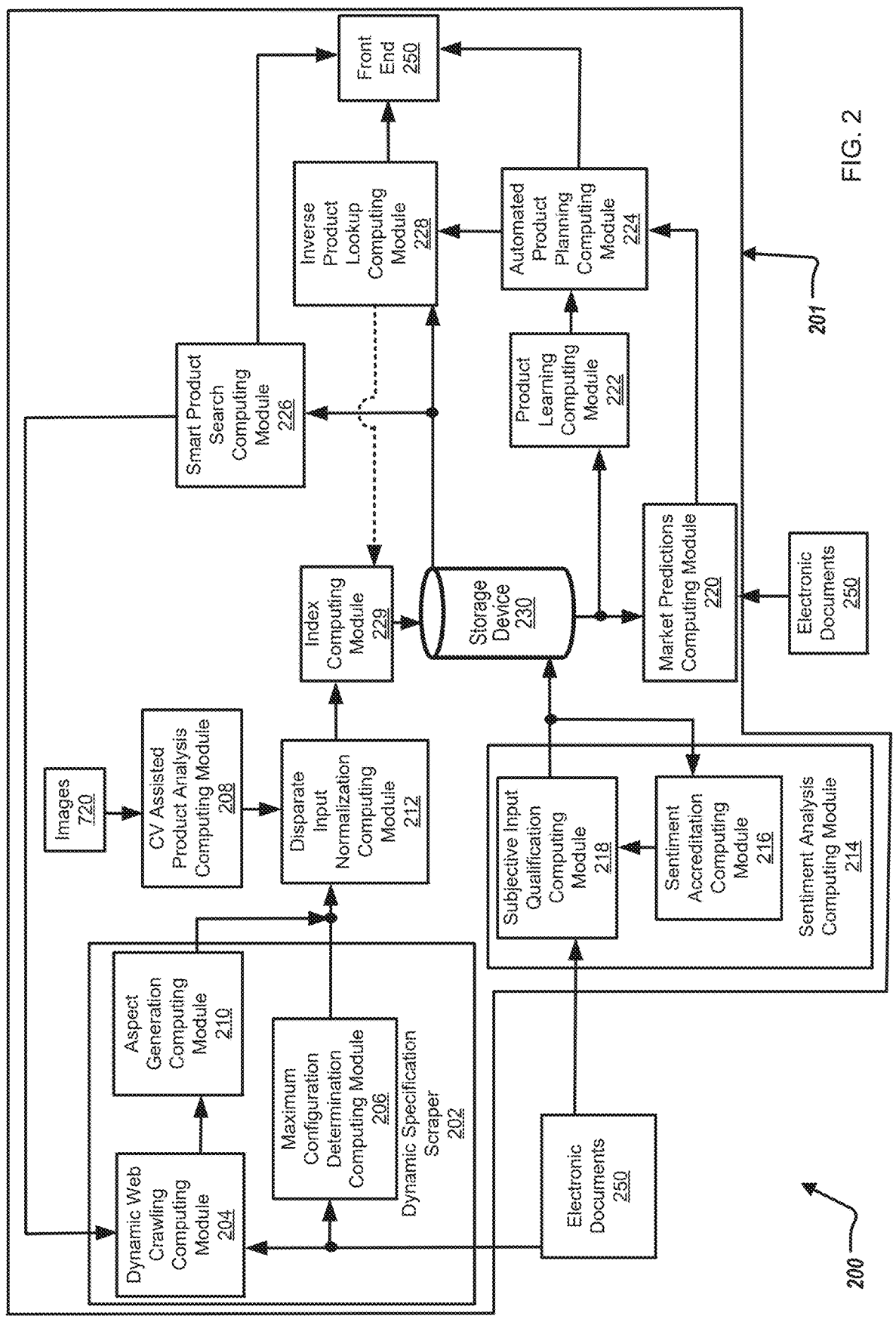
FIG. 2 illustrates a block diagram of an overview of the information handling system.

Turning to FIG. 2, FIG. 2 illustrates an environment 200 including an information handling system 201. The information handling system 201 can include a dynamic specification scraper 202 that includes a dynamic web crawling computing module 204 and a maximum configuration determination computing module 206, and an aspect generation computing module 210; a computer-vision (CV) assisted product analysis computing module 208; a disparate input normalization computing module 212; a sentiment analysis computing module 214 that includes a sentiment accreditation computing module 216 and a subjective input quantification computing module 218; a market predictions computing module 220; a product learning computing module 222; an automated product planning computing module 224; a smart product search computing module 226; and an inverse product lookup computing module 228. The information handling system 201 can further include an indexing computing module 229. The information handling system 201 can further include a storage device 230. The information handling system 201 can further include a front end 250. In some examples, the information handling system 201 is similar to, or includes, the information handling system 100 of FIG. 1.

The dynamic web crawler 204 can be in communication with the aspect generation computing module 210 and the smart product search computing module 226. The maximum configuration determination computing module 206 can be in communication with the disparate input normalization computing module 212. The CV assisted product analysis computing module 208 can be in communication with the disparate input normalization computing module 212. The aspect generation computing module 210 can be in communication with the dynamic web crawling computing module 204 and the disparate input normalization computing module 212. The disparate input normalization computing module 212 can be in communication with the maximum configuration determination computing module 206, the CV assisted product analysis computing module 208, the aspect generation computing module 210, and the indexing computing module 229. The sentiment accreditation computing module 216 can be in communication with the subjective input quantification computing module 218 and the storage device 230. The subjective input quantification computing module 218 can be in communication with the sentiment accreditation computing module 216 and the storage device 230. The market predictions computing module 220 can be in communication with the automated product planning computing module 224 and the storage device 230. The product learning computing module 222 can be in communication with the automated product planning computing module 224 and the storage device 230. The automated product planning computing module 224 can be in communication with the market predictions computing module 220, the product learning computing module 222, and the inverse product lookup computing module 228. The smart product search computing module 226 can be in communication with the dynamic web crawling computing module 204 and the storage device 230. The inverse product lookup computing module 228 can be in communication with the storage device 230, the automated product planning computing module 224, and the indexing computing module 229. The front end 250 can be in communication with the automated product planning computing module 224, the smart product search computing module 226, and the inverse product lookup computing module 228. The indexing computing module 229 can be in communication with the disparate input normalizing computing module 212, the storage device 230, and the inverse product lookup computing module 228.

The storage device 230 can be in communication with the subjective input quantification computing module 218, the market predictions computing module 220, the product learning computing module 222, the inverse product lookup computing module 228, the smart product lookup computing module 226, and the indexing computing module 229.

System Overview

At a high-level, the dynamic web crawling computing module 204 is a self-learning web crawler (electronic document or web document) that is able to dynamically seek and gather data independent of the type or presentation of such data. The maximum configuration determination computing module 206 performs an automated and standardized approach for determining an exhaustive set of configurations for a computing product (such as an information handling system, a server information handling system, a server computing product, or a server) to provide insights about trade-offs when a computing product is designed and manufactured. The CV assisted product analysis computing module 208 can provide a pool of computing product videos and pictures (visual resources), and analyze and deduce from such visual resources computing component locations of computing products. The aspect generation computing module 210 can utilize a unique ensemble of classification and natural language processing (NLP) models that work in tandem as an end-to-end solution of multiple data sources which can contain unstructured data. The disparate input normalization computing module 212 performs transformations on data sets of differing formats and levels of details to generate a common specification template against which computing products from differing vendors/manufacturers can be consistently compared. The sentiment accreditation computing module 216 can evaluate the authorial credibility of subjective source material (e.g., electronic documents) and weigh extracted sentiment accordingly. The subjective input quantification computing module 218 can transform subjective content into objective measure of market sentiment. The market prediction computing module 220 can map and extrapolate identified market trends based on sentiment analysis of various materials (electronic documents) including market data and product specifications. The product learning computing module 222 can perform self-learning product technical feasibility. The automated product planning computing module 224 can provide suggestions for competitor product predictions. The smart product search computing module 226 can automatically search for missing niches/computing products in the market. The reverse computing product lookup computing module 228 can identify computing products that match with search criteria. The indexing computing module 229 can provide indexing of relationships (or links) between any set of data stored at the storage device 230. The storage device 230 can store data (e.g., such as product profiles). The front end 250 can provide for display, provide data for an electronic document, or provide data for an application programming interface (API).

Dynamic Web Crawling Computing Module 204/"Crawling Electronic (Web) Documents"

Referring to FIG. 2, the dynamic web crawling computing module 204 is a self-learning web crawler (electronic document or web document) that is able to dynamically seek and gather data independent of the type or presentation of such data. The dynamic web crawling computing module 204 can employ a self-learning model as a guide to steer electronic (web) document crawling towards relevant information. The dynamic web crawling computing module 204 can utilize fuzzy word search to identify/locate/find relevant data fields from an electronic document (website). The dynamic web crawling computing module 204 can search for data field labels, or reference previously collected data to identify/locate/find fields by parsing the data itself. The dynamic web crawling computing module 204 can learn to identify/locate alternative forms of relevant content, including video, audio, and web logs (blogs). The dynamic web crawling computing module 204 targets a specific dataset that is tailored to specific computing products (e.g., of a particular market). The dynamic web crawling computing module 204 can generate crawler profiles for each source to effectively extract information from a given data structure. In short, the dynamic web crawling computing module 204 dynamically adapts to previously unseen data formats such that, for a given dataset, similar data values are extracted (regardless of presentation of such dataset and data values).

Figure 3:
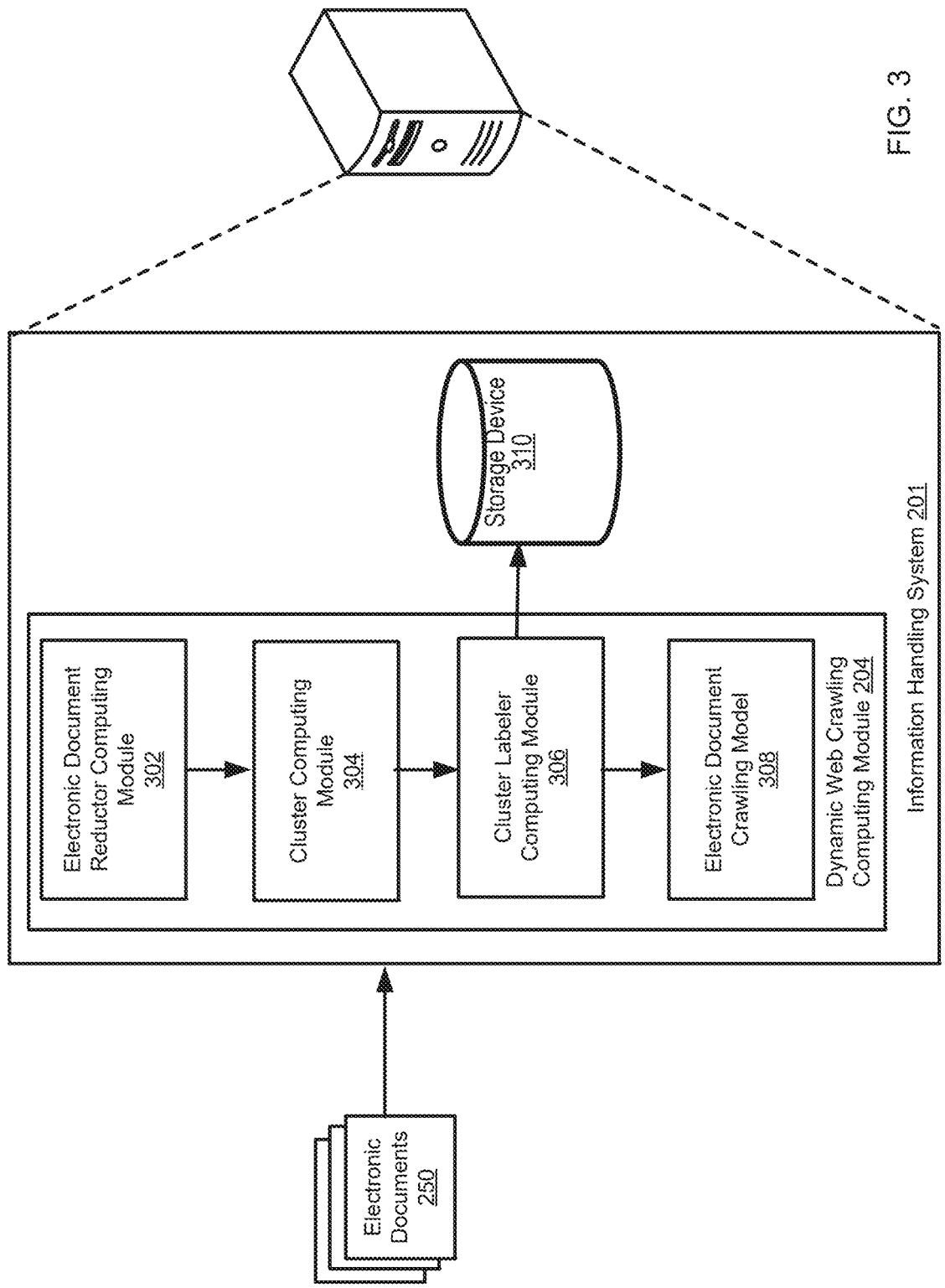
FIG. 3 illustrates a block diagram of the information handling system, and in particular, a dynamic web crawling computing module of the information handling system.

FIG. 3 illustrates the information handling system 201, and specifically, the dynamic web crawling computing module 204. Referring to FIGS. 2 and 3, the dynamic web crawling computing module 204 can include an electronic document reductor computing module 302, a cluster computing module 304, a cluster labeler computing module 306, and an electronic document crawling model 308. The electronic document reductor module 302 can be in communication with the cluster computing module 304. The cluster computing module 304 can be in communication with the electronic document reductor computing module 302 and the cluster labeler computing module 306. The cluster labeler computing module 306 can be in communication with the cluster computing module 304 and the electronic document crawling model 308. The electronic document crawling model 308 can be in communication with the cluster labeler computing module 306.

The information handling system 201 can further include a storage device 310. The storage device 310 can be in communication with the dynamic web crawling computing module 204. In some examples, the storage device 310 can be the same as the storage device 230.

The dynamic web crawling computing module 204 can obtain the electronic documents 250. For each electronic document, the dynamic web crawling computing module 204 obtains the electronic document 250, including obtaining an entirety of the HyperText Markup Language (HTML) of the electronic document 250. That is, the dynamic web crawling computing module 204 obtains the complete/entire HTML document that includes HTML, java scripts, and similar, of the electronic document 250. In some examples, the electronic documents 250 are associated with product datasheets of computing products.

The electronic document reductor computing module 302 can analyze the electronic documents 250. Specifically, for each electronic document 250, the electronic document reductor computing module 302 can analyze the electronic document 250 to identify a plurality of elements of the electronic document 250. For example, the electronic document reductor computing module 302 can identify such elements as HTML tags, text associated with the HTML tags, and HTML attributes.

In some examples, the electronic document reductor computing module 302 can analyze the electronic document 250 including, for each element of the electronic document 250, identifying a start HTML tag and an end HTML tag to define the element. Further, the text associated with the HTML tag is defined between the start HTML tag and the end HTML tag. In some examples, images can be defined between the start HTML tag and the end HTML tag. In some examples, HTML attributes are defined between the start HTML tag and the end HTML tag. For example, the HTML attributes can include class and identification (ID) associated with the element.

In some examples, the electronic document reductor computing module 302 can analyze the electronic document 250 including, for each element of the electronic document 250, identifying JavaScript and jQuery of the element.

In some examples, the electronic document reductor computing module 302 can, based on such analysis of the electronic document 250, reduce the electronic document 250. Specifically, the electronic document reductor computing module 302 can reduce the electronic document by i) removing portions of the electronic document 250 related to portions that do not expose functionality of the electronic document 250 and ii) maintaining the plurality of elements (elements such as HTML tags, text associated with the HTML tags, and HTML attributes). Specifically, the portions that do not expose functionality of the electronic document 250 can include headers, footers, navigation panes, and scripts that do not expose the functionality of the electronic document 250.

In some examples, the electronic document reductor computing module 302 can analyze the electronic document 250 including implementing count vectorization based on a training of the electronic document reductor computing module 302.

For example, the electronic document reductor computing module 302 can reduce the electronic document 250 to retain only those HTML tags, text, and JavaScripts that are relevant (e.g., a particular computing product)—shown below:

[HTML Tags+Text]
<div class="Title">Lenovo ThinkSystem ST250 V2<div>
<div class="hidden-processor">Intel Xeon Platinum 8450H<div>
<div class="processor">Intel Xeon Platinum 8454H 32C 270 W 2.1 GHZ Processor <div>
.
.
[Java Scripts, Jquery etc]
{
function get_product_images(a,b) {
Var a="href://lenovoassets.lenovo.com"
}
}

The cluster computing module 304 can create a plurality of clusters of text. Specifically, the cluster computing module 304 can create the plurality of clusters of text based on a similarity of the HTML tags, the text associated with the HTML tags, and/or the HTML attributes of each of the plurality of elements. The cluster computing module 304 can create the plurality of clusters of text based on a cosine similarity between the HTML tags, the text associated with the HTML tags, and the HTML attributes of each of the plurality of elements. Example clusters (from reduced data/electronic documents) are shown below:

Cluster 1
{Intel Xeon Platinum 8450H 28C 250 W 2.0 GHz Processor,
Intel Xeon Platinum 8454H 32C 270 W 2.1 GHz Processor,
Intel Xeon Platinum 8460H 40C 330 W 2.2 GHz Processor,
Intel Xeon Platinum 8468H 48C 330 W 2.1 GHz Processor,
Intel Xeon Platinum 8490H 60C 350 W 1.9 GHz Processor}

Cluster 2
{Think System 64 GB TruDDR5 4800 MHZ (2Rx4) RDIMM,
Think System 32 GB TruDDR5 4800 MHZ (1Rx4) RDIMM,
Think System 128 GB TruDDR5 4800 MHZ (4Rx4) 3DS RDIMM,
Think System 256 GB TruDDR5 4800 MHZ (8Rx4) 3DS RDIMM}

The cluster labeler computing module 306 labels, for each cluster of the plurality of clusters, the cluster based on the text associated with the HTML tags of one element of the cluster. The cluster labeler computing module 306 can identify a name of the cluster—e.g., Title, Computing Product Image, Processors, Memory, etc.

The electronic document crawling model 308 can be updated, for each cluster of the plurality of clusters, with data indicating the label of the cluster. The electronic document crawling module 308 can be trained on different electronic documents 250 iteratively based on newly acquired electronic documents 250.

The dynamic web crawling computing module 204 can provide output to the aspect extraction computing module 210, and in particular, the electronic document crawling model 308 and/or labeled clusters of the electronic documents 250.

The dynamic web crawling computing module 204 can store data including the clusters and cluster labels at the storage device 310.

In a use case example, the dynamic web crawling computing module 204 can provide competitive intelligence initiatives involving electronic document/web scraping (or other forms of datasheet parsing) to capture data regarding offerings from different manufacturers/vendors.

Figure 4:
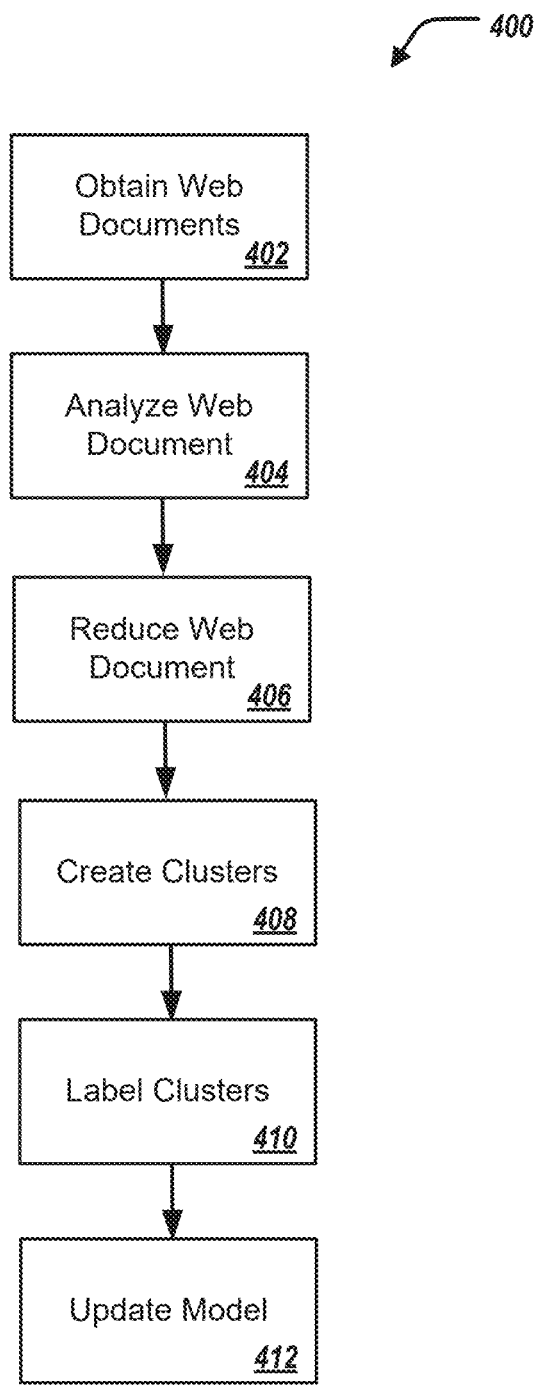
FIG. 4 illustrates a flowchart of a method for crawling electronic documents.

FIG. 4 illustrates a flowchart depicting selected elements of an embodiment of a method 400 for crawling electronic documents. The method 400 may be performed by the information handling system 100, the information handling system 201 and/or the dynamic web crawling computing module 204, and with reference to FIGS. 1-3. It is noted that certain operations described in method 400 may be optional or may be rearranged in different embodiments. The method 400 can be repeated for each electronic document 250.

The dynamic web crawling computing module 204 obtains the electronic document 250, at 402. Specifically, the dynamic web crawling computing module 204 obtains an entirety of the HyperText Markup Language (HTML) of the electronic document 250. The electronic document reductor computing module 302 can analyze the electronic document 250, at 404. Specifically, the dynamic web crawling computing module 204 analyzes the electronic document 250 to identify a plurality of elements of the electronic document, each element of the plurality of elements including HTML tags, text associated with the HTML tags, and HTML attributes. The electronic document reductor computing module 302 can reduce the electronic document 250, at 406. Specifically, the electronic document reductor computing module 302 can reduce the electronic document 250 by i) removing portions of the electronic document 250 related to headers, footers, navigation panes, and scripts that do not expose functionality of the electronic document 250 and ii) maintaining the plurality of elements. The cluster computing module 304 can create a plurality of clusters of texts, at 408. Specifically, the cluster computing module 304 can create a plurality of clusters of texts based on a similarity of the HTML tags, the text associated with the HTML tags, and the HTML attributes of each of the plurality of elements. The cluster labeler computing module 306 can label, for each cluster of the plurality of clusters, the cluster at 410. Specifically, the cluster labeler computing module 306 can label the cluster based on the text associated with the HTML tags of one element of the cluster. The electronic document crawling model 308 can be updated for each cluster of the plurality of clusters with data indicating the label of the cluster, at 412.

Maximum Configuration Determination Computing Module 206/"Determining Configuration of a Third-Party Information Handling System"

Referring to FIG. 2, the maximum configuration determination computing module 206 performs an automated and standardized approach for determining an exhaustive set of configurations for a computing product (such as an information handling system, a server information handling system, a server computing product, or a server) to provide insights about trade-offs when a computing product is designed and manufactured. The maximum configuration determination computing module 206 can map computing product configuration limitations from publicly available information of a given computing product (electronic document). The maximum configuration determination computing module 206 can implement a natural language processing (NLP) model to interpret notes and instructions pertaining to configuration options. The maximum configuration determination computing module 206 can determine configuration limitations of a computing product by attempting all possible permutations of computing components of the computing product and identifying which combinations are invalid/fail. Further, the maximum configuration determination computing module 206 can determine configuration limitations of the computing product by identifying issues/design failure of the computing product (e.g., a server with lower TDP CPU offerings can be indicative of thermal limitations). The maximum configuration determination computing module 206 performs an automated and complete mapping of configuration limitations of computing products based on electronic documents 250 such as product data sheets and/or ordering web pages; and derives implicit relationships and constraints among the collected data.

Figure 5:
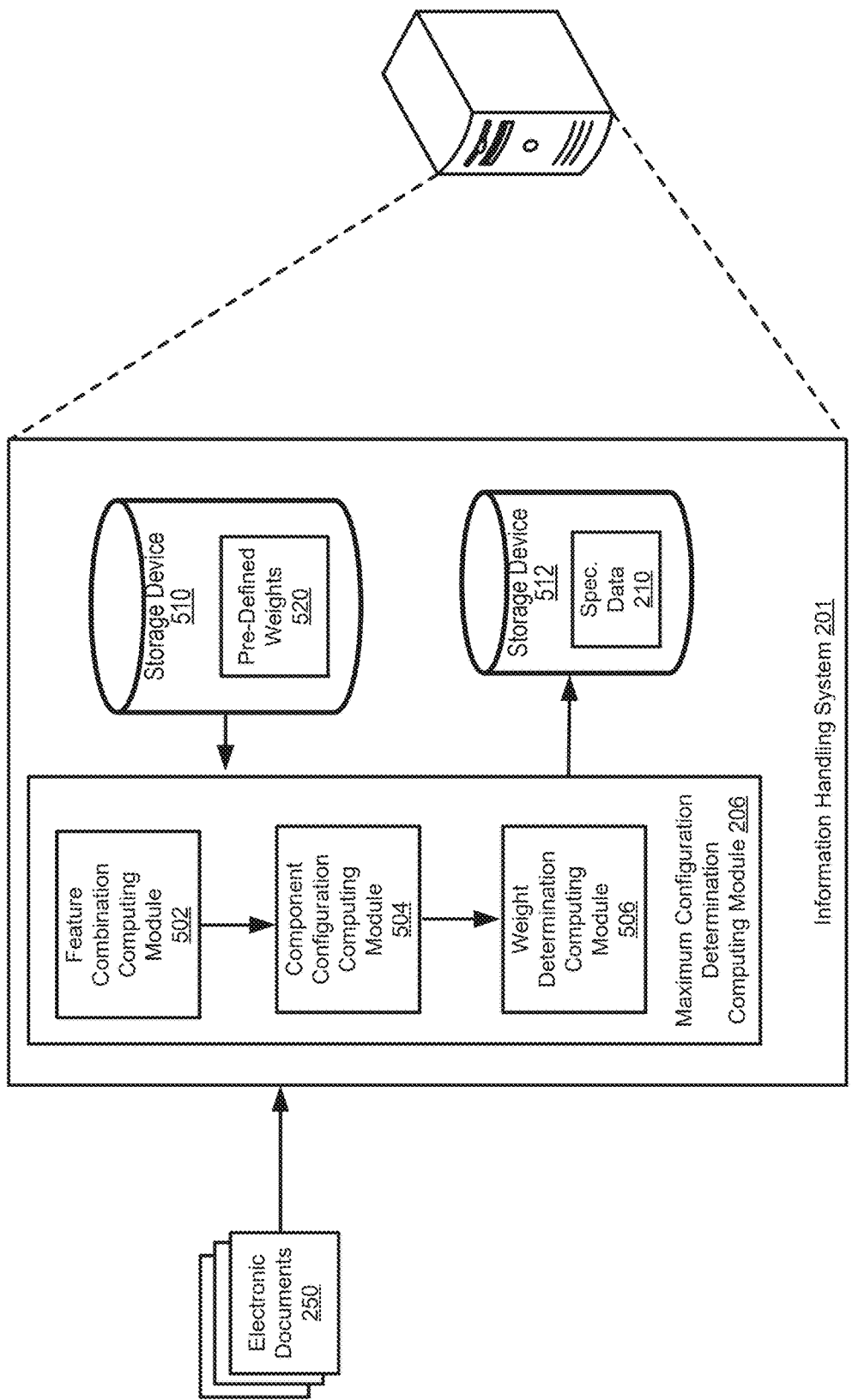
FIG. 5 illustrates a block diagram of the information handling system, and in particular, a maximum configuration determination computing module of the information handling system.

FIG. 5 illustrates the information handling system 201, and specifically, the maximum configuration determination computing module 206. Referring to FIGS. 2 and 5, the maximum configuration determination computing module 206 can include a feature combination computing module 502, a component configuration computing module 504, and a weight determination computing module 506. The feature combination computing module 502 can be in communication with the component configuration computing module 504. The component configuration computing module 504 can be in communication with the feature combination computing module 502 and the weight determination computing module 506. The weight determination computing module 506 can be in communication with the component configuration computing module 504.

The information handling system 201 can further include a storage device 510 and a storage device 512. The storage devices 510, 512 can be in communication with the maximum configuration determination computing module 206. In some examples, the storage devices 510, 512 can be the same as the storage device 230.

To that end, the maximum configuration determination computing module 206 can determine a configuration of a computing product, such as a third-party computing product, a server computing product, a third-party server computing product, an information handling system, or a third-party information handling system.

The maximum configuration determination computing module 206 can obtain the electronic documents 250. The maximum configuration determination computing module 206 can identify, from the electronic documents 250, a list of a plurality of computing components associated with computing products. For example, for each computing product of the electronic documents 250, the maximum configuration determination computing module 206 can identify a list of computing components associated with that computing product. In some examples, the list of the plurality of computing components can include, for each computing component, plurality features of the computing component.

For example, the computing components can include such commodities as memory, hard drives, processors, server chassis, and the like. For example, when the computing component is memory, the features of the computing component can include a memory size (8 GB, 16 GB, 32 GB) and a number of memory sticks. For example, when the computing component is a hard drive, the features of the computing component can include a type of the hard drive, a size of the hard drive, and RPM of the hard drive.

In some examples, for each computing product, the maximum configuration determination computing module 206 can further identify one or more physical constraints of the computing product.

To that end, the following is described with respect to a particular computing product.

For each computing component of the plurality of computing components, the feature combination computing module 502 retrieves, from the storage device 510 and for each feature of the computing component, a pre-defined weight associated with the feature. In some examples, the pre-defined weight for a computing component can be based on a size, a weight, and/or proximity to other computing components. The pre-defined weight for a computing component is defined based on observable characteristics of the computing product. Specifically, the storage device 510 stores a table/listing 520 indicated the pre-defined weights for each feature of each computing component. The pre-defined weights for each feature can differ from computing component to computing component. An example table/listing 520 is shown below (Table 1):

TABLE 1

| Computing Component | Feature | Pre-Defined Weight |
|---|---|---|
| C1 | F1 | 94 |
| C1 | F2 | 76 |
| C1 | F3 | 85 |
| C2 | F4 | 93 |
| C2 | F5 | 76 |
| ... | | |
| Ci | Fi | m |

For each computing component of the plurality of computing components, the feature combination computing module 502 determines, based on the pre-defined weight associated with each feature of the computing component, i) a maximum pre-defined weight of the pre-defined weights associated with respective features of the computing component and ii) a minimum pre-defined weight of the pre-defined weights associated with respective features for the computing component. In other words, for each computing component, the feature combination computing module 502 determines i) a feature having the maximum weight of all the features and associated weights for the computing component and ii) a feature having the minimum weight of all the features and associated weights for the computing component.

For each computing component of the plurality of computing components, the feature combination computing module 502 can determine, based on the maximum pre-defined weight and the minimum pre-defined weight, a plurality of combinations of the features for the computing component. Specifically, for each computing component of the plurality of computing components, the feature combination computing module 502 determines, for each combination of features for the computing component, a weight of the combination of the features. That is, the feature combination computing module 502 calculates, for each combination of features of the computing component, a summation of the pre-defined weights of the features of the combination. The feature combination computing module 502 determines, for each combination of features, that the weight of the combination of features is between the maximum pre-defined weight and the minimum pre-defined weight.

The component configuration computing module 504 can create a plurality of configurations of the computing components based on each of the combinations of features of each of the computing components. That is, the component configuration computing module 504 creates all possible configurations of the computing components based on each of the combinations of features of each of the computing components.

The weight determination computing module 506, for each configuration of the plurality of configurations, determines a total weight of the configuration based on the pre-defined weights of the combination of features for each of the components of the configuration. In other words, the determination computing module 506 calculates, for each configuration of computing components and then for each combination of features of the computing components of the configuration, the summation of the pre-defined weights of the features of the combination of the configuration. To that end, the weight determination computing module 506 can identify the maximum configuration of the computing components for the computing product based on the maximum pre-defined weight of the features of the computing components. In other words, the weight determination computing module 506 identifies the configuration of computing components and the features of the computing components of the configuration that give the highest value of the pre-defined weights—the maximum configuration of the computing components. That is, the weight determination computing module 506 determines, based on the total weight of each of the configurations, a largest weight of the total weights of each configuration of all possible configurations.

For each configuration of the plurality of configurations, the weight determination computing module 506 can update, based on the total weight of the configuration, product specification data 522 associated with the computing product at the storage device 512.

In some examples, the maximum configuration determination computing module 206 can further identify one or more physical constraints of the computing product. The component configuration computing module 504 can create the plurality of configurations of the computing components based on i) each of the combinations of features of each of the components (as discussed above) and ii) the physical constraints of the computing product. The physical constraints can include placement of the computing components relative to one another. Specifically, the component configuration computing module 504 creates the plurality of configurations of the computing components by iteratively, for each configuration, creating the configuration based on the combination of features of each of the computing components; identifying the physical constraints associated with the computing components of the configuration, and updating the configuration based on the physical constraints associated with the computing components of the configuration. In some examples, the component configuration computing module 504 employs a machine learning (ML) model, such as a recurrent neural network (RNN), to create the plurality of configurations.

In a use case example, the maximum configuration determination computing module 206 can be implemented to automatically generate maximum configuration "profiles" of a computing product (such as a third-party server) which are mutually exclusive from each other (e.g., maximized storage, maximized GPU compute capability, maximized networking).

Figure 6:
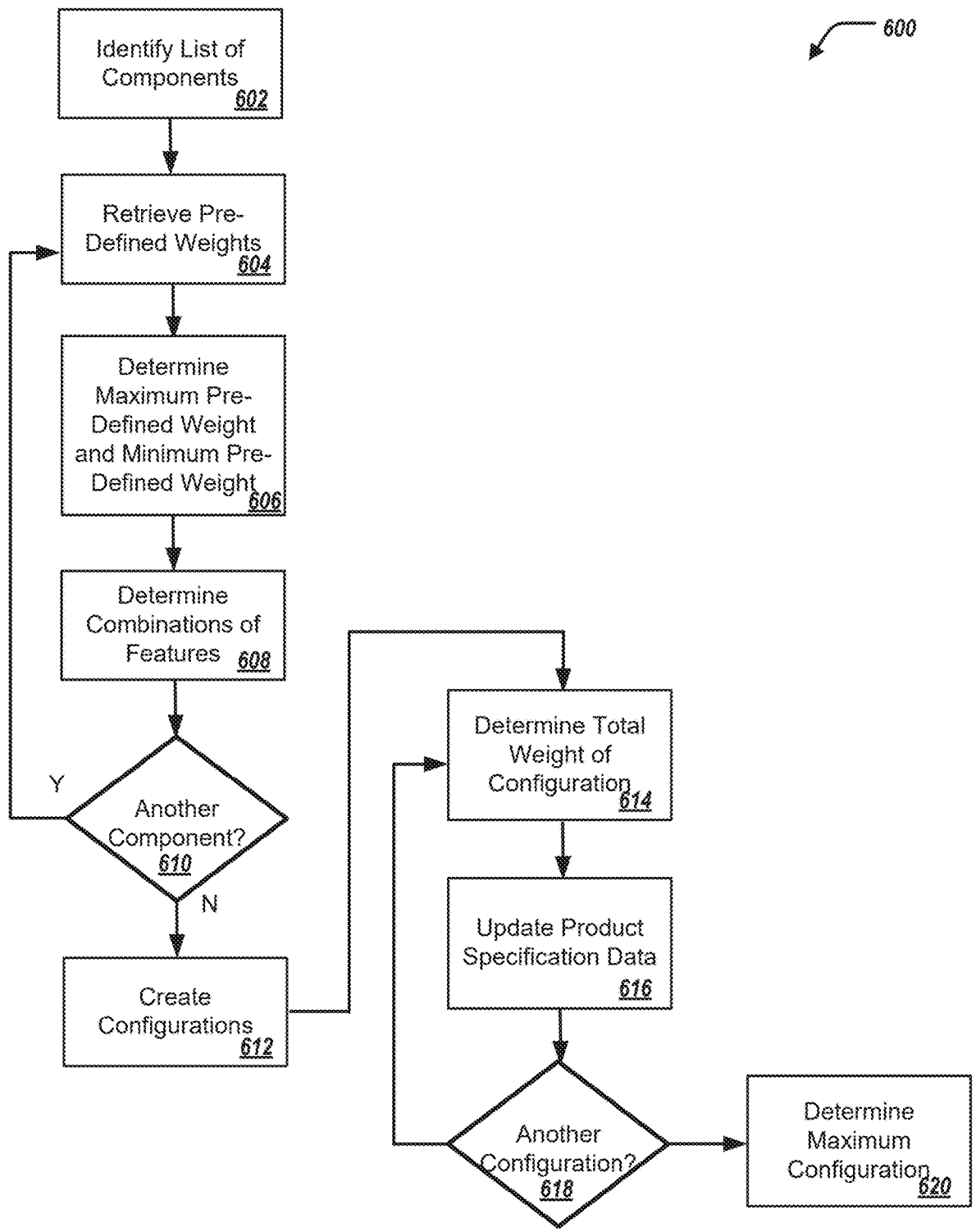
FIG. 6 illustrates a flowchart of a method for determining a configuration of a computing product.

FIG. 6 illustrates a flowchart depicting selected elements of an embodiment of a method 600 for determining a configuration of a computing product. The method 600 may be performed by the information handling system 100, the information handling system 202 and/or the maximum configuration determination computing module 206, and with reference to FIGS. 1-2 and 5. It is noted that certain operations described in method 600 may be optional or may be rearranged in different embodiments. The method 600 can be repeated for each electronic document 250 and/or each computing product.

The maximum configuration determination computing module 206 identifies a list of a plurality of computing components associated with a computing product, at 602. The list of the plurality of computing components includes, for each computing component, a plurality of features of the computing component. The maximum configuration determination computing module 206 retrieves, from the storage device 510 and for each feature of the computing component, a pre-defined weight associated with the feature, at 604. The feature combination computing module 502 determines, based on the pre-defined weight associated with each feature of the computing component, i) a maximum pre-defined weight of the pre-defined weights associated with respective features for the computing component and ii) a minimum pre-defined weight of the pre-defined weights associated with respective features for the computing component, at 606. The feature combination computing module 502 determines, based on the maximum pre-defined weight and the minimum pre-defined weight, a plurality of combinations of the features for the computing component, at 608. The feature combination computing module 502 determines whether there is another computing component to analyze, at 610. When the feature combination computing module 502 determines that there is another computing component to analyze, the method returns to step 604 and repeats steps 604-608 until all computing components have been analyzed. When the feature combination computing module 502 determines that there is not another computing component to analyze, the feature combination computing module 502 creates a plurality of configurations of the computing components based on each of the combinations of features of each of the computing components, at 612. The weight determination computing module 506 determines a total weight of the configuration based on the pre-defined weights of the combination of features for each of the computing components of the configuration, at 614. The weight determination computing module 506 updates, based on the total weight for the configuration, product specification data 210 associated with the computing product, at 616. The weight determination computing module 506 determines whether there is another configuration to analyze, at 618. When the weight determination computing module 506 determines that there is another configuration to analyze, the method returns to step 614 and repeats steps 614-616 until all configurations have been analyzed. When the weight determination computing module 506 determines that there is not another configuration to analyze, the weight determination computing module 506 determines the largest weight of the total weights of each configuration of all possible configurations as the maximum configuration of the computing product, at 620.

CV Assisted Product Analysis Computing Module 208/ "Analyzing Computing Product Layouts"

Referring to FIG. 2, the CV assisted product analysis computing module 208 can identify a pool of computing product videos and pictures (visual resources), and analyze and deduce from such visual resources computing component locations of computing products. The CV assisted product analysis computing module 208 (or model 208) can be trained on images of the internal components cross-validated against specifications (and other insights) gathered by a web crawler. The CV assisted product analysis computing module 208 may then be used to gather more insights about a particular system (e.g., component layout, airflow rating, component quality, etc.). This gathered data can be applied to correlate insights of the internal components. Computer Vision is used as a point of entry for physical data (that may not be captured in any online collateral) along with previously collected data to deduce new insights (e.g., fan location and fan specifications to determine airflow).

Figure 7:
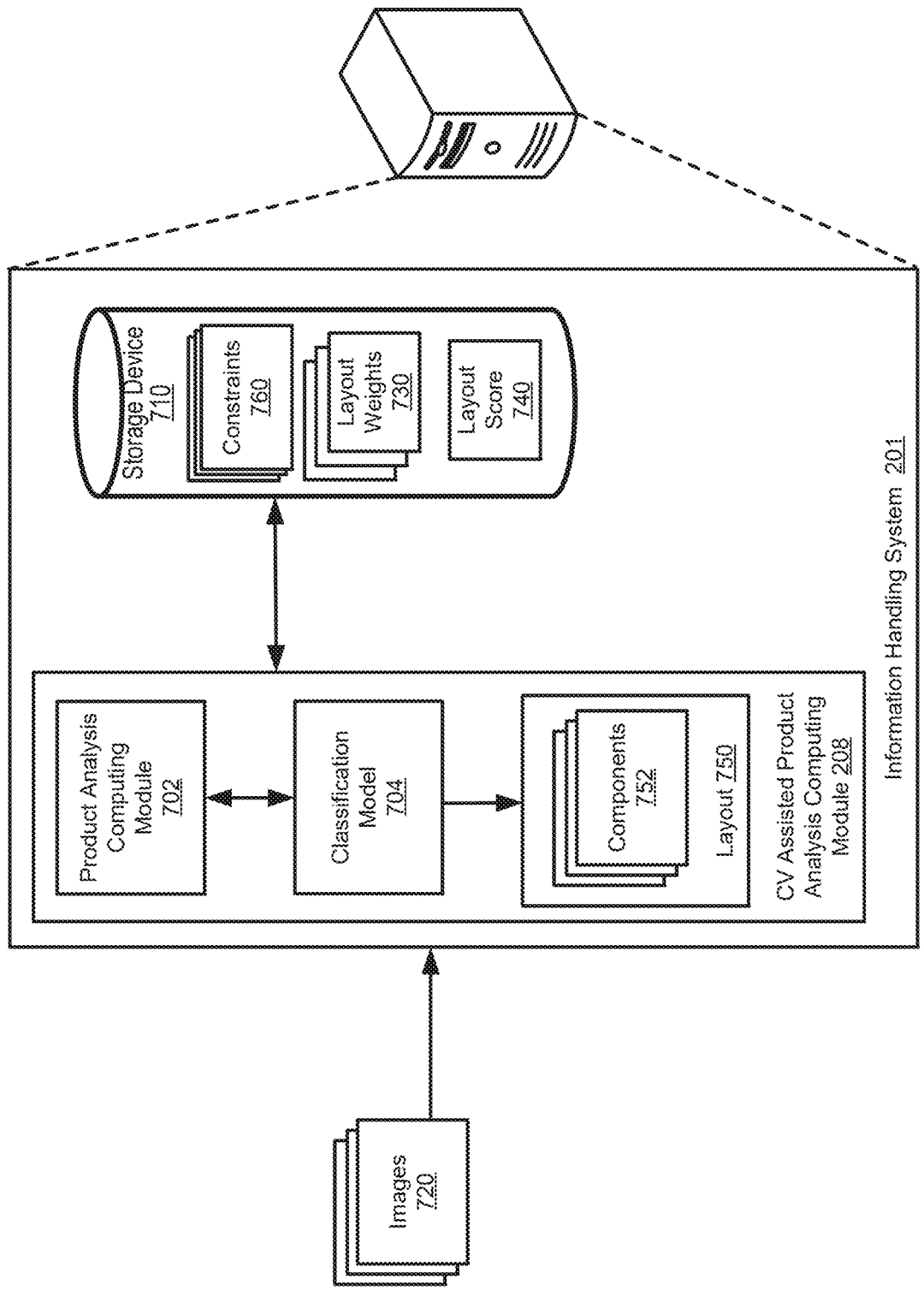
FIG. 7 illustrates a block diagram of the information handling system, and in particular, a computer-vision (CV) assisted product analysis computing module of the information handling system.

FIG. 7 illustrates the information handling system 201, and specifically, the CV assisted product analysis computing module 208. Referring to FIGS. 2 and 7, the CV assisted product analysis computing module 208 can include a product analysis computing module 702 and a classification model 704. The product analysis computing module 702 can be in communication with the classification model 704.

The information handling system 201 can further include a storage device 710. The storage devices 710 can be in communication with the product analysis computing module 702. In some examples, the storage device 710 can be the same as the storage device 230.

To that end, the product analysis computing module 702 can analyze images to provide insights about a computing product, such as a third-party computing product, a server computing product, a third-party server computing product, an information handling system, or a third-party information handling system, described further herein.

Figure 8A:
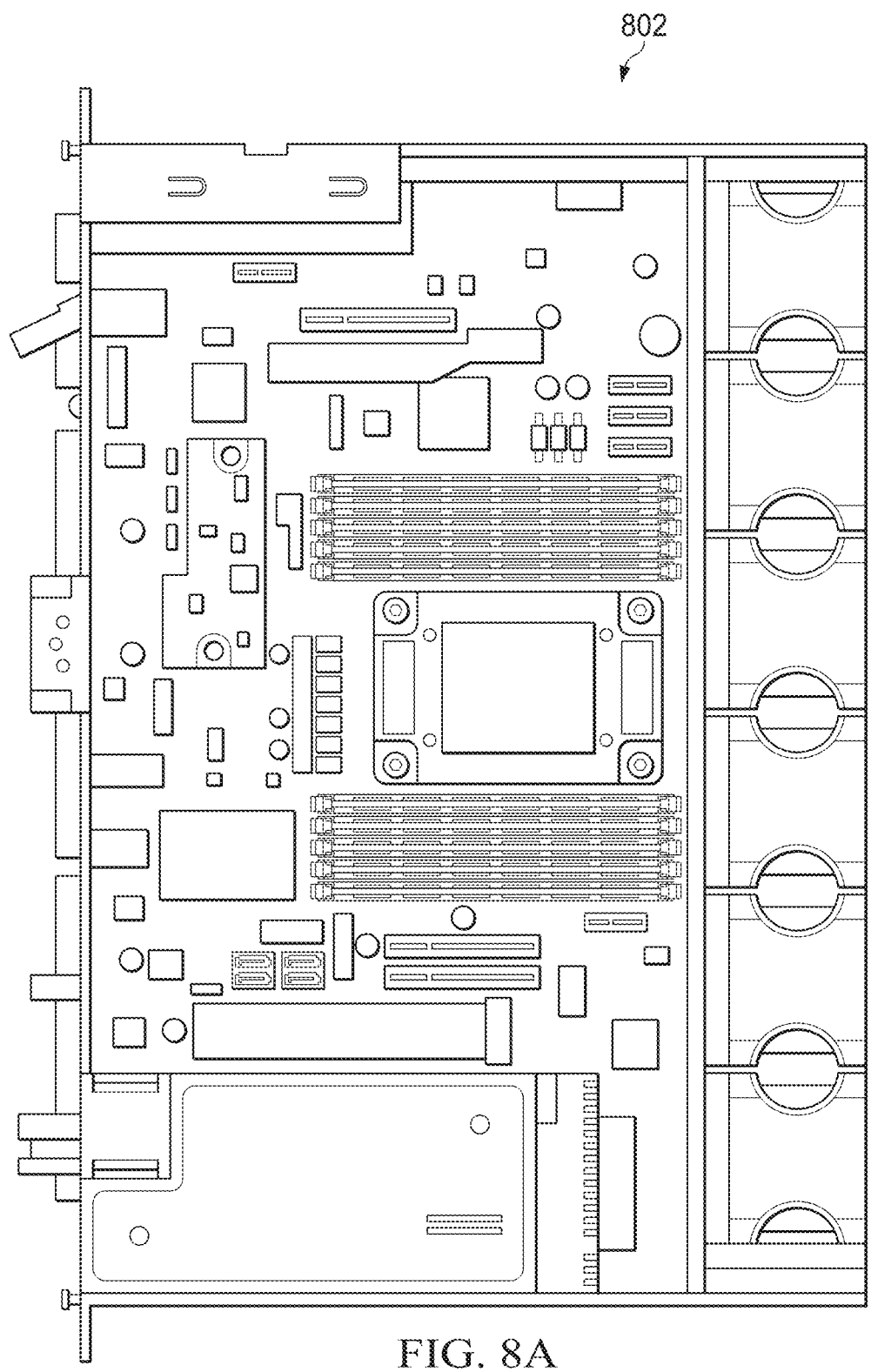
FIG. 8A illustrates an image of a computing product.

The product analysis computing module 702 can receive a plurality of images 720 of a particular layout 750 of the computing product. For example, the product analysis computing module 702 can receive the images 720 from electronic documents received over the Internet. For example, the product analysis computing module 702 can obtain the images from a maintained database of images (e.g., stored at the storage device 710). The images 720 can include still images or videos. FIG. 8A illustrates an example image 720 of a particular computing product 802.

The product analysis computing module 702 segments, using the classification model 704, the images 720 to identify computing components 752 of the layout 750 of the computing product. The classification model 704 can be previously trained on training images/data set. In some examples, the classification model 704 is a user supervised model (such as Mask region-based convolutional neural network (Mask R-CNN with annotations for single class and multi class for bounding box and polygon)) that is trained on training images and training annotations.

For example, the product analysis computing module 702 can receive a training set of images. The training set of images can be that of additional layouts of additional computing products. The product analysis computing module 702 can train the classification model based on the training set of images, including generating rules for segmenting the training set of images to identify computing components of each of the layouts of each of the additional computing products.

Figure 8B:
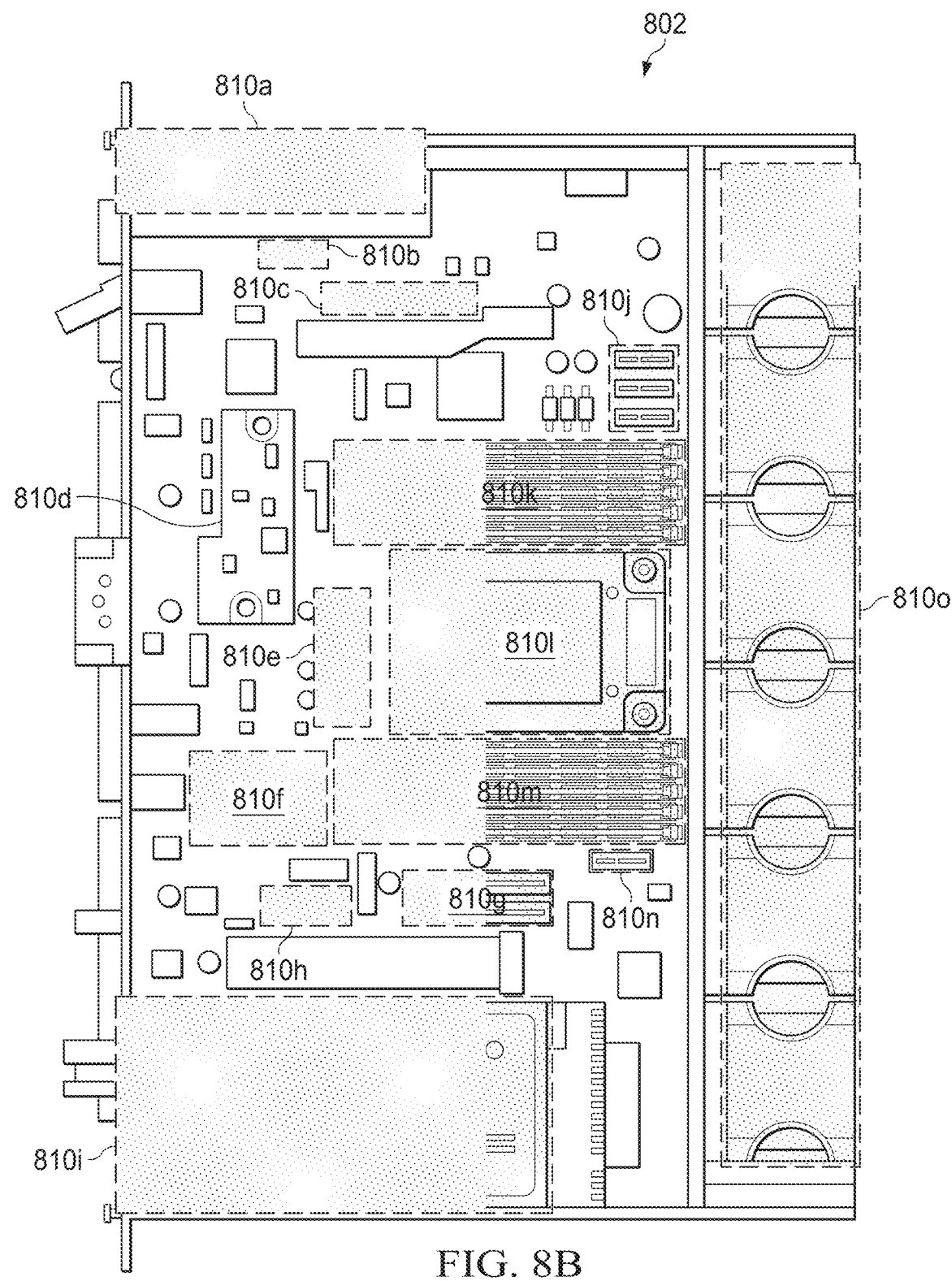
FIG. 8B illustrates an annotated image of a computing product.

Referring to FIGS. 7 and 8A, to that end, the product analysis computing module 702 can segment the image 720 to identify the computing components 752 of the computing product 802. For example, the product analysis computing module 702 can identify the computing components 810a, 810b, . . . , 810o (collectively referred to as computing components 810), as shown in FIG. 8B. That is, the product analysis computing module 702 can identify boundaries associated with each of the computing components 810.

The product analysis computing module 702 can store the annotations of the image 720 (indicating the boundaries of the computing components 810) separate from storage of the image 720 (e.g., at the storage device 710). The annotations can indicate a location of each of the computing components 752, a boundary of each of the computing components 752, and a name or identification of each of the computing components 752.

The product analysis computing module 702 can analyze the particular layout of the computing product, including, for each computing component 752 of the particular layout 750, approximating a physical size of the computing component 752. Specifically, based on the identification of the computing components of the computing product of the images 720, the product analysis computing module 702 approximates a physical size of the computing component 752 (e.g., a height, length, and width of each of the computing components).

The product analysis computing module 702 can analyze the particular layout of the computing product, including, for each computing component 752 of the particular layout 750, identifying a predetermined layout weight 730 of the computing component 752. In some examples, the predetermined layout weight for a computing component can be based on a size, a weight, and/or proximity to other computing components. The predetermined layout weight for a computing component is defined based on observable characteristics of the computing product. For example, the storage device 710 can store predetermined layout weights 730 for a plurality of computing components 752, including the computing components 752 identified for the particular layout 750 of the computing product. In some examples, the predetermined layout weight 730 of the computing components 752 is a thermal weight of the computing component 752. In some examples, the predetermined layout weight 730 of the computing components 752 is a signal integrity (SI) weight of the computing component.

The product analysis computing module 702 can analyze the particular layout 750 of the computing product, including, for each computing component 752 of the particular layout 750, determining a proximity of the computing component 752 to each other computing component 752.

Table 2 illustrates an example, for each computing component 752, an estimated size, predetermined layout weight, and proximity to other computing components 752.

TABLE 2

| Computing Component | Estimated Size | Pre-Determined Layout Weight | Proximity to other Computing Components |
|---|---|---|---|
| C1 | S1 | X1 | Null, 76, 85, 93, 76, . . . |
| C2 | S2 | X2 | 94, null, 85, 93, 76, . . . |
| C3 | S3 | X2 | 94, 76, null, 93, 76, . . . |
| C4 | S4 | X4 | 94, 76, 85, null, 76, . . . |
| C5 | S5 | X5 | 94, 76, 85, 93, null . . . |
| . . . | . . . | . . . | . . . |
| Ci | Si | Xi | 94, 76, 85, 93, . . . , null |

The product analysis computing module 702 can analyze the particular layout 750 of the computing product, including, for each computing component 752 of the particular layout 750, calculating a computing component score for the computing component 752 for the particular layout 750. The product analysis computing module 702 can calculate the computing component score for the computing component 752 for the particular layout 750 based on i) the physical size of the computing component 752, ii) the predetermined layout weight 730 of the computing component 752, and iii) the proximity of the computing component 752 to each other computing component 752.

The product analysis computing module 702 can determine a layout score 740 of the layout 750 for the computing component 752. Specifically, the product analysis computing module 702 can determine the layout score 740 of the layout 750 for the computing components 752 based on the computing component score of each of the computing components 752 of the layout 750.

The product analysis computing module 702 can update an index (e.g., stored at the storage device 710 or the storage device 230), to indicate the layout score of the layout 750.

The product analysis computing module 702 can determine the layout score 740 for any number of layouts 750 of the computing component 752, as described herein.

In some examples, the product analysis computing module 702 can calculate, for each computing component 752 of the layout 750, a thermal component score for the computing component 752 for the particular layout 752 based on i) the physical size of the computing component 752, ii) the thermal weight of the computing component 752, and iii) the proximity of the computing component 752 to each other computing component 752. The product analysis computing module 702 can determine a thermal layout score of the layout 750 for the computing component 752. Specifically, the product analysis computing module 702 can determine the thermal layout score of the layout 750 for the computing component 752 based on the thermal component score of each of the computing components 752 of the layout 750 and the computing component 752.

For example, a CPU and a GPU (computing components) can be assigned a high thermal weight. When the CPU and GPU are located proximate to one another (proximity) and one is downstream of the other (relative to airflow), the layout of the computing product would have a poor thermal layout score (due to tight grouping of hot computing components and using preheated air to cool a computing component).

In some examples, the product analysis computing module 702 can calculate, for each computing component 752 of the layout 750, an SI component score for the computing component 752 for the particular layout 750 based on i) the physical size of the computing component 752, ii) the SI weight of the computing component 752, and iii) the proximity of the computing component 752 to each other computing component 752. The product analysis computing module 702 can determine an SI layout score of the layout 750 for the computing component 752. Specifically, the product analysis computing module 702 can determine the SI layout score of the layout 750 for the computing component 752 based on the SI component score of each of the computing components 752 of the layout 750 and the computing component 752.

For example, DIMMs and PCIe slots (computing components) can be assigned high SI weights. When the DIMMs and PCIe slots are located proximate to one another (proximity), the layout of the computing product would have a poor SI score as there is potential for cross-talk among densely routed high-speed traces.

In some examples, the product analysis computing module 702 can identify, from the storage device 710, physical constraints 760 associated with the computing components 752 of the computing product. The physical constraints can include such constraints to a physical location of the computing components 752 with respect to one another for thermal considerations. For example, a physical constraint 760 can include a location of a fan on the computing product (e.g., placed near a side of the computing product). For example, a physical constraint 760 can include a location of a CPU attached to a side or corner of the computing product. For example, a physical constraint 760 can include a location of a PSU and/or a CPU with respect to fans.

The product analysis computing module 702 can iteratively permutate, based on the physical constraints 760 associated with the computing components 752 of the computing product, the layout 750 to define a plurality of permutated layouts of the computing product. The product analysis computing module 702, for each of the permutated layouts, analyzes the permutated layout, including, for each computing component 752, determining an updated proximity of the computing component 752 to each other computing component 752. The product analysis computing module 702, for each of the permutated layouts, calculates an updated component score for the permutated layout based on i) the physical size of the computing component 752, ii) the predetermined layout weight 730 of the computing component 752, and iii) the updated proximity of the computing component 752 to each other computing component 752. The product analysis computing module 702 can then, for each permutated layout, determine an updated layout score 740 of the permutated layout based on the updated component score of each of the computing components 752.

In some examples, the product analysis computing module 702 can determine, from the updated layout score of each of the permutated layouts, a greatest layout score among the layout scores of each of the permutated layouts. The product analysis computing module 702 can then generate the permutated layout associated with the greatest layout score of the computing product.

The product analysis computing module 702 can update an index (e.g., stored at the storage device 710 or the storage device 230), for each of the permutated layouts, indicating the updated layout score of the permutated layout.

Figure 9:
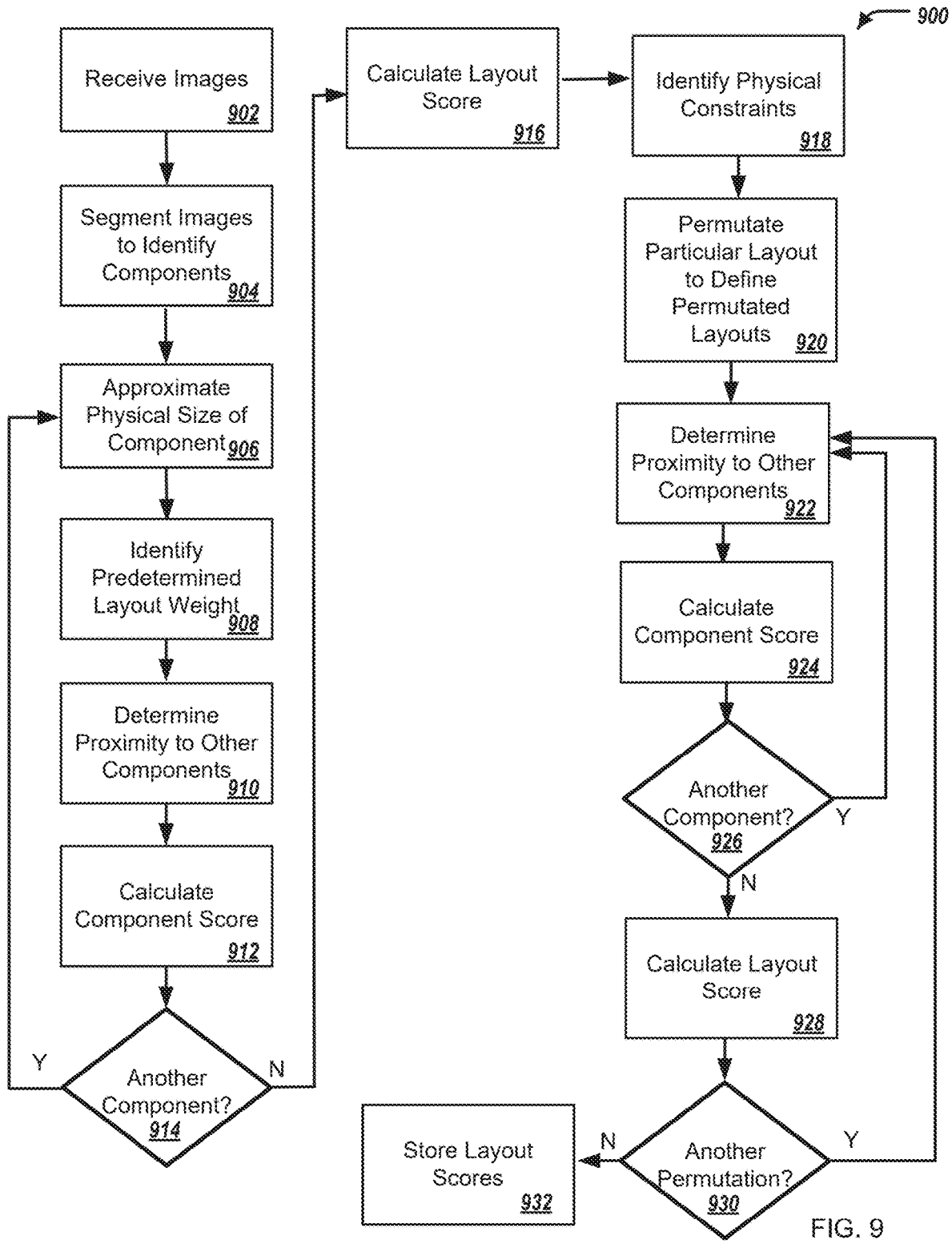
FIG. 9 illustrates a flowchart of a method for analyzing computing product layouts.

FIG. 9 illustrates a flowchart depicting selected elements of an embodiment of a method 900 for analyzing computing product layouts. The method 900 may be performed by the information handling system 100, the information handling system 201 and/or the Product analysis computing module 702, and with reference to FIGS. 1, 2, 7, 8A and 8B. It is noted that certain operations described in method 900 may be optional or may be rearranged in different embodiments. The method 900 can be repeated for each computing product.

The product analysis computing module 702 can receive the images 720 of the layout 750 of the computing product, at 902. The product analysis computing module 702 segments, using the classification model 704, the images 720 to identify the computing components 752 of the computing product, at 904. For each computing component 752, the product analysis computing module 702 approximates the physical size of the computing component 752, at 906. For a computing component 752, the product analysis computing module 702 identifies a predetermined layout weight of the computing component 752, at 908. For a computing component 752, the product analysis computing module 702 determines a proximity of the computing component 752 to each other computing component 752, at 910. For a computing component 752, the product analysis computing module 702 calculates a component score for the computing component 752 for the layout 750 based on i) the physical size of the computing component 752, ii) the predetermined layout weight of the computing component 752, and iii) the proximity of the computing component 752 to each other computing component 752, at 912.

The product analysis computing module 702 determines if there is another computing component 752 to analyze, at 914. If there are further computing components 752 of the layout 750 to analyze, the method returns to step 906. If there are no further computing components 752 of the layout 750 to analyze, the product analysis computing module 702 determines a layout score 740 of the layout 750 based on the computing component score of each of the computing components 752 of the layout 750, at 916.

The product analysis computing module 702 identifies physical constraints 760 of the computing components 752 of the computing product, at 918. The product analysis computing module 702 iteratively permutates the layout 750, based on the physical constraints 760 of the computing components 752 of the computing product, the layout 750 to define permutated layouts of the computing product, at 920. The product analysis computing module 702 determines, for a computing component 752 of a permutated layout, an updated proximity to other computing components 752, at 922. The product analysis computing module 702 calculates an updated component score for the computing component 752 for the permutated layout based on i) the physical size of the computing component 752, ii) the predetermined layout weight of the computing component 752, and iii) the updated proximity of the computing component 752 to each other computing component 752, at 924.

The product analysis computing module 702 determines if there is another computing component 752 to analyze of the permutated layout, at 926. If there are further computing components 752 of the permutated layout to analyze, the method returns to step 922. If there are no further computing components 752 of the permutated layout to analyze, the product analysis computing module 702 determines an updated layout score 740 of the permutated layout based on the computing component score of each of the computing components 752 of the permutated layout, at 928.

The product analysis computing module 702 determines if there is another layout permutation to analyze, at 930. If there are no further permutated layouts to analyze, the product analysis computing module 702 stores data indicating the layout scores 740 of the permutated layouts at the storage device, at 932. If there are further permutated layouts to analyze, the method returns to step 922.

Aspect Generation Computing Module 210/"Analyzing Data Specifications"

Referring to FIG. 2, the aspect generation computing module 210 can be trained on pre-attributed records using classification and multiple Name Entity Recognition (NER) and Question and Answer (QA) models for every type of computing product (HDD, Processor, Memory etc.). The aspect generation computing module 210 can be deployed as a stand-alone web application that can be used by multiple users to fetch attributes for any given data.

The aspect generation computing module 210 can implement the process of technical computing component identification and feature (or attribute or train) extraction as an accurate and sustainable solution involving a unique ensemble of classification and natural language processing (NLP) models. The aspect generation computing module 210 can employ a combination of machine learning models that work in tandem as an end-to-end solution on multiple data sources which contains unstructured data that stands out against task specific independent projects.

Figure 10:
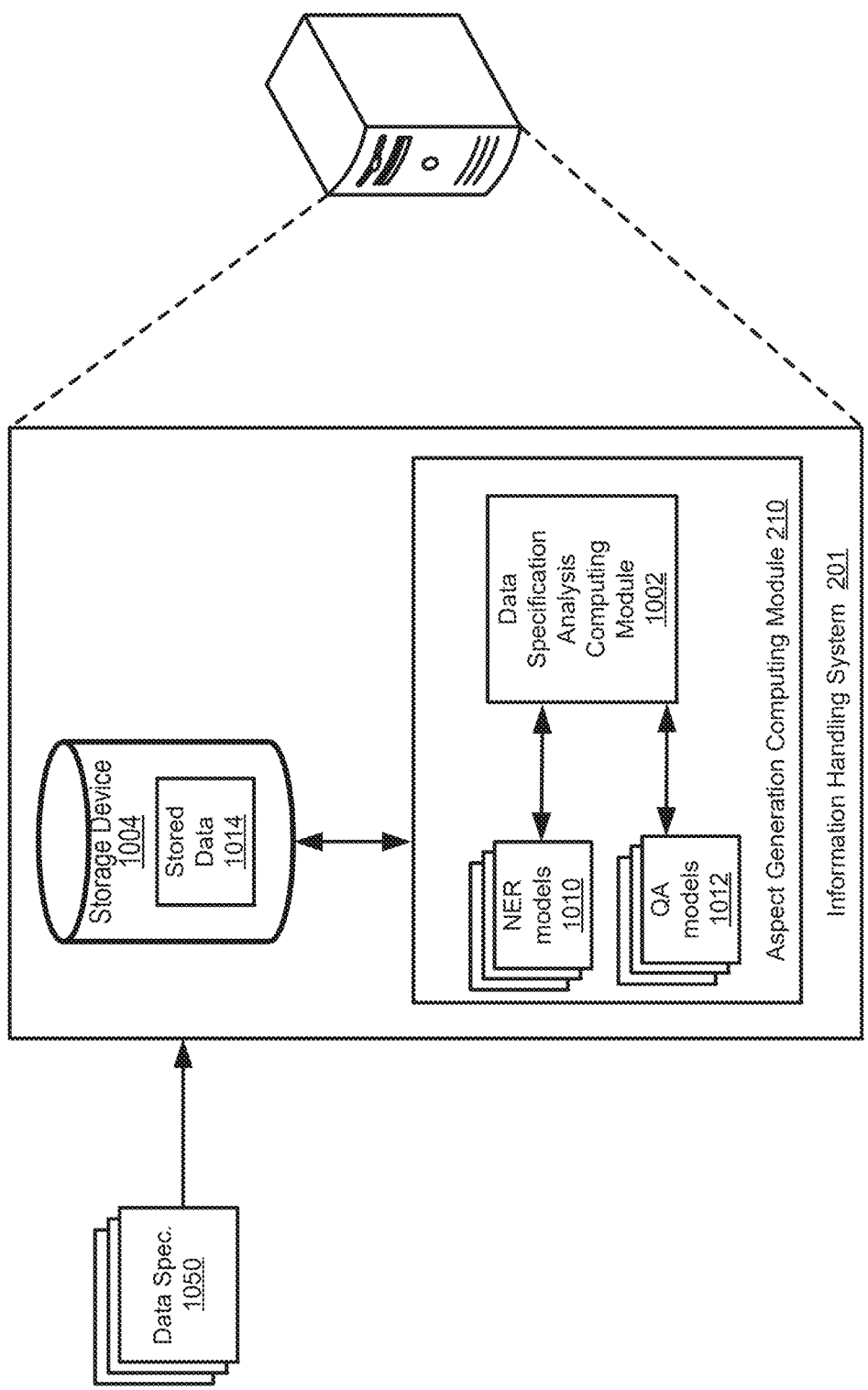
FIG. 10 illustrates a block diagram of the information handling system, and in particular, an aspect generation computing module of the information handling system.

FIG. 10 illustrates the information handling system 201, and specifically, the aspect generation computing module 210. Referring to FIGS. 2 and 10, the aspect generation computing module 210 can include a data specification analysis computing module 1002. The data specification analysis computing module 1002 can be in communication with the storage device 1004.

The information handling system 201 can further include a storage device 1004. The storage device 1004 can be the same as the storage device 230.

The aspect generation computing module 210 can be in communication with the dynamic web crawling computing module 204. In some examples, the aspect generation computing module 210 can receive data indicating the labeled clusters of the electronic documents 250 from the dynamic web crawling computing module 204.

The data specification analysis computing module 1002 can receive data specifications 1050. The data specifications 1050 can be associated with a plurality of differing computing components. In some examples, the data specifications 1050 are from the labeled clusters of the electronic documents 250 received from the dynamic web crawling computing module 204. That is, the received labeled clusters of the electronic documents 250 include the data specifications 1050. In some examples, the data specifications 1050 can be received from a plurality of differing sources. That is, the differing sources can be associated with differing electronic documents 250 received from differing third-party information handling systems. In some examples, each of the data specifications 1050 includes descriptive text and an identifier alphanumeric string (e.g., of computing components).

The data specification analysis computing module 1002 tokenizes the data specifications 1050. For example, the data specification analysis computing module 1002 utilizes a term frequency-inverse document frequency (TF-IDF) tokenizer. Further, the data specification analysis computing module 1002 can perform linear support vector classification (SVC) of the tokened data specifications to classify each of the computing components into a respective category of computing components. For example, the categories of the computing components can include such categories as memory, hard drives, processors, server chassis, and the like.

Furthermore, each category of computing product is associated with one or more attributes (or features). For example, when the category of the computing component is memory, the features of the category of the computing component can include a memory size (8 GB, 16 GB, 32 GB) and a number of memory sticks. For example, when the category of the computing component is a hard drive, the features of the category of the computing component can include a type of the hard drive, a size of the hard drive, and RPM of the hard drive.

The data specification analysis computing module 1002, after receiving the data specifications 1050, for each data specification 1050, annotates the descriptive text of the data specification 1050 to delineate the attributes (features) of the data specification 1050 and a textual position within the descriptive text of the attributes (features).

The data specification analysis computing module 1002, for each attribute associated with the data specifications 1050, identifies, from a plurality of models, one or more models associated with the attribute. Specifically, for each attribute associated with the data specifications, the data specification analysis computing module 1002 identifies a i) Named Entity Recognition (NER) model 1010 associated with the attribute and a ii) Question Answer (QA) model 1012 associated with the attribute. For example, for a particular computing component, the particular computing component can be associated with multiple attributes. The data specification analysis computing module 1002 identifies an NER model 1010 and a QA model 1012 for each of the multiple attributes of the particular computing component. For example, for the particular computing component, the particular computing component (e.g., an SSD) is associated with seven attributes. The data specification analysis computing module 1002 identifies seven NER models 1010 and seven QA models 1012, each pair of corresponding NER models 1010 and QA models 1012 associated with one of the seven attributes.

The QA model 1012 takes into account a text string of the attribute (context), and provides answers to posed questions according to the text string. That is, the QA model 1012 retrieves an answer to a question from given text, e.g., when searching for an answer in a document. To that end, the QA model 1012 can be tuned to the data set used by the data specification analysis computing module 1002 (the data specifications 1050 based on the labeled clusters of the electronic documents 250).

The data specification analysis computing module 1002 extracts, for each attribute associated with the data specifications and using identified models, attribute data for the attribute associated with the data specifications. Specifically, the data specification analysis computing module 1002 extracts, for each attribute associated with the data specifications and using the NER model 1010 and the QA model 1012 associated with the attribute, attribute data for the attribute associated with the data specifications. In some examples, the data specification analysis computing module 1002 extracts, for each attribute associated with the data specifications and using the NER model 1010 and the QA model 1012 in tandem associated with the attribute, attribute data for the attribute associated with the data specifications. That is, for each attribute, the associated NER model 1010 and the associated QA model 1012 work in tandem to extract the attribute data for the attribute. The NER model 1010 and the QA model 1012 "backfill" each other.

Figure 11:
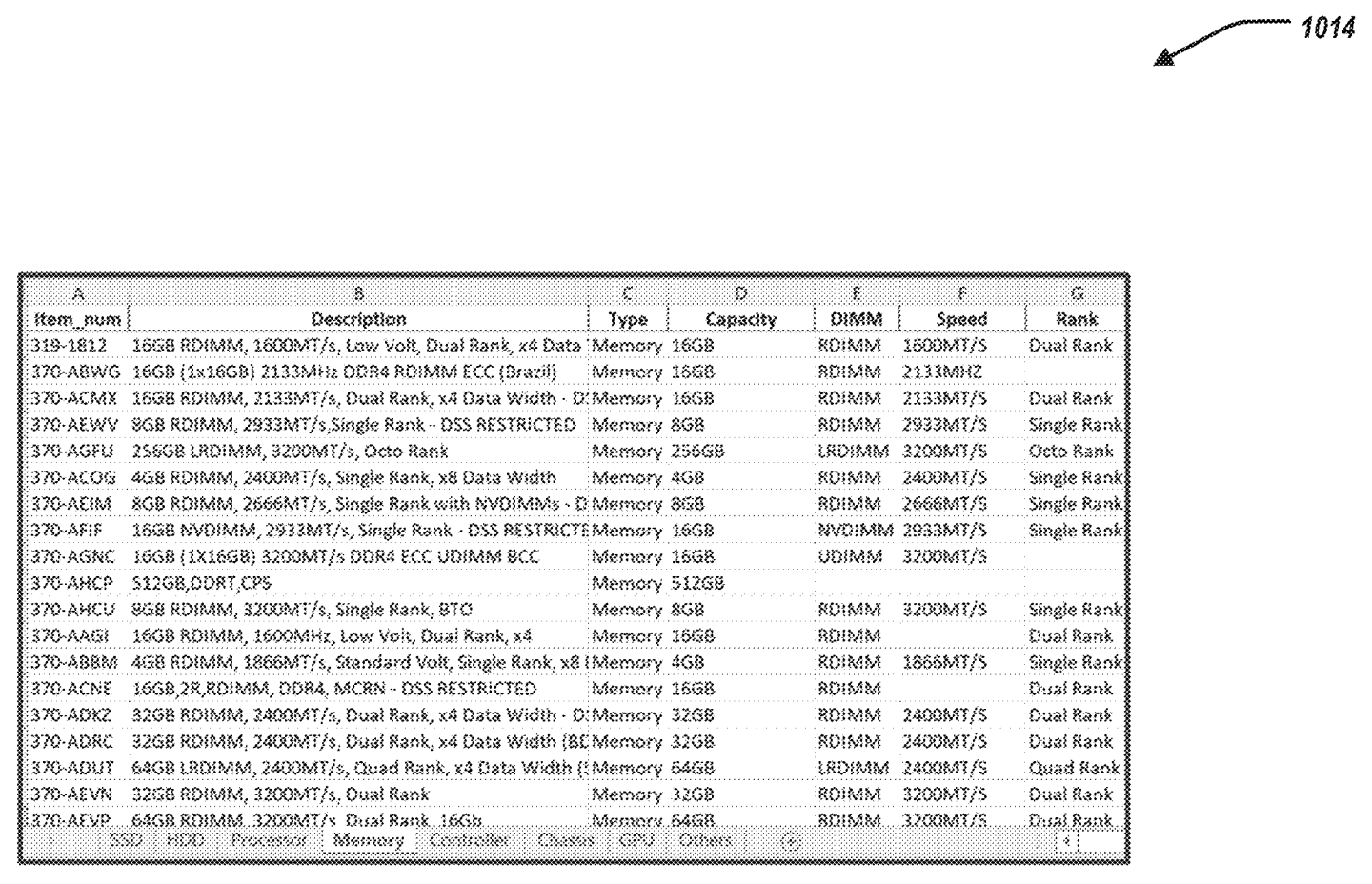

The data specification analysis computing module 1002 stores, at an index and for each computing component, the category of the computing component and the attribute data for each attribute associated with the category of the computing component. The index could be stored at the storage device 1004 as stored data 1014. An example of stored data 1014 index is shown at FIG. 11. For example, when the computing component is memory, the data specification analysis computing module 1002 stores at the stored data 1014 the category of the computing component (memory) and attributes of the memory such as type, capacity, speed, and rank; as well as attribute data for each of these attributes (capacity-16 GB, 256 GB; speed—1600 MT/S, 3200 MT/S; rank-dual rank, single rank).

In some examples, the models (e.g., the NER models and the QA models 1012) are trained. Specifically, the data specification analysis computing module 1002 receives a set of training data specifications. The data specification analysis computing module 1002 can train, based on the training data specifications, the models, including generating rules for extracting the attribute data from the set of training data specifications.

Figure 12:
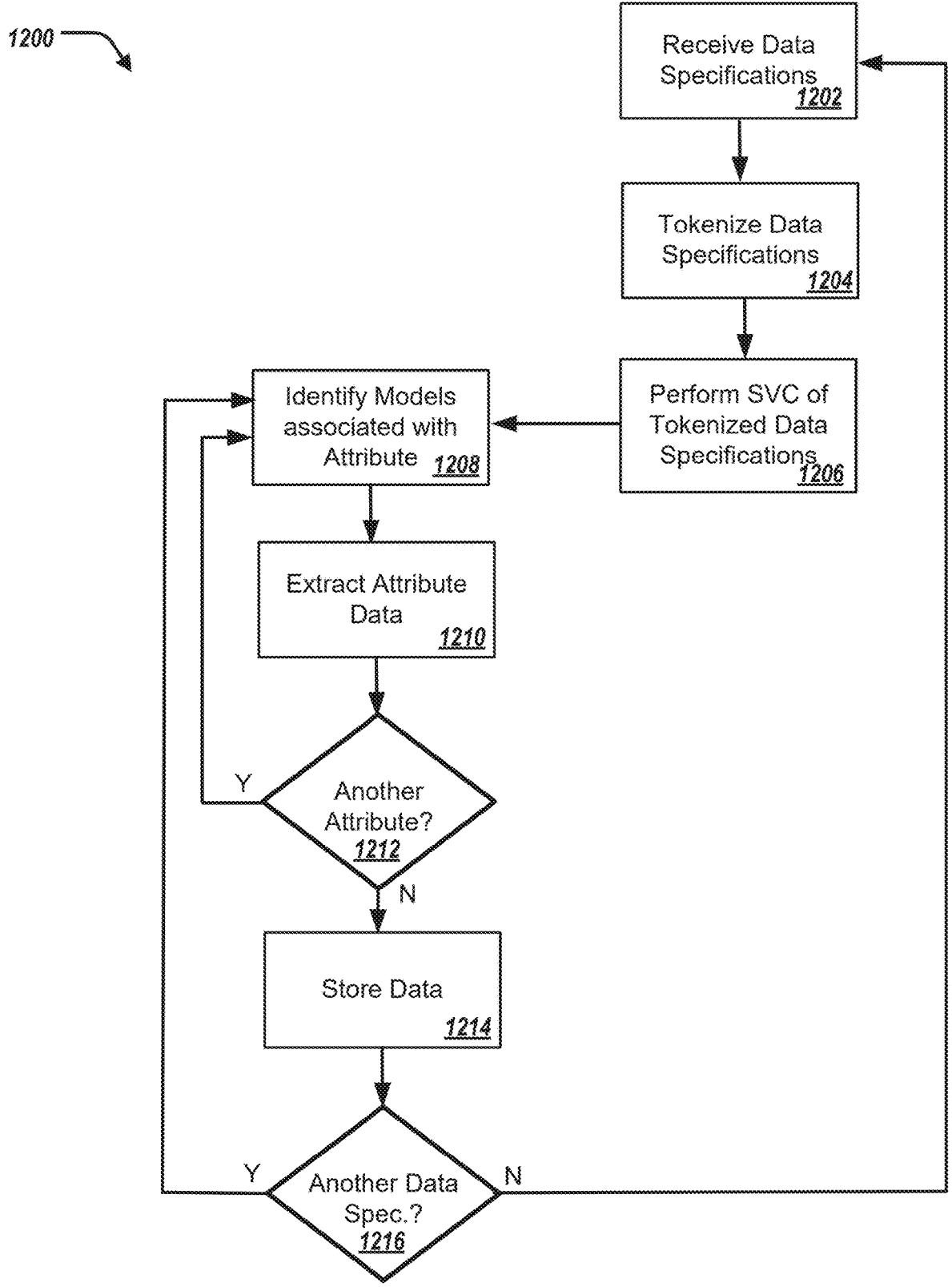
FIG. 12 illustrates a flowchart of a method for analyzing data specifications.

FIG. 12 illustrates a flowchart depicting selected elements of an embodiment of a method 1200 for analyzing data specifications. The method 1200 may be performed by the information handling system 100, the information handling system 202 and/or data specification analysis computing module 1002, and with reference to FIGS. 1, 2, 10, and 11.

It is noted that certain operations described in method 1200 may be optional or may be rearranged in different embodiments.

The data specification analysis computing module 1002 receives the data specifications 1050 associated with the computing components, at 1202. The data specification analysis computing module 1002 tokenizes the data specifications 1050, at 1204. The data specification analysis computing module 1002 performs SVC of the tokenized data specifications to classify each of the computing components into a respective category, at 1206. The data specification analysis computing module 1002 identifies models associated with the attribute, at 1208. The data specification analysis computing module 1002 extracts, using the identified models, the attribute data for the attribute associated with the tokenized data specifications, at 1210.

The data specification analysis computing module 1002 determines if there is another attribute for the computing component, at 1212. If there is another attribute for the computing component, the method returns to step 1208. If there is not another attribute for the computing component, the data specification analysis computing module 1002 stores, at the index, the category of the computing component and the attribute data for each attribute associated with the category of the computing component, at 1214.

The data specification analysis computing module 1002 determines if there is another computing component of the data specifications 1050 to analyze, at 1216. If there are no further computing components to analyze, the method returns to step 1202. If there are further computing components to analyze, the method returns to step 1208.

Disparate Input Normalization Computing Module 212/ "Normalizing Disparate Inputs"

Referring to FIG. 2, the disparate input normalization computing module 212 performs transformations on data sets of differing formats and levels of details to generate a common specification template against which computing products from differing vendors/manufacturers can be consistently compared.

In short, the disparate input normalization computing module 212 can aggregate and normalize data sourced from the Internet (product specifications, product configuration permutations) and computer-assisted visual analyses to provide a repeatable, quantitative approach to define a relative similarity metric between any two products.

Figure 13:
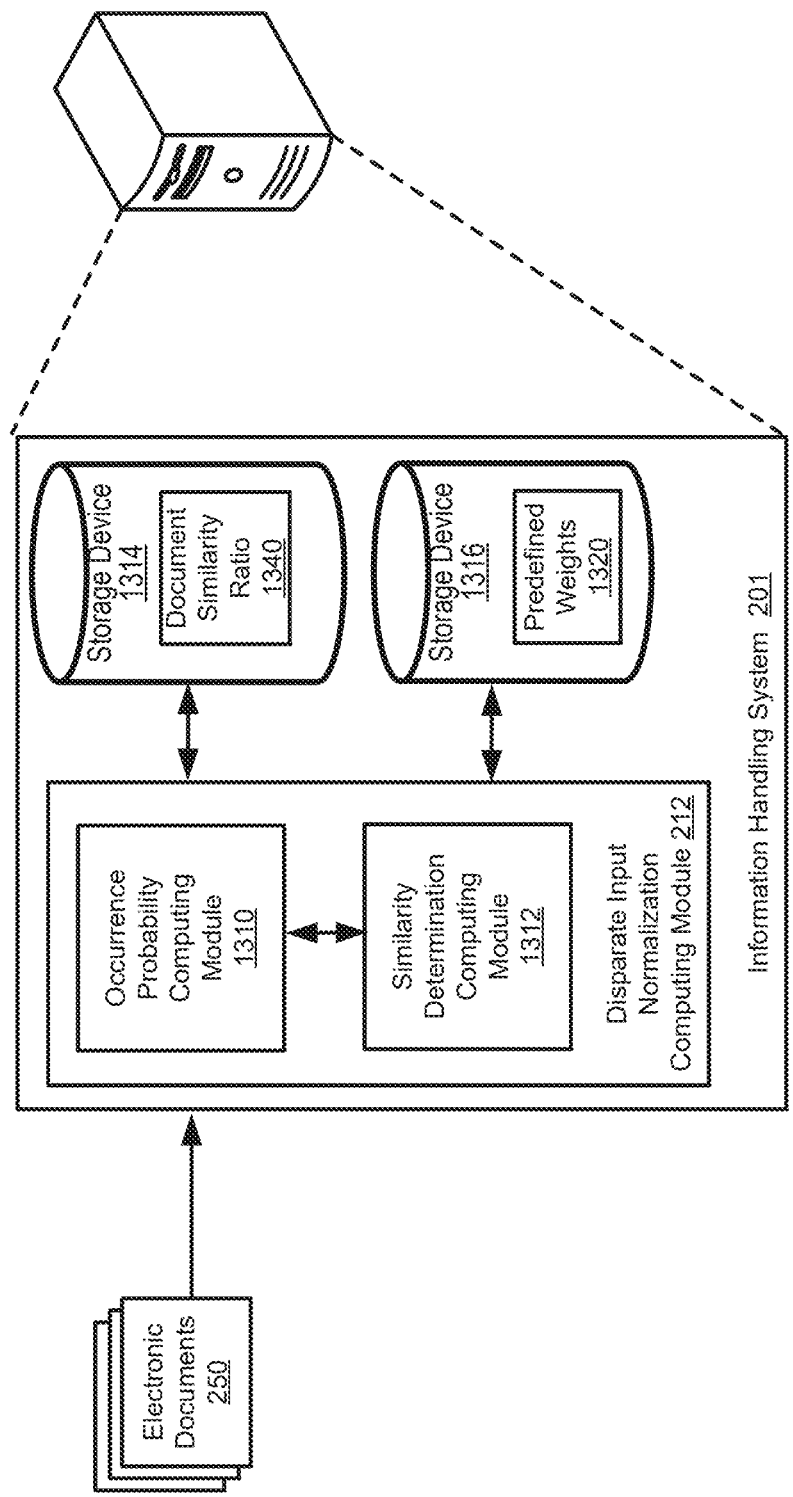
FIG. 13 illustrates a block diagram of the information handling system, and in particular, a disparate input normalization computing module of the information handling system.

FIG. 13 illustrates the information handling system 201, and specifically, the disparate input normalization computing module 212. Referring to FIGS. 2 and 13, the disparate input normalization computing module 210 can include an occurrence probability computing module 1310, and a similarity determination computing module 1312.

The information handling system 201 can include a storage device 1314 and a storage device 1316. The storage devices 1314, 1316 can be the same as the storage device 230.

The occurrence probability computing module 1310 can be in communication with the similarity determination computing module 1312 and the storage devices 1314, 1416. The similarity determination computing module 1312 can be in communication with the occurrence probability computing module 1310 and the storage devices 1314, 1316.

The disparate input normalization computing module 212 can receive the data specifications 250. Each of the data specifications 250 can include data indicating computing products. For each computing product, the data specifications 250 can indicate a listing of a plurality of computing components. Furthermore, the list of the plurality of computing components includes, for each computing component, a plurality of features of the computing component.

For example, the computing products can include a third-party computing product, a server computing product, a third-party server computing product, an information handling system, or a third-party information handling system. For example, the computing components can include memory, hard drives, processors, server chassis, and the like. For example, the features can include, when the computing component is memory, a memory size (8 GB, 16 GB, 32 GB); and a number of memory sticks. For example, when the computing component is a hard drive, the features of the computing component can include a type of the hard drive, a size of the hard drive, and RPM of the hard drive.

In some examples, the data from the electronic documents 250 can be pre-processed, filtered, and analyzed prior to receipt by the disparate input normalization computing module 212. For example, the data from the electronic documents 250 can be pre-processed, filtered, and analyzed prior by the maximum configuration determination computing module 206, the aspect generation computing module 210, the CV assisted product analysis computing module 208, and the dynamic web crawling computing module 204, as described further herein. In some examples, the disparate input normalization computing module 212 can receive a plurality of configurations, for each computing product, of the computing components of the computing product from the maximum configuration determination computing module 206. In some examples, the disparate input normalization computing module 212 can receive, for each computing product, a maximum configuration of the computing product from the maximum configuration determination computing module 206. In some examples, the disparate input normalization computing module 212 can receive, for each computing component of the computing products, a category of the computing component and attribute (feature) data for each attribute associated with the category of the computing component from the aspect generation computing module 210. In some examples, the disparate input normalization computing module 212 can receive, for each layout of the computing component, a layout score of the layout for each of the computing components, from the CV assisted product analysis computing module 208.

The occurrence probability computing module 1310 determines, for each feature of each computing component, an occurrence probability of the feature across the plurality of electronic documents 250. Specifically, the occurrence probability computing module 1310 calculates a total number of the electronic documents 250; identifies, for each feature, a number of the electronic documents 250 that include the feature; and determines, for each feature, a ratio of the total number of the electronic documents 250 and the number of the electronic documents 250 that include the feature. For example, the ratio can be the number of the electronic documents 250 that include the feature divided by the total number of the electronic documents 250. The occurrence probability computing module 1310 defines, for each feature, the occurrence probability of the feature as the ratio (the number of the electronic documents 250 that include the feature divided by the total number of the electronic documents 250). For example, if there are two total electronic documents 250, and the feature is available in both electronic documents 250, the occurrence probability is 1. If the feature is available in only one of the electronic documents 250, the occurrence probability is 50% or 0.5.

The similarity determination computing module 1312, for each computing component of the electronic documents 250 and for each feature of each computing component, identifies a predefined weight of the feature. Specifically, the storage device 1316 stores data indicating the predefined weights 1320 for each feature of each computing component. Table 3 shows example predefined weights for features (F1, F2, . . . , Fn).

TABLE 3

| Feature | Predefined Weight |
|---|---|
| F1 | 94 |
| F2 | 76 |
| F2 | 85 |
| F4 | 93 |
| F5 | 76 |
| F6 | 85 |
| . . . | . . . |
| Fn | m |

For example, for an HDD computing component with a feature of 10 TB, the predefined weight can be 40. For example, for an HDD computing component with a feature 15 TB, the predefined weight can be 45. For example, for a processor with a feature of a speed of 6 GHz, the predefined weight can be higher than a processor having a feature of a speed of 5.8 GHz.

The similarity determination computing module 1312, for each computing component of the electronic documents 250 and for each feature of each computing component, calculates a heuristic weight of the feature based on i) the predefined weight of the feature and ii) the occurrence probability of the feature. In particular, the similarity determination computing module 1312, for each computing component of the electronic documents 250 and for each feature of each computing component, calculates a heuristic weight of the feature based on a multiple of the predefined weight of the feature and the occurrence probability of the feature. That is, the heuristic weight of the feature is the value of the multiplication of the predefined weight of the feature and the occurrence probability of the feature.

The similarity determination computing module 1312, for each computing component of the electronic documents 250, determines a minimum heuristic weight among the heuristic weights of each of the features of the computing component. In other words, the similarity determination computing module 1312, for each computing component of the electronic documents 250, determines what is the minimum weight of the weights of all of the features for the computing component. Further, the similarity determination computing module 1312, for each computing component of the electronic documents 250, determines a maximum heuristic weight among the heuristic weights of each of the features of the computing component. In other words, the similarity determination computing module 1312, for each computing component of the electronic documents 250, determines what is the maximum weight of the weights of all of the features for the computing component. Table 4 shows an example minimum and maximum heuristic weight for each computing component.

TABLE 4

| Computing Component | Min/Max |
|---|---|
| A1 | (A1 min, A1 max) |
| A2 | (A2 min, A2 max) |
| A3 | (A3 min, A3 max) |
| . . . | |
| An | (An min, An max) |

The similarity determination computing module 1312, for each computing component of the electronic documents 250, determines a computing component similarity ratio of the computing component between any subset of the electronic documents 250. Specifically, the similarity determination computing module 1312, for each computing component of the electronic documents 250, determines a computing component similarity ratio of the computing component between any subset of the electronic documents 250 based on the minimum heuristic weight and the maximum heuristic weight of the computing component of each electronic document 250 of the subset of the electronic documents 250. That is, the similarity determination computing module 1312, for each computing component of the electronic documents 250, identifies the minimum heuristic weight and the maximum heuristic weight of the computing component (based on the heuristic weights of the features of the computing component) and compares such for the computing component across the subset of the electronic documents 250 to determine a computing component similarity ratio of the computing component across the subset of the electronic documents 250.

In some examples, the computing component similarity ratio is a linear similarity ratio. In some examples, the similarity determination computing module 1312 determines the computing component similarity ratio using the equation:

$$\text{computing component similarity ratio} = \frac{\min(\{A\max\}) - \max(\{A\min\})}{A\max - A\min}$$

Specifically, the similarity determination computing module 1312 generates, across the subset of the electronic document 240, a listing of the minimum heuristic weights of the computing component for each electronic document 250. Further, the similarity determination computing module 1312 generates, across the subset of the electronic document 240, a listing of the maximum heuristic weights of the computing component for each electronic document 250. The similarity determination computing module 1312 determines the computing component similarity ratio of the computing component between any subset of the electronic documents based on the listing of the minimum heuristic weights and the listing of the maximum heuristic weights of the computing component of each of the subset of the electronic documents 250. The similarity determination computing module 1312 identifies a minimum of the listing of the maximum heuristic weights of the computing component and identifies a maximum of the listing of the minimum heuristic weights of the computing component. The similarity determination computing module 1312 then determines a first difference between the minimum of the list of the maximum heuristic weights of the computing component and the maximum of the listing of the minimum heuristic weights of the computing component. The similarity determination computing module 1312 then identifies an absolute minimum heuristic weight of the listing of the maximum heuristic weights of the component; and the similarity determination computing module 1312 then identifies an absolute maximum heuristic weight of the listing of the maximum heuristic weights of the component. The similarity determination computing module 1312 determines a second difference between the absolute maximum heuristic weight and the absolute minimum heuristic weight. The similarity determination computing module 1312 calculates the computing component similarity ratio based on the first difference (difference between the minimum of the list of the maximum heuristic weights of the computing component and the maximum of the listing of the minimum heuristic weights of the computing component) and the second difference (difference between the absolute maximum heuristic weight and the absolute minimum heuristic weight). That is, the similarity determination computing module 1312 calculates the computing component similarity ratio based on the first difference (difference between the minimum of the list of the maximum heuristic weights of the computing component and the maximum of the listing of the minimum heuristic weights of the computing component) divided by the second difference (difference between the absolute maximum heuristic weight and the absolute minimum heuristic weight).

In some examples, the similarity determination computing module 1312 then determines a document similarity ratio between a particular electronic document 250 and another electronic document 250. Specifically, the similarity determination computing module 1312 then determines a document similarity ratio between a particular electronic document 250 and another electronic document 250 based on the computing component similarity ratio of each computing component shared by the particular electronic document 250 and the another electronic document 250.

In some examples, each electronic document 250 can be associated with a specific computing product. To that end, when the similarity determination computing module 1312 determines the document similarity ratio between the particular electronic document 250 and the another electronic document 250, the similarity determination computing module 1312 is determining the similarity ratio between the computing product of the particular electronic document 250 and the another electronic document 250. In some examples, the electronic documents 250 can be associated with two or more computing products. To that end, the similarity determination computing module 1312 can determine a computing product similarity ratio between any computing products described by any combination of the electronic documents 250. Specifically, the similarity determination computing module 1312 can determine a computing product similarity ratio between two computing products of the electronic documents 250 based on the computing component similarity ratio of each computing component of the computing products shared by the electronic documents 250.

In some examples, the similarity determination computing module 1312 stores, at the storage device 1314, the document similarity ratio 1340 between any pair (or any combination) of the electronic documents 250. In some examples, the similarity determination computing module 1312 provides the document similarity ratio 1340 to the indexing computing module 229 for indexing.

In a use case example, for a list of computing products each including processors (computing components), a similarity ratio can be determined between the processors. The disparate input normalization computing module 212 can find the occurrence probability of each process under each computing product, that is multiplied with the pre-defined weights to define heuristics weights. The disparate input normalization computing module 212 can then determine the minimum and maximum from the heuristics weights to create a minimum and maximum list. The disparate input normalization computing module 212 can then calculate a ratio from these two lists to provide the similarity between these processors.

Figure 14:
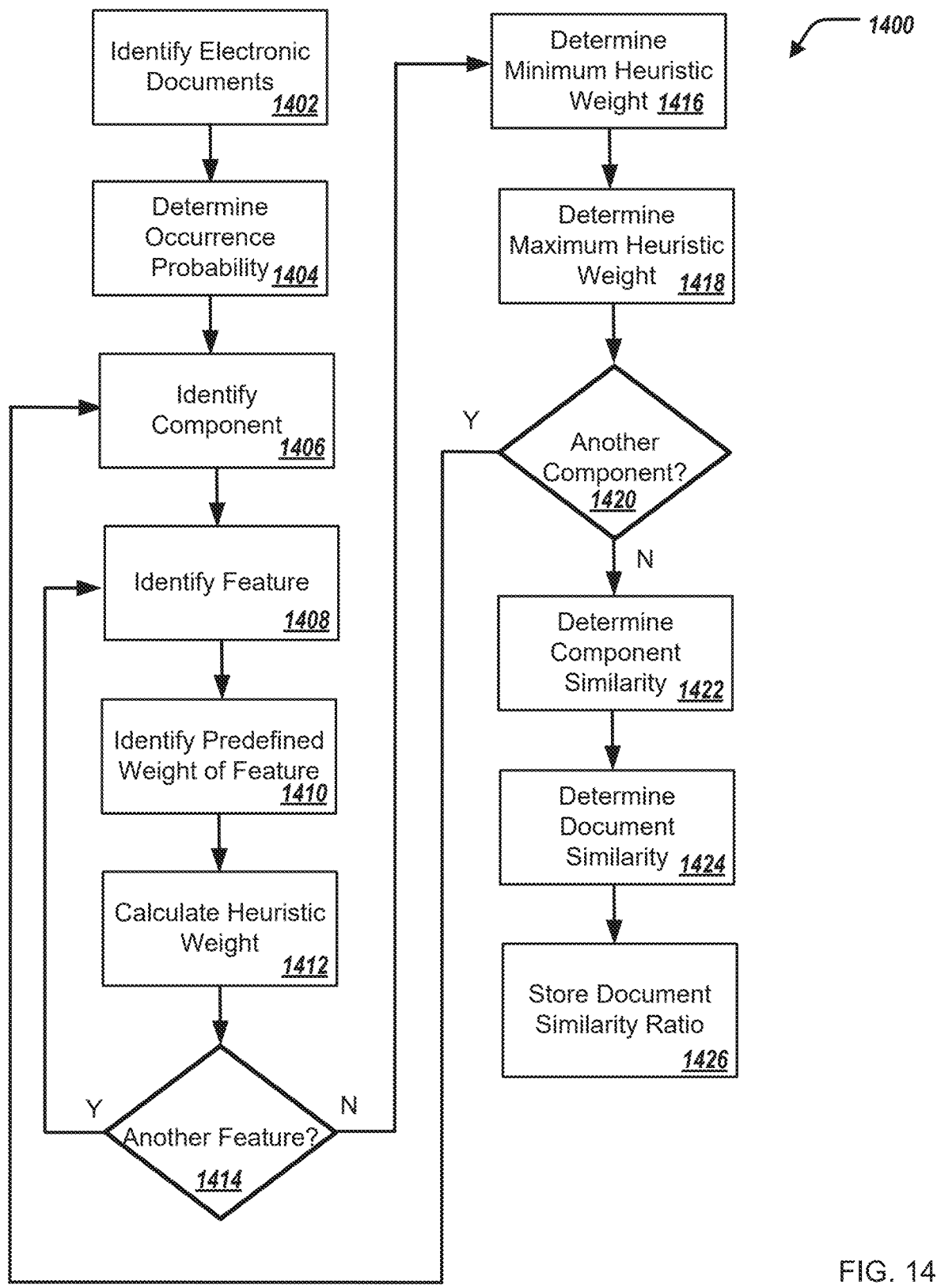
FIG. 14 illustrates a flowchart of a method for normalizing disparate inputs between electronic documents.

FIG. 14 illustrates a flowchart depicting selected elements of an embodiment of a method 1400 for normalizing disparate inputs between electronic documents. The method 1400 may be performed by the information handling system 100, the information handling system 202 and/or the disparate input normalization computing module 212, and with reference to FIGS. 1, 2, and 13. It is noted that certain operations described in method 1400 may be optional or may be rearranged in different embodiments.

The disparate input normalization computing module 212 identifies the electronic documents 250, at 1402. Each electronic document 250 includes, for each computing product, a list of computing components of the computing product. The list of computing components includes, for each computing component, features of the computing component. The disparate input normalization computing module 212 determines, for each feature of each computing component, an occurrence probability of the feature across the electronic documents 250, at 1404. The disparate input normalization computing module 212 identifies a computing component of the electronic documents 250, at 1406. The disparate input normalization computing module 212 identifies a feature of the computing component, at 1408. The disparate input normalization computing module 212 identifies a predefined weight of the features, at 1410. The disparate input normalization computing module 212 calculates a heuristic weight of the features based on i) the predefined weight of the feature and ii) the occurrence probability of the feature, at 1412.

The disparate input normalization computing module 212 determines whether there is another feature of the computing component to analyze, at 1414. When the disparate input normalization computing module 212 determines that there is another feature of the computing component to analyze, the method returns to step 1408 and repeats steps 1408-1412. When the disparate input normalization computing module 212 determines that there is not another feature of the computing component to analyze, the disparate input normalization computing module 212 determines the minimum heuristic weight among the heuristic weights of each of the features of the computing component, at 1416. The disparate input normalization computing module 212 determines the maximum heuristic weight among the heuristic weights of each of the features of the computing component, at 1418.

The disparate input normalization computing module 212 determines whether there is another computing component to analyze, at 1420. When the disparate input normalization computing module 212 determines that there is another computing component to analyze, the method returns to step 1406 and repeats steps 1406-1412. When the disparate input normalization computing module 212 determines that there is not another computing component to analyze, the disparate input normalization computing module 212 determines the computing component similarity ratio of the computing component between any subset of the electronic documents 250, at 1422. The computing component similarity ratio is based on the minimum heuristic weight and the maximum heuristic weight of the computing component of each electronic document 250 of the subset of the electronic documents 250. The disparate input normalization computing module 212 determines a document similarity ratio between a particular electronic document 250 and another electronic document 250, at 1424. The document similarity ratio is based on the computing component similarity ratio of each computing component shared by the particular electronic document 250 and the another electronic document 250. The disparate input normalization computing module 212 stores the document similarity ratio at the storage device 1316.

Indexing Computing Module 229/"Data Indexing"

The indexing computing module 229 can provide indexing of relationships (or links) between any set of data stored at the storage device 230. The indexing computing module 229 can receive data from the disparate input normalization computing module 212 (such as the electronic document similarity ratio), and indexes such data. The indexing computing module 229 provides the indexed data for storage at the storage device 230.

Subjective Input Quantification Computing Module 218/"Quantifying Subjective Inputs" Referring to FIG. 2, the subjective input quantification computing module 218 utilizes sentiment analysis to repeatably extract quantitative metrics about market and customer acceptance of a computing product from various subject sources (e.g., independent computing product reviews, customer forums, technology blogs (electronic documents), and the like). The subjective input quantification computing module 218 can automate product popularity evaluation in a consistent, repeatable way that holistically evaluates all available sources. The data input to the subjective input quantification computing module 218 is stratified and the output of the subjective input quantification computing module 218 is generated/presented within a competitive analysis context. In short, the subjective input quantification computing module 218 transforms subjective content into objective measures of market sentiment.

The subjective input quantification computing module 218 can additionally receive transcripts of video recordings (of electronic documents).

The subjective input quantification computing module 218 can output cumulative sentiments for generated aspects (e.g., competition, dynamic system configurability, service, lifespan, etc.) for each electronic document.

Sentiment Accreditation Computing Module 216/"Determining an Accreditation of a Review Entity of a Computing Product"

Referring to FIG. 2, the sentiment accreditation computing module 216 can evaluate the authorial credibility of subjective source material (e.g., electronic documents) and weigh extracted sentiment accordingly.

In short, the sentiment accreditation computing module 216 identifies news articles/review articles (e.g., electronic documents 250) related to computing product industry keywords (e.g., 5G, servers, NVMe, memory over fabric, etc.) and generates credibility rates for different sources based on established trends and product specifications. The sentiment accreditation computing module 216 can apply such credibility ratings to respective content authors to represent aggregate computing product data. The sentiment accreditation computing module 216 can retroactively refine the credibility rates by verifying past predications made by the content authors when new market data is made available. The sentiment accreditation computing module 216 can utilize credibility trends to evaluate and correspondingly promote content of new authors. The sentiment accreditation computing module 216 provides automated relevancy (reliability and acceptance score) determination for various sources.

Figure 15:
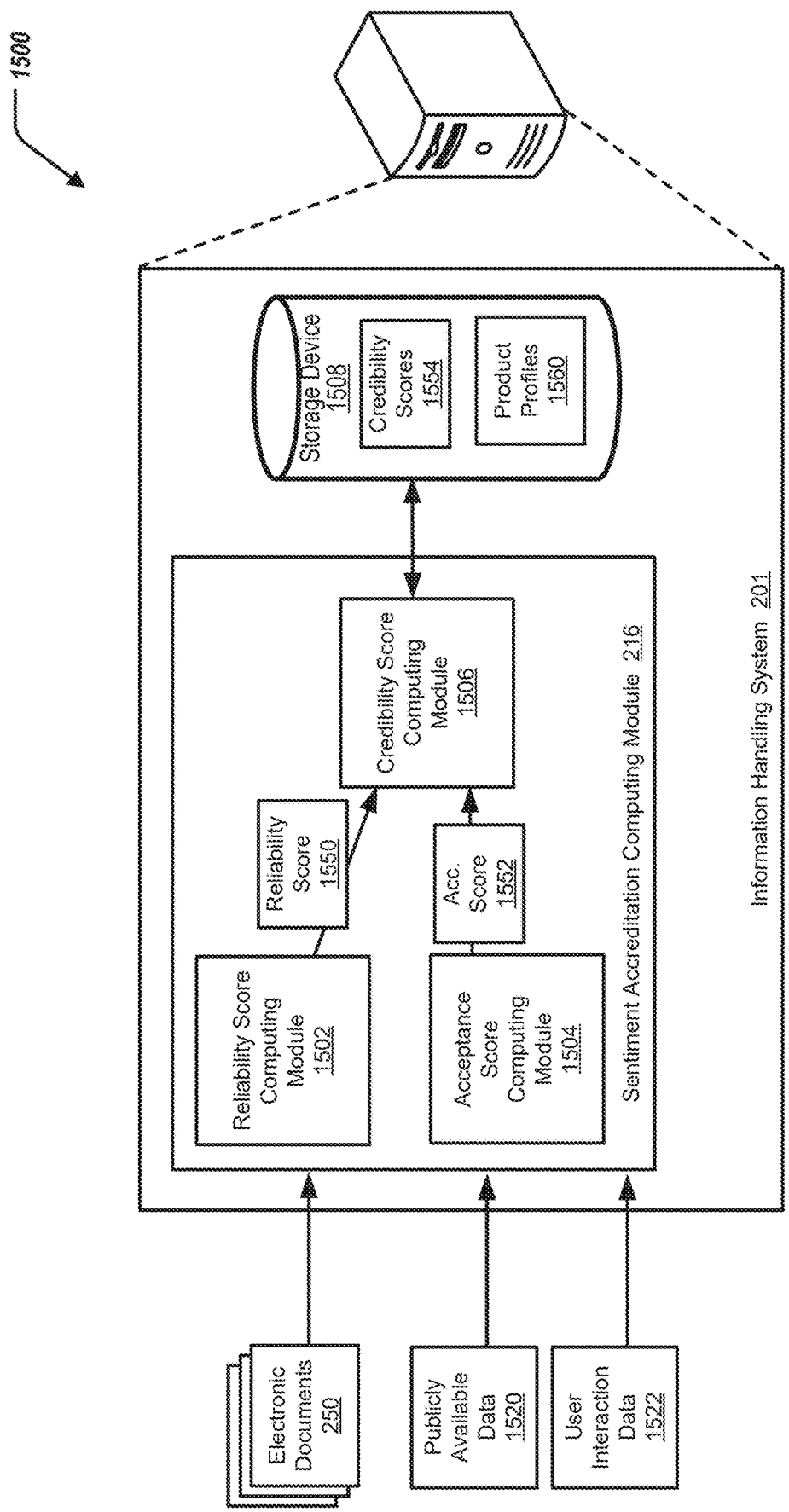
FIG. 15 illustrates a block diagram of the information handling system, and in particular, a sentiment accreditation computing module of the information handling system.

FIG. 15 illustrates the information handling system 201, and specifically, the sentiment accreditation computing module 216. Referring to FIGS. 2 and 15, the sentiment accreditation computing module 216 can include a reliability score computing module 1502, an acceptance score computing module 1504, and a credibility score computing module 1506.

The information handling system 201 can include a storage device 1508. The storage device 1508 can be the same as the storage device 230.

The reliability score computing module 1502 can be in communication with the credibility score computing module 1506. The acceptance score computing module 1504 can be in communication with the credibility score computing module 1506. The sentiment accreditation computing module 216 can be in communication with the storage device 208.

The sentiment accreditation computing module 216 can determine an accreditation of a review entity of a computing product, described herein. Specifically, the sentiment accreditation computing module 216 can receive the electronic document 250. Each of the electronic documents can be associated with an entity. For example, the entity can be a person, user, organization, company, or the like. The electronic documents 250 can include data related to computing components, and in particular, reviews of the computing components.

The sentiment accreditation computing module 216 can further receive the data from the subjective input quantification computing module 218. For example, the sentiment accreditation computing module 216 can receive quantitative metrics about market and customer acceptance of computing products from the electronic documents 250.

In some examples, the electronic document 250 can include videos, and text recognition of the videos.

For each electronic document 250 of the electronic documents 250, the reliability score computing module 1502 can create a matrix of scores for multiple measures of the electronic document. Specifically, the reliability score computing module 1502 can calculate an anonymity score of the electronic document. That is, the reliability score computing module 1502 can calculate the anonymity score of the electronic document 250 based on publicly available data of the entity associated with the electronic document 250. For example, the sentiment accreditation computing module 216 can receive the publicly available data electronic documents 1520. The publicly available data electronic documents 1520 can be related to the entity of the electronic document 250 regarding the review of the computing product. The publicly available data electronic documents 1520 can include such data as a name of the entity, name of the organization, name of the location of the entity, and the like.

In some examples, the sentiment accreditation computing module 216 calculates the anonymity score of the electronic document 250 based on a name of the entity, an organization of the entity, and a designation of the entity. Specifically, the sentiment accreditation computing module 216 calculates the anonymity score of the electronic document 250 based on a weighted average score associated with the name of the entity, a weighted average score associated with the name of the organization, and a weighted average score associated with the designation of the entity. For example, the anonymity score can be a score from 1 to 100 based on example weightages of name (10), organization (40), and designation (40).

For each electronic document 250 of the electronic documents 250, the reliability score computing module 1502 can calculate a content specificity score of the electronic document 250. Specifically, the reliability score computing module 1502 can calculate the content specificity score based on a text analysis of the electronic document 250 with respect to the computing product. In short, the content specificity score can be reflective of whether the electronic document 250 (and the reviewer associated with the electronic document 250) is related to the computing product, a degree of relatedness to the computing product, and whether the electronic document 250 (and the review associated with the electronic document 250) is deviating from review of the computing product.

The reliability score computing module 1502 can calculate the content specificity score of the electronic document 250 based on an analysis of nouns, pronouns, and adjectives in each sentence of the electronic document 250 through parts of speech tagging. For example, the text associated with the electronic document 250 is a transcription of a video associated with the electronic document 250.

For each electronic document 250 of the electronic documents 250, the reliability score computing module 1502 can calculate a perspective view score of the electronic document 250. Specifically, the reliability score computing module 1502 can calculate the perspective view score of the electronic document 250 based on a sentiment of the electronic document 250. For example, the reliability score computing module 1502 calculates the perspective view score of the electronic document 250 based on a ratio of positive sentiment mentions of text of the electronic document 250 to negative sentiment mentions of text of the electronic document 250. In some examples, the reliability score computing module 1502 determines the positive sentiments and the negative sentiments of the electronic document through sentiment analysis, and/or identifies such through a distinguishment of explicit mentions of the positive and negative sentiment in the electronic document 250.

For each electronic document 250 of the electronic documents 250, the reliability score computing module 1502 can calculate a usage context score of the electronic document 250. Specifically, the reliability score computing module 1502 can calculate a usage context score of the electronic document based on workload mentions within the electronic document 250. For example, the reliability score computing module 1502 calculates the usage context score of the electronic document 250 based on a quantity of workload mentions of text of the electronic document 250.

For each electronic document 250 of the electronic documents 250, the reliability score computing module 1502 can calculate a reliability score 1550 of the electronic document 250. Specifically, the reliability score computing module 1502 can calculate a reliability score 1550 of the electronic document 250 based on i) the anonymity score of the electronic document 250, ii) the content specificity score of the electronic document 250, iii) the perspective view score of the electronic document 250, and iv) the usage context score of the electronic document 250. In some examples, the reliability score computing module 1502 can calculate a reliability score 1550 of the electronic document 250 based on i) a weighted anonymity score of the electronic document 250, ii) a weighted content specificity score of the electronic document 250, iii) a weighted perspective view score of the electronic document 250, and iv) a weighted usage context score of the electronic document 250.

For each electronic document 250, the acceptance score computing module 1504 calculates an acceptance score 1552 of the electronic document 250. Specifically, the acceptance score computing module 1504 calculates an acceptance score 1552 of the electronic document 250 based on user interaction data of users with the electronic document 250. For example, the sentiment accreditation computing module 216 can receive the user interaction data electronic documents 1522. The user interaction data electronic documents 1522 can be related to a quantity of comments, questions, answers, votes, likes, and dislikes associated with the electronic document 250 and provided by the plurality of users interacting with the electronic document 250. The acceptance score computing module 1504 can calculate the acceptance score 1552 of the electronic document 250 based on a quantity of comments, questions, answers, votes, likes, and dislikes associated with the electronic document 250 and provided by the users interacting with the electronic document 250.

For each electronic document 250, the credibility score computing module 1506 calculates a credibility score 1554 of the electronic document 250. Specifically, the credibility score computing module 1506 calculates the credibility score 1554 for the electronic document 250 based on a weighted average of the reliability score 1550 and the acceptance score 1552 of the electronic document 250. For example, for the components of the credibility score (e.g., the anonymity score, the content specificity score, the perspective view score, the usages context score, the reliability score, and/or the acceptance score), the credibility score computing module 1506 can calculate the credibility for each component based on the equation:

$$\frac{\sum_{k=0}^{n} x^k w^{(k)}}{\sum_{k=0}^{n} w^{(k)}}$$

where x is the score for the component, w is a weighting associated with the component, and k is the number of components.

For each electronic document, the sentiment accreditation computing module 216 can update a product profile 1560 of the computing product storage in the storage device 1508.

In some examples, the sentiment accreditation computing module 216 can create a model to identify a range of weights for the components. The modeled defined weights can then be implemented to obtain the weighted average. Specifically, the sentiment accreditation computing module 216 can identify, for the entity (e.g., the reviewer—a person, user, organization, company, or the like) one or more previously calculated credibility scores associated with the electronic documents 250 and/or the computing products. The sentiment accreditation computing module 216 can compare the previously calculated credibility scores with the credibility score 1554 for the computing product. The sentiment accreditation computing module 216 can adjust, based on the comparing, a weight of the credibility score 1554.

Figure 16:
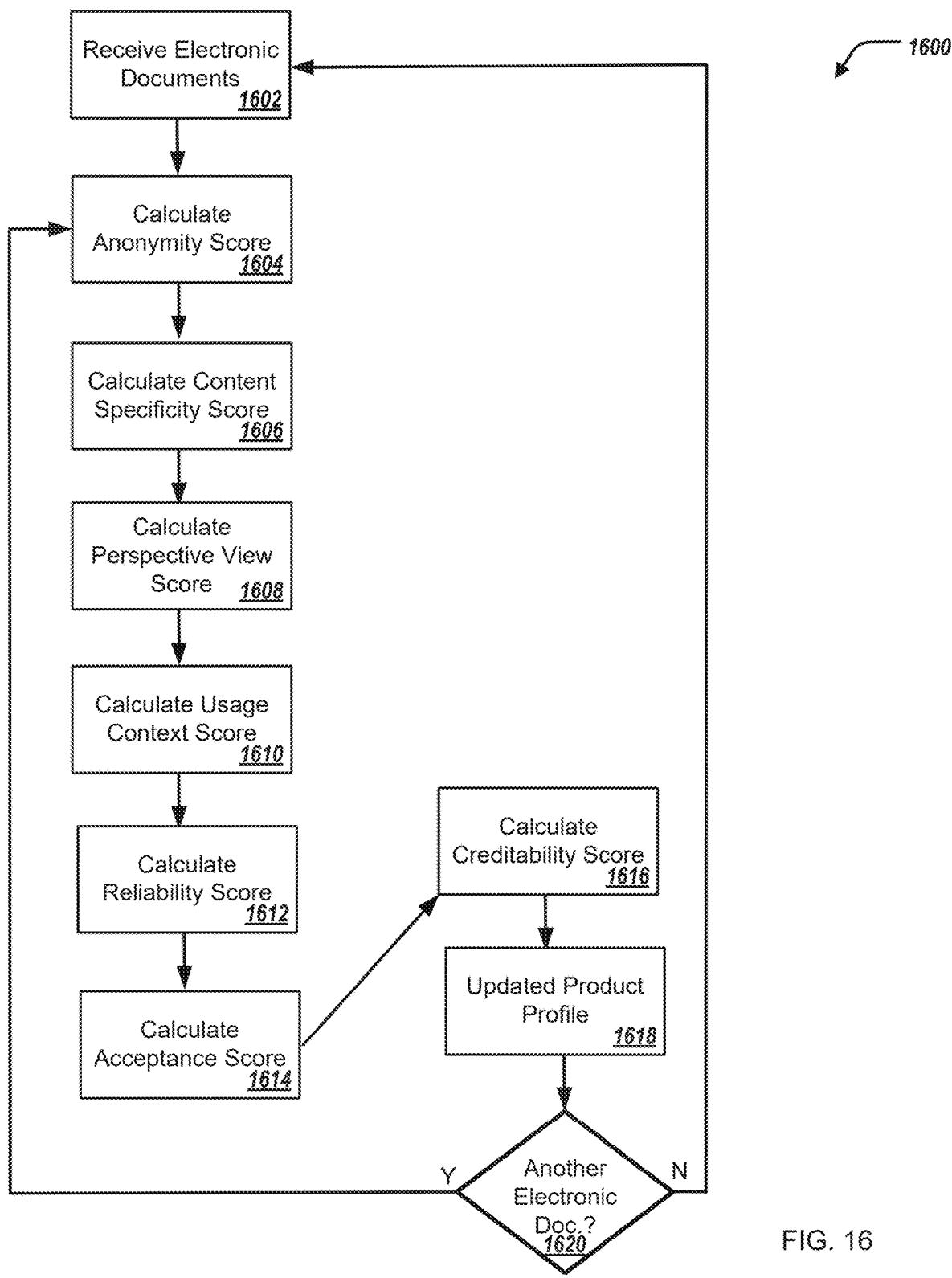
FIG. 16 illustrates a flowchart of a method for determining an accreditation of a review entity of a computing product.

FIG. 16 illustrates a flowchart depicting selected elements of an embodiment of a method 1600 for determining an accreditation of a review entity of a computing product. The method 1600 may be performed by the information handling system 100, the information handling system 201, and/or the sentiment accreditation computing module 216, and with reference to FIGS. 1, 2, and 15. It is noted that certain operations described in method 1600 may be optional or may be rearranged in different embodiments.

The sentiment accreditation computing module 216 receives the electronic document 250, at 1602. Each of the electronic documents 250 can be associated with an entity. The reliability score computing module 1502 calculates the anonymity score of the electronic document 250 based on publicly available data 1520, at 1604. The reliability score computing module 1502 calculates the content specificity score of the electronic document 250 based on a text analysis of the electronic documents 250 with respect to the computing product, at 1606. The reliability score computing module 1502 calculates the perspective view score of the electronic document 250 based on a sentiment of the electronic document 250, at 1608. The reliability score computing module 1502 calculates the usage context score of the electronic document 250 based on workload mentions within the electronic document 250, at 1610. The reliability score computing module 1502 calculates the reliability score of the electronic document 250 based on i) the anonymity score of the electronic document 250, ii) the content specificity score of the electronic document 250, iii) the perspective view score of the electronic document 250, and iv) the usage context score of the electronic document 250, at 1612. The acceptance score computing module 1504 calculates the acceptance score of the electronic document 250 based on the user-interaction data 1522 of users with the electronic document 250, at 1614. The credibility score computing module 1506 calculates the credibility score of the electronic document 250 based on a weight average of the reliability score and the acceptance score, at 1616. The sentiment accreditation computing module 216 updates, based on the credibility score of the electronic document, the product profile 1560 of the computing product stored at the storage device 1508, at 1618. The sentiment accreditation computing module 216 determines if there is another electronic document 250 to analyze, at 1620. If there is not another electronic document 250 to analyze, the method returns to step 1602. If there is another electronic document 250 to analyze, the method returns to step 1604.

Market Predictions Computing Module 220/"Predicting Market Trends of Computing Products"

Referring to FIG. 2, the market predictions computing module 220 can map and extrapolate identified market trends based on sentiment analysis of various materials (electronic documents) including market data and product specifications.

In short, the market predictions computing module 220 can accept sentiment analysis metrics generated from, among other sources, blogs, promotional material, videos, customer reviews, etc. provided by competitors or third-party companies. Sentiment from these materials related to features, use cases, or innovations are analyzed by the market predictions computing module 220. This sentiment data may then be cross-validated against objective market performances from relevant vendors. Additionally, the market predictions computing module 220 can examine perceived trends in competitors' marketing focuses as well as their generation over generation offerings. These trends are further tempered by sales data to provide insight as to where the market as well as individual competitors are heading. The market predictions computing module 220 can combine perceived market sentiment, existing product specifications, and historical and current market data and comprehensively consolidate disparate inputs to provide an objective, consistent, and repeatable method of forming market trend predictions.

Figure 17:
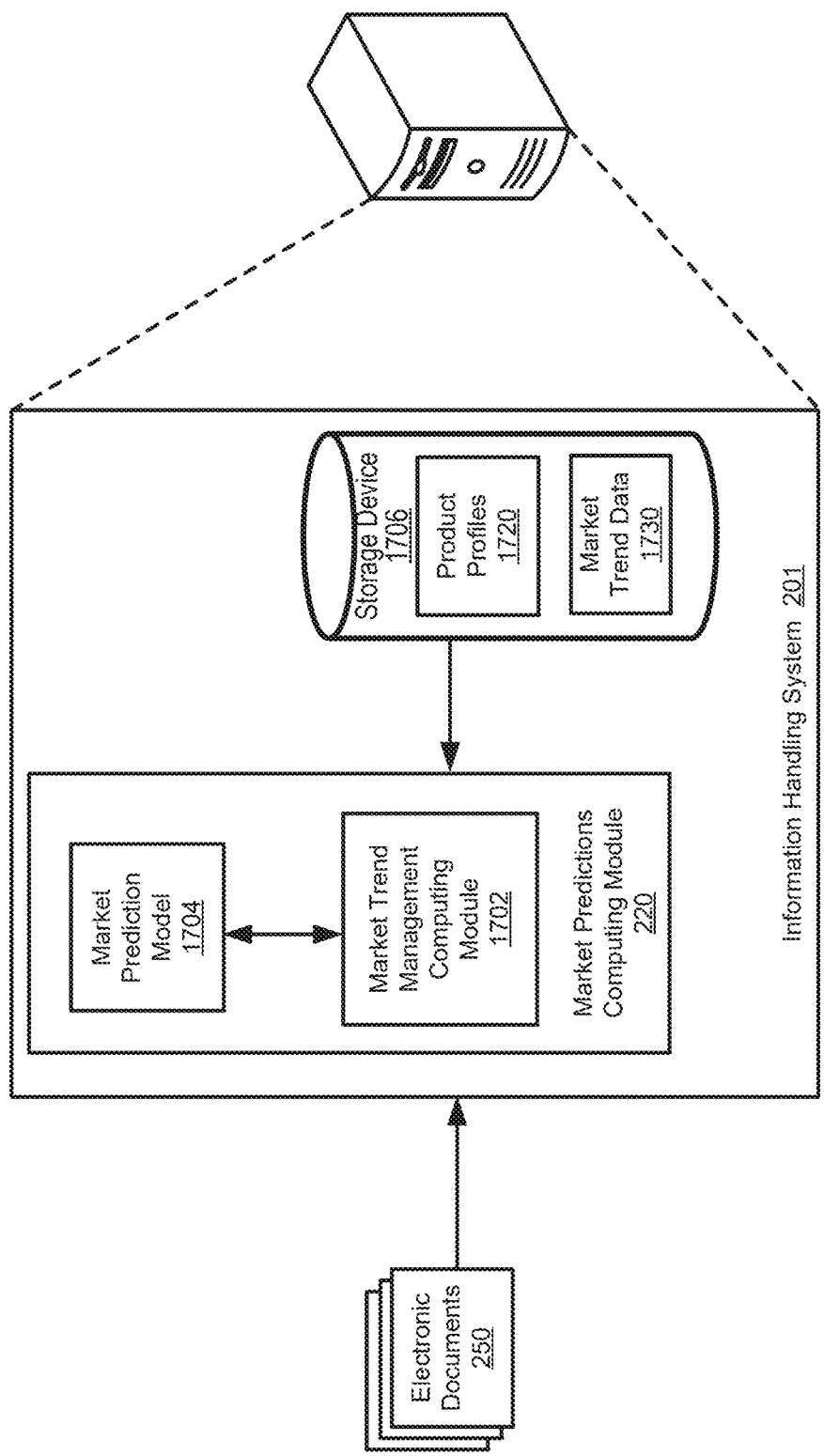
FIG. 17 illustrates a block diagram of the information handling system, and in particular, a market predictions computing module of the information handling system.

FIG. 17 illustrates the information handling system 201, and specifically, the market predictions computing module 220. Referring to FIGS. 2 and 17, the market predictions computing module 220 can include a market trend management computing module 1702 and a market prediction model 1704.

The information handling system 201 can include a storage device 1706. The storage device 1706 can be the same as the storage device 230. The market predictions computing module 220 can be in communication with the storage device 1706.

In some implementations, for each computing product, the market predictions computing module 220 can identify, from the storage device 1706, a product profile 1720 of the computing product. Further, the product profile 1720 can include a list of computing components associated with the computing product. Further, the list of computing components can include, for each computing component, features of the computing component. In some examples, the product profile 1720 can include multiple configuration variations of the computing components and feature combinations to generate multiple layouts of the computing product.

For example, the computing products can include a third-party computing product, a server computing product, a third-party server computing product, an information handling system, or a third-party information handling system. For example, the computing components can include memory, hard drives, processors, server chassis, and the like. For example, the features can include, when the computing component is memory, a memory size (8 GB, 16 GB, 32 GB); and a number of memory sticks. For example, when the computing component is a hard drive, the features of the computing component can include a type of the hard drive, a size of the hard drive, and RPM of the hard drive.

The market trend management computing module 1702 can determine computational capabilities of the computing product. Specifically, the market trend management computing module 1702 can determine the computational capabilities of the computing product based on the product profile 1720 of the computing product. The computational capabilities can include processing capabilities, memory capabilities, workload capabilities, and the like.

The market trend management computing module 1702 can identify the electronic documents 250 associated with the computing product. The electronic documents 250 can include content such as product review blogs, videos, and website data. The electronic documents 250 can include data indicating promotional material, videos, text translation of videos, customer reviews, and the like.

In some examples, the market trend management computing module 1702 can identify the electronic document 250 associated with the computing component including identifying electronic documents 250 related to reviews, blogs, videos, and website data of the electronic documents 250. In some examples, the market trend management computing module 1702 can identify the electronic document 250 associated with the computing component including identifying electronic documents 250 related to news articles of vendors (or manufacturers) of the computing components of the electronic documents 250. For example, the market trend management computing module 1702 can identify keywords (such as "investments" or "launches") in the news articles.

In some examples, the market trend management computing module 1702 can identify the electronic document 250 associated with the computing component including identifying electronic documents 250 related to financial data of vendors (or manufacturers) of the computing product. For example, the market trend management computing module 1702 can identify electronic documents 250 such as quarterly forecasts.

The market trend management computing module 1702 calculates, based on the electronic documents 250, product sentiment, market data, and financial data results associated with the computing component. In some examples, the market trend management computing module 1702 can calculate the product sentiment of the computing product based on the reviews, blogs, videos, and website data of the computing products. Furthermore, the market trend management computing module 1702 can calculate the product sentiment of the computing product based on a ratio of positive sentiment mentions of texts of the reviews, blogs, videos, and website data of the computing product to negative sentiment mentions of texts of the reviews, blogs, videos, and website data of the computing products. For example, the market trend management computing module 1702 calculates the product sentiment as an existing overall product sentiment regarding negative and positive sentiment mentions of the computing product.

In some examples, the market trend management computing module 1702 can calculate the market data of the computing product including calculating the market data based on the news articles. For example, the market trend management computing module 1702 calculates the market data to identify investments, research and developments, launches, focused market segments, and focused industries associated with the computing product.

In some examples, the market trend management computing module 1702 can calculate the financial data results of the computing product including calculating the financial data results based on the financial data. For example, the market trend management computing module 1702 calculates the market data to identify investments and research. For example, the market trend management computing module 1702 calculates the financial data results to identify computing products by type, segment, and industry to determine revenue generating computing products and degrowing computing products.

The market trend management computing module 1702 generates, using the market prediction model 1704, market trend data 1730. Specifically, the market trend management computing module 1702 generates, using the market prediction model 1704, market trend data 1730 associated with the computing product based on the product sentiment, market data, and financial data results associated with the computing product. Specifically, the market prediction model 1704 can be a pre-trained random forest regression model. The market trend management computing module 1702 generates, using the pre-trained random forest regression model, the market trend data 1730 associated with the computing product based on the product sentiment, market data, and financial data results associated with the computing product. The market prediction model 1704 can be trained on previously provided electronic documents 250. The market prediction model 1704 can be an ensemble of machine learning algorithms. For example, the market trend management computing module 1702, utilizing the market prediction model 1704, can determine product technical skewness (type of computing product) and overall market technical skewness (focused segments in industries).

The market trend management computing module 1702 can update the market prediction model 1704 based on the generated market trend data.

Figure 18:
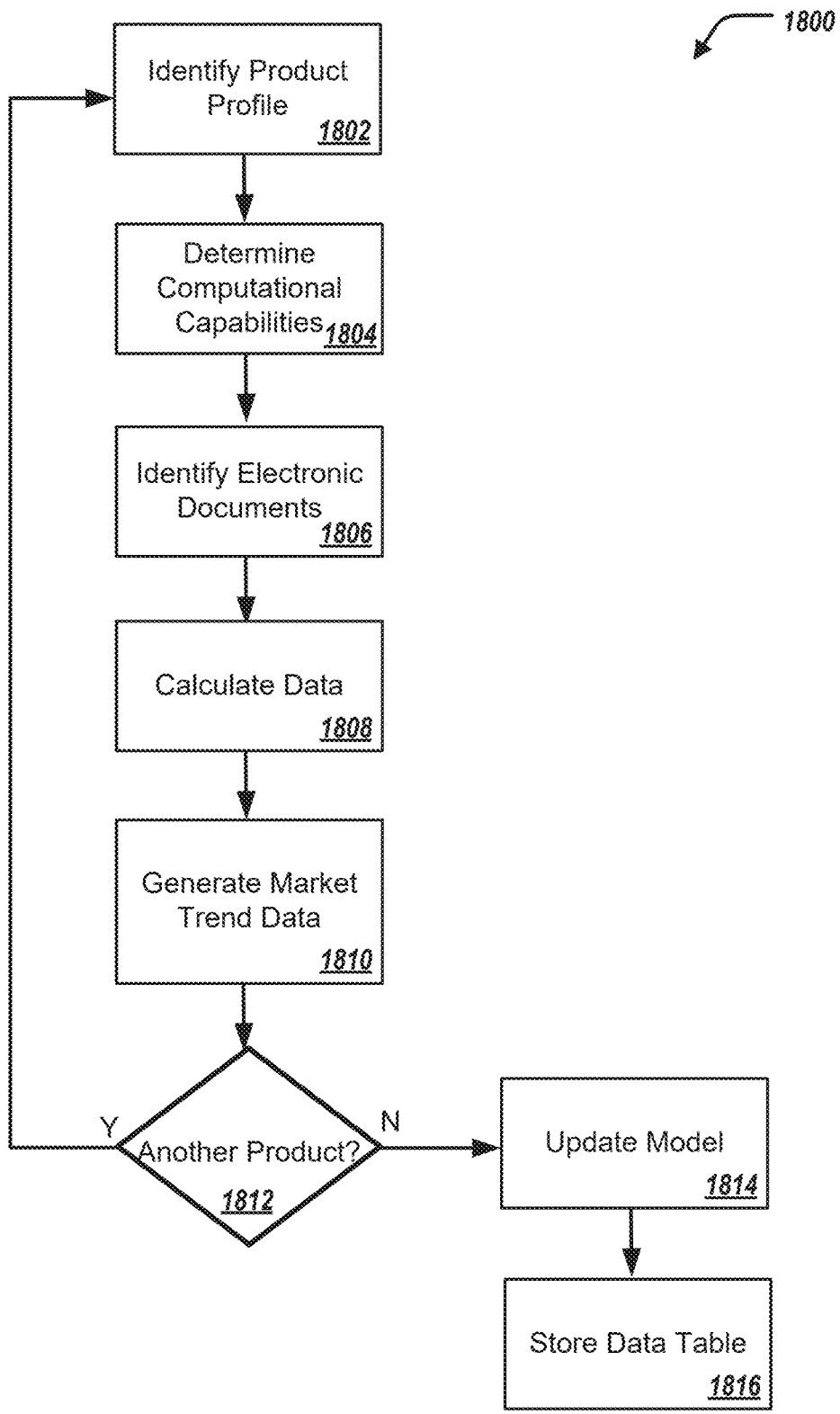
FIG. 18 illustrates a flowchart of a method for predicting market trends.

FIG. 18 illustrates a flowchart depicting selected elements of an embodiment of a method 1800 for predicting market trends. The method 1800 may be performed by the information handling system 100, the information handling system 201 and/or the market predictions computing module 220, and with reference to FIGS. 1, 2, and 17. It is noted that certain operations described in method 1800 may be optional or may be rearranged in different embodiments.

The market trend management computing module 1702 identifies, from the storage device 1706, a product profile 1720 of the computing product, at 1802. The product profile includes a list of a plurality of computing components associated with the computing product. The list of the plurality of computing components includes, for each computing component, a plurality of features of the computing component. The market trend management computing module 1702 determines, based on the product profile of the computing product, computational capabilities of the computing product, at 1804. The market trend management computing module 1702 identifies electronic documents 250 associated with the computing product, at 1806. The market trend management computing module 1702 calculates, based on the electronic documents 250, product sentiment, market data, and financial data results associated with the computing product, at 1808. The market trend management computing module 1702 generates, using the market prediction model 1704, market trend data associated with the computing products based on the product sentiment, market data, and financial data results associated with the computing product, at 1810. The market trend management computing module 1702 determines if there is another computing product to analyze, at 1812. If there is another computing product to analyze, the method returns to step 1802. If there is not another computing product to analyze, the market trend management computing module 1702 updates the market prediction model 1704 based on the generated market trend data, at 1814. The market trend management computing module 1702 stores the market trend data 1730 at the storage device, at 1816.

Product Learning Computing Module 222/"Generating Configurations of a Particular Computing Product"

Referring to FIG. 2, the product learning computing module 222 can perform self-learning product technical feasibility for generating configurations of computing products.

In short, the product learning computing module 222 utilizes product profiles (stored by the storage device 230) which use aggregate data to determine specific patterns in the data to determine dependencies and bottlenecks of each computing product. The product learning computing module 222, from these patterns and product profiles, calculates how to build the computing product, including different types of computing products and configurations that can be created out of a given set of requirements that consider constraints while constructing the computing product. The product learning computing module 222 can combine CV-assisted product analysis, product profiles, and maximum configuration determinations to calculate how to build a computing product based on technical dependencies, niche dependencies, etc. from the data gathered in the product profiles.

Figure 19:
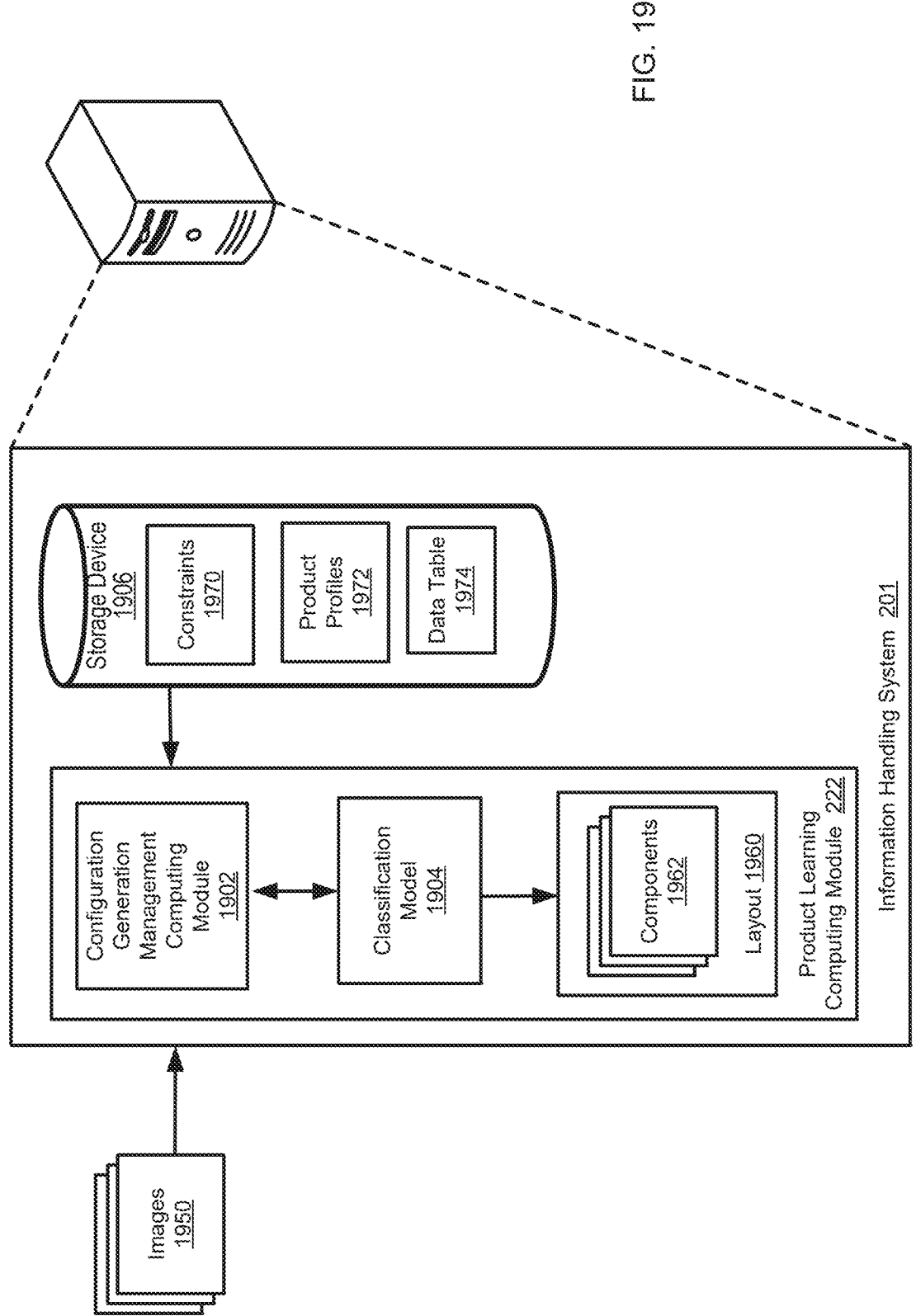
FIG. 19 illustrates a block diagram of the information handling system, and in particular, a product learning computing module of the information handling system.

FIG. 19 illustrates the information handling system 201, and specifically, the product learning computing module 222. Referring to FIGS. 2 and 19, the product learning computing module 222 can include a configuration generation management computing module 1902 and a classification model 1904.

The information handling system 201 can include a storage device 1906. The storage device 1906 can be the same as the storage device 230. The product learning computing module 222 can be in communication with the storage device 1706.

The product learning computing module 222 can receive images 1950 of a particular layout 1960 of a computing product. For example, the product learning computing module 222 can receive the images 1950 from electronic documents received over the Internet. For example, the product learning computing module 222 can obtain the images from a maintained database of images (e.g., stored at the storage device 1906). The images 1950 can include still images or videos.

The configuration generation management computing module 1902 analyzes the particular layout 1960. Specifically, the configuration generation management computing module 1902 analyzes the particular layout 1960 to identify the computing components 1962 of the computing product. In particular, the configuration generation management computing module 1902 segments, using the classification model 1904, the images 1950 to identify computing components 1962 of the layout 1960 of the computing product. The classification model 1904 can be previously trained on training images/data set. In some examples, the classification model 1904 is a user supervised model (such as Mask region-based convolutional neural network (Mask R-CNN with annotations for single class and multi class for bounding box and polygon)) that is trained on training images and training annotations.

For example, the configuration generation management computing module 1902 can receive a training set of images. The training set of images can be that of additional layouts of additional computing products. The configuration generation management computing module 1902 can train the classification model based on the training set of images, including generating rules for segmenting the training set of images to identify computing components of each of the layouts of the each of the additional computing products.

The computing product can include a third-party computing product, a server computing product, a third-party server computing product, an information handling system, or a third-party information handling system. For example, the computing components can include memory, hard drives, processors, server chassis, and the like.

Moreover, the configuration generation management computing module 1902 analyzes the particular layout 1960 to determine a thermal mapping of the computing product. In particular, the configuration generation management computing module 1902 determines a physical proximity of each computing component 1962 relative to each other computing component 1962. For example, the configuration generation computing module 1902 determines a spacing between each of the computing components 1962. The configuration generation management computing module 1902 determines, based on the proximity of the computing components 1962, thermal generation of each of the computing components 1962. That is, depending on the spacing of each of the computing components 1962, the computing components 1962 generate varying degrees of heat—e.g., two computing components 1962 in close proximity to one another may experience challenges in airflow path and heat removal. For example, a CPU and GPU (computing components) positioned physically proximate to one another (proximity) and one is downstream of the other (relative to airflow), the preheated air will reduce the downstream component's ability to dissipate heat.

The configuration generation management computing module 1902 can determine, based on the proximity of the computing components 1962 to one another and the thermal generation of each of the computing components 1962, a thermal mapping of the computing product. That is, the configuration generation management computing module 1902 can determine the thermal relationships between each of the computing components 1962 based on the proximity of the computing components 1962 to one another and the thermal generation of each of the computing components 1962. Specifically, the configuration generation management computing module 1902 can determine a thermal mapping of the computing component based on the proximity of the computing components 1962 to one another and the thermal generation of each of the computing components 1962.

The configuration generation management computing module 1902 identifies, from the storage device 1906, physical constraints 1970 associated with the computing components 1962 of the computing product. The physical constraints 1970 can include a positioning of the computing components 1962 on the layout 1960—e.g., positioning of the computing components 1962 on a particular side of the layout 1960. The physical constraints 1970 can include a relative positioning of the computing components 1962 to one another. The physical constraints 1970 can include a relative positioning of the computing components 1962 with respect to a cooling device of the computing product, such as a fan.

The configuration generation management computing module 1902 identifies, from the storage device 1906, a product profile 1972 of the computing product. The product profile can indicate, for each of the computing components 1962, features of the computing component. For example, the features can include, when the computing component is memory, a memory size (8 GB, 16 GB, 32 GB); and a number of memory sticks. For example, when the computing component is a hard drive, the features of the computing component can include a type of the hard drive, a size of the hard drive, and RPM of the hard drive.

The configuration generation management computing module 1902 can iteratively permutate, based on the physical constraints 1970 associated with the computing components 1962 of the computing product and the thermal mapping of the computing component, the layout 750 to define a plurality of permutated layouts of the computing product. The configuration generation management computing module 1902 can create a plurality of configurations of the computing components 1962 based on each of the combinations of the computing components while adhering to the physical constraints 1970 and in view of the thermal mapping of the computing components 1962. That is, the configuration generation management computing module 1902 creates all possible configurations of the computing components 1962 while adhering to the physical constraints 1970 and in view of the thermal mapping of the computing components 1962.

The configuration generation management computing module 1902 can iteratively permutate each of the permutated layouts of the computing product based on a plurality of combinations of features of each of the computing components 1962 of the layout 1960. The configuration generation management computing module 1902 can create a plurality of combinations of features of the computing components 1962 for each of the permutated layouts. That is, the component configuration computing module 504 creates all possible combinations of features of the computing components for each of the permutated layouts.

In some examples, the configuration generation management computing module 1902 iteratively permutates, based on the physical constraints 1970 associated with the computing components 1962 of the computing product and the thermal mapping of the computing component, the layout 750 to define a plurality of permutated layouts of the computing product and iteratively permutate each of the permutated layouts of the computing product based on a plurality of combinations of features of each of the computing components 1962 of the layout 1960 to determine a maximum configuration limitation of the computing product.

In some examples, the configuration generation management computing module 1902 identifies the maximum configuration of the computing product based on the data of the product profile 1972. Specifically, the maximum configuration determination computing module 206 determines the maximum configuration of the computing product, as described herein, and updates the storage device 230/1906 with the product profile reflective of such maximum configuration.

The configuration generation management computing module 1902 generates, for the computing product, a data table 1974 indicating each of the permutated layouts of the computing product and each combination of features of each of the computing components 1962 of each of the permutated layouts. The configuration generation management computing module 1902 can store the data table 1974 at the storage device 1906.

Figure 20:
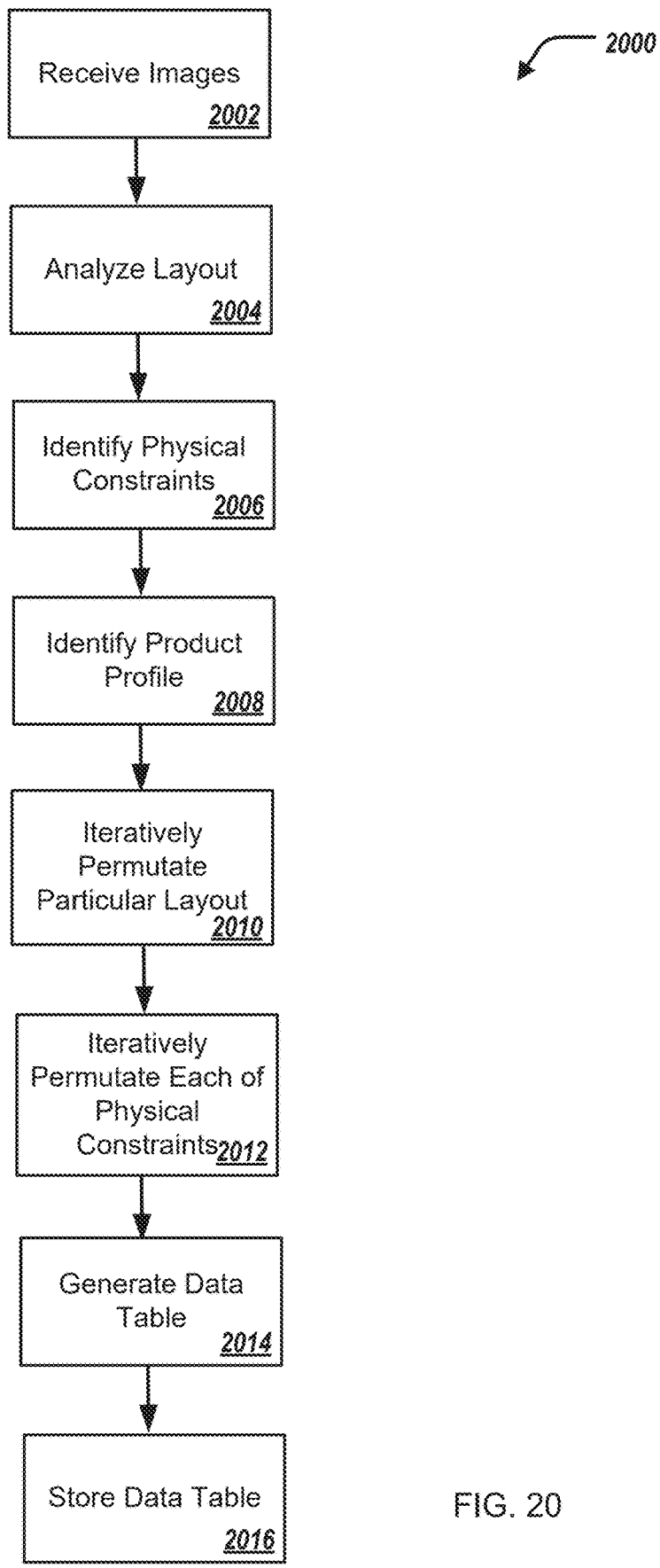
FIG. 20 illustrates a flowchart of a method generating configurations of a computing product.

FIG. 20 illustrates a flowchart depicting selected elements of an embodiment of a method 2000 for generating configurations of a computing product. The method 2000 may be performed by the information handling system 100, the information handling system 202 and/or the product learning computing module 222, and with reference to FIGS. 12 and 19. It is noted that certain operations described in method 2000 may be optional or may be rearranged in different embodiments.

The configuration generation management computing module 1902 receives the plurality of images 1950 of the layout 1960 of the computing product, at 2002. The configuration generation management computing module 1902 analyzes the particular layout 1960, including identifying computing components 1962 of the particular computing product and determining a thermal mapping of the particular computing product, at 2004. The configuration generation management computing module 1902 identifies, from the storage device 1906, physical constraints 1970 associated with the computing components 1962 of the particular computing product, at 2006. The configuration generation management computing module 1902 identifies, from the storage device 1906, a product profile 1972 of the particular computing product, at 2008. The product profile 1972 indicates, for each computing component 1962, a plurality of features of the computing component 1962. The configuration generation management computing module 1902 iteratively permutates, based on the physical constraints 1970 associated with the computing components 1962 of the particular computing product and the thermal mapping of the particular computing product, the particular layout 1960 to define a plurality of permutated layouts of the particular computing product, at 2010. The configuration generation management computing module 1902 iteratively permutates each of the plurality of permutated layouts of the particular computing product based on a plurality of combinations of features of each of the computing components 1962 of the particular layout 1960, at 2012. The configuration generation management computing module 1902 generates, for the particular computing component 1962, a data table 1974 indicating each of the plurality of permutated layouts of the particular computing product and each of the combinations of features of each of the computing components 1962 of each of the plurality of permutated layouts, at 2014. The configuration generation management computing module 1902 stores, at the storage device 1906, the data table 1974, at 2016.

In some examples, the configuration generation management computing module 1902 can generate configurations of the computing product based on received images of multiple differing layouts of the computing product, with each layout including a different combination of computing components. That is, for each layout of the computing product, the configuration generation management computing module identifies physical constraints associated with the computing components of each of the layouts of the computing product; identifies a product profile of the particular computing product; iteratively permutates, based on the physical constraints associated with the computing components of each of the layouts of the computing product, each of the layouts to define a plurality of permutated layouts of the particular computing product; iteratively permutates each of the plurality of permutated layouts of the particular computing product based on a plurality of combinations of features of each of the computing components of each of the layouts; and generates, for the particular computing component, a data table indicating each of the plurality of permutated layouts of the particular computing product and each of the combinations of features of each of the computing components of each of the plurality of permutated layouts.

Automated Product Planning Computing Module 224/"Generating Targeted Computing Products"

Referring to FIG. 2, the automated product planning computing module 224 can perform competitor investment prediction.

In short, the automated product planning computing module 224 can leverage product specification data as well as sentiment analysis across multiple computing products to determine features/technologies upon which a particular competitor may be focusing investment. The automated product planning computing module 224 can deduce advantageous product ideas that can fill market gaps. The automated product planning computing module 224 can consolidate insights generated on a computing product-by-computing product basis into broader competitor-by-competitor trends and extrapolate those trends.

Figure 21:
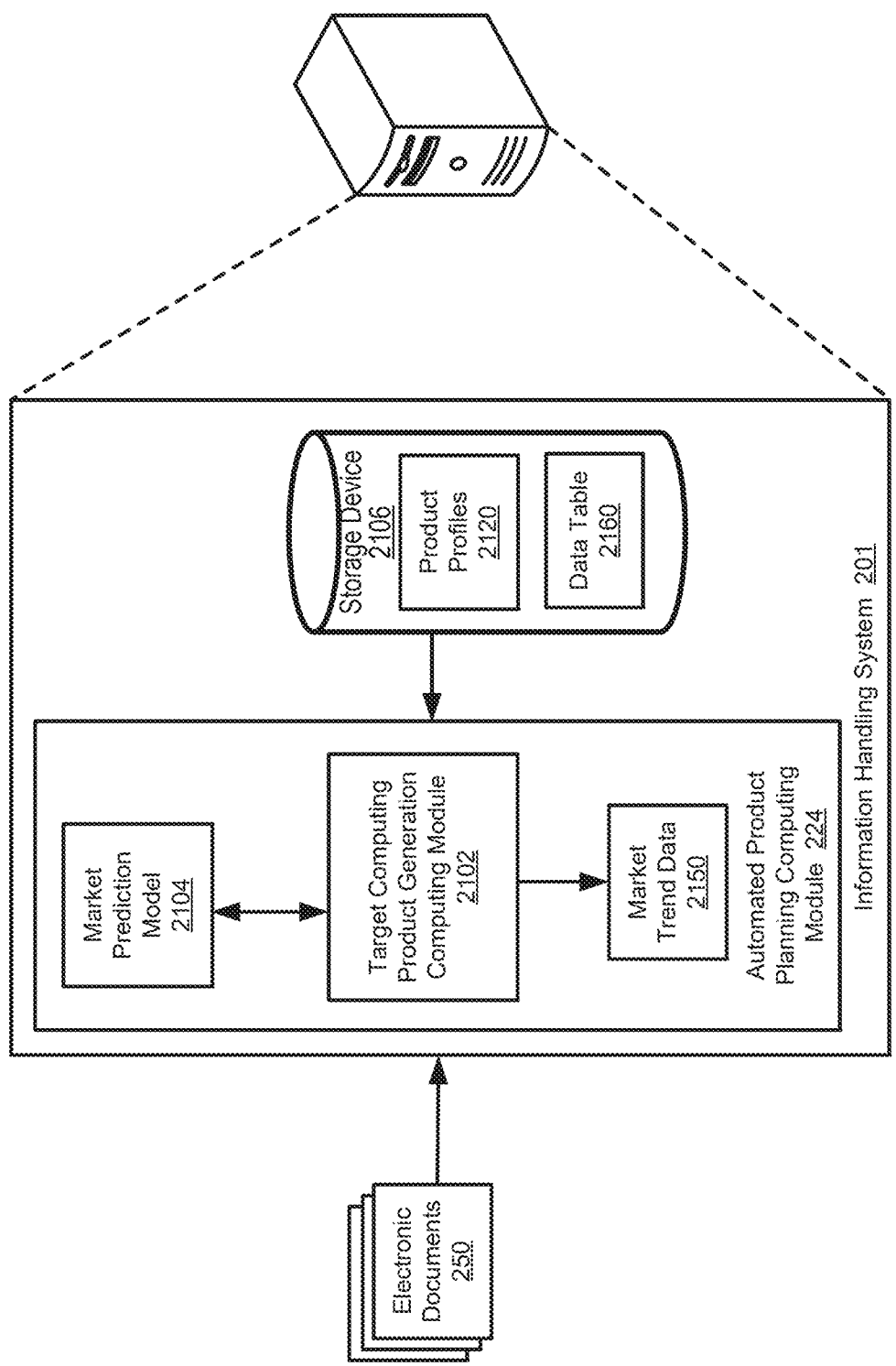
FIG. 21 illustrates a block diagram of the information handling system, and in particular, an automated product planning computing module of the information handling system.

FIG. 21 illustrates the information handling system 201, and specifically, the automated product planning computing module 224. Referring to FIGS. 2 and 21, the automated product planning computing module 224 can include a target computing product generation computing module 2102 and a market prediction model 2104.

The information handling system 201 can include a storage device 2106. The storage device 2106 can be the same as the storage device 230. The automated product planning computing module 224 can be in communication with the storage device 2106.

In some examples, the automated product planning computing module 224 generates, using the market prediction model 2104, market trend data 2150 associated with the computing products. For example, the computing products can include a third-party computing product, a server computing product, a third-party server computing product, an information handling system, or a third-party information handling system.

In short, the target computing product generation computing module 2102 identifies, from the storage device 2106, a product profile 2120 of the computing product. The product profile includes a list of a plurality of computing components associated with the computing product. The list of the plurality of computing components includes, for each computing component, a plurality of features of the computing component. The target computing product generation computing module 2102 determines, based on the product profile of the computing product, computational capabilities of the computing product. The target computing product generation computing module 2102 identifies electronic documents 250 associated with the computing product. The target computing product generation computing module 2102 calculates, based on the electronic documents 250, product sentiment, market data, and financial data results associated with the computing product. The target computing product generation computing module 2102 generates, using the market prediction model 2104, market trend data 2150 associated with the computing products based on the product sentiment, market data, and financial data results associated with the computing product.

In some examples, the data from the electronic documents 250 can be pre-processed, filtered, and analyzed prior to receipt by the automated product planning computing module 224. For example, the data from the electronic documents 250 can be pre-processed, filtered, and analyzed prior by the market predictions computing module 220, as described further herein. In some examples, the automated product planning computing module 224 can receive the market trend data 2150 from the market predictions computing module 220.

The target computing product generation computing module 2102 compares the market trend data 2150 with the product profiles 2120 of each of the computing products. The target computing product generation computing module 2102 identifies, based on the comparing, target computing components and target features of the market trend data 2150 absent from the product profiles 2120 of the computing products.

For example, the target computing components can include such commodities as memory, hard drives, processors, server chassis, and the like. For example, when the computing component is memory, the target features of the target computing component can include a memory size (8 GB, 16 GB, 32 GB); and a number of memory sticks. For example, when the target computing component is a hard drive, the target features of the computing component can include a type of the hard drive, a size of the hard drive, and RPM of the hard drive.

The target computing product generation computing module 2102 can iteratively generate a plurality of layouts of the targeted computing product based on the target computing products. The target computing product generation computing module 2102 can create a plurality of combinations of the target computing components for each of the layouts of the targeted computing product. That is, the target computing product generation computing module 2102 creates all possible combinations of the target computing components to generate the layouts.

The target computing product generation computing module 2102 can iteratively permutate each of the layouts of the targeted computing product. Specifically, the target computing product generation computing module 2102 can iteratively permutate each of the layouts of the targeted computing product based on a plurality of combinations of the target features of each of the target components of each of the plurality of layouts. The target computing product generation computing module 2102 can create a plurality of configurations of the target computing components based on each of the combinations of target features of each of the target computing components. That is, the target computing product generation computing module 2102 creates all possible configurations of the target computing components based on each of the combinations of target features of each of the target computing components.

In some examples, the target computing product generation computing module 2102 receives data indicating the permutated layouts of the targeted computing product from the product learning computing module 222. That is, as mentioned herein, the product learning computing module 222 can i) iteratively generate a plurality of layouts of the targeted computing product based on the target computing products and ii) iteratively permutate each of the layouts of the targeted computing product based on a plurality of combinations of the target features of each of the target components of each of the plurality of layouts, and provide data indicating such to the target computing product generation computing module 2102.

The target computing product generation computing module 2102 generates, for the targeted computing product, a data table 2160 indicating each of the permutated layouts and each combination of target features of each of the target computing components of each of the permutated layouts. The target computing product generation computing module 2102 can store the data table 2160 at the storage device 2106.

In some examples, for each computing product, the target computing product generation computing module 2102 can identify, from the storage device 2106, the product profile 2120 of the target computing product. Further, the product profile 2120 can include a list of target computing components associated with the target computing product. Further, the list of target computing components can include, for each target computing component, target features of the target computing component. The target computing product generation computing module 2102 can determine computational capabilities of the target computing product. Specifically, the target computing product generation computing module 2102 can determine the computational capabilities of the computing product based on the product profile 2120 of the computing product. The computational capabilities can include processing capabilities, memory capabilities, workload capabilities, and the like. The target computing product generation computing module 2102 can identify the electronic documents 250 associated with the target computing product. The electronic documents 250 can include content such as product review blogs, videos, and website data. The electronic documents 250 can include data indicating promotional material, videos, text translation of videos, customer reviews, and the like. The target computing product generation computing module 2102 generates, using the market prediction model 2104, the market trend data 2150 associated with the computing products based on the computational capabilities of each of the computing products and the electronic documents 250 associated with each of the computing products.

In some examples, for each computing product, the target computing product generation computing module 2102 calculates, based on the electronic documents 250, the product sentiment, the market data, and the financial data results associated with the computing component. In some examples, the target computing product generation computing module 2102 can calculate the product sentiment of the computing product based on the reviews, blogs, videos, and website data of the computing products. Furthermore, the target computing product generation computing module 2102 can calculate the product sentiment of the computing product based on a ratio of positive sentiment mentions of texts of the review, blogs, videos, and website data of the computing product to negative sentiment mentions of texts of the review, blogs, videos, and website data of the computing products. For example, the target computing product generation computing module 2102 calculates the product sentiment as an existing overall product sentiment regarding negative and positive sentiment mentions of the computing product. The target computing product generation computing module 2102 generates, using the market prediction model 2104, the market trend data 2150. Specifically, the target computing product generation computing module 2102 generates, using the market prediction model 2104, market trend data 2150 associated with the computing product based on the product sentiment, market data, and financial data results associated with the computing product. Specifically, the market prediction model 2104 can be a pre-trained random forest regression model. The target computing product generation computing module 2102 generates, using the pre-trained random forest regression model, the market trend data 2150 associated with the computing product based on the product sentiment, market data, and financial data results associated with the computing product. The market prediction model 2104 can be trained on previously provided electronic documents 250. The market prediction model 2150 can be an ensemble of machine learning algorithms.

In some examples, the target computing product generation computing module 2102 identifies, from the storage device 2106, physical constraints associated with the target computing components of the computing product. The physical constraints can include a positioning of the target computing components on the layout—e.g., positioning of the target computing components on a particular side of the layout. The physical constraints can include a relative positioning of the target computing components to one another. The physical constraints can include a relative positioning of the target computing components with respect to a cooling device of the computing product, such as a fan. The target computing product generation computing module 2102 can iteratively generate, based on the physical constraints associated with the target computing components of the computing product, a plurality of layouts of the targeted computing product. The target computing product generation computing module 2102 can create a plurality of configurations of the target computing components based on each of the combinations of the target computing components while adhering to the physical constraints. That is, the target computing product generation computing module 2102 creates all possible configurations of the target computing components while adhering to the physical constraints.

In some examples, the target computing product generation computing module 2102 can generate layouts of the combinations of target features of each of the target components of each respective layout of the targeted computing product.

Figure 22:
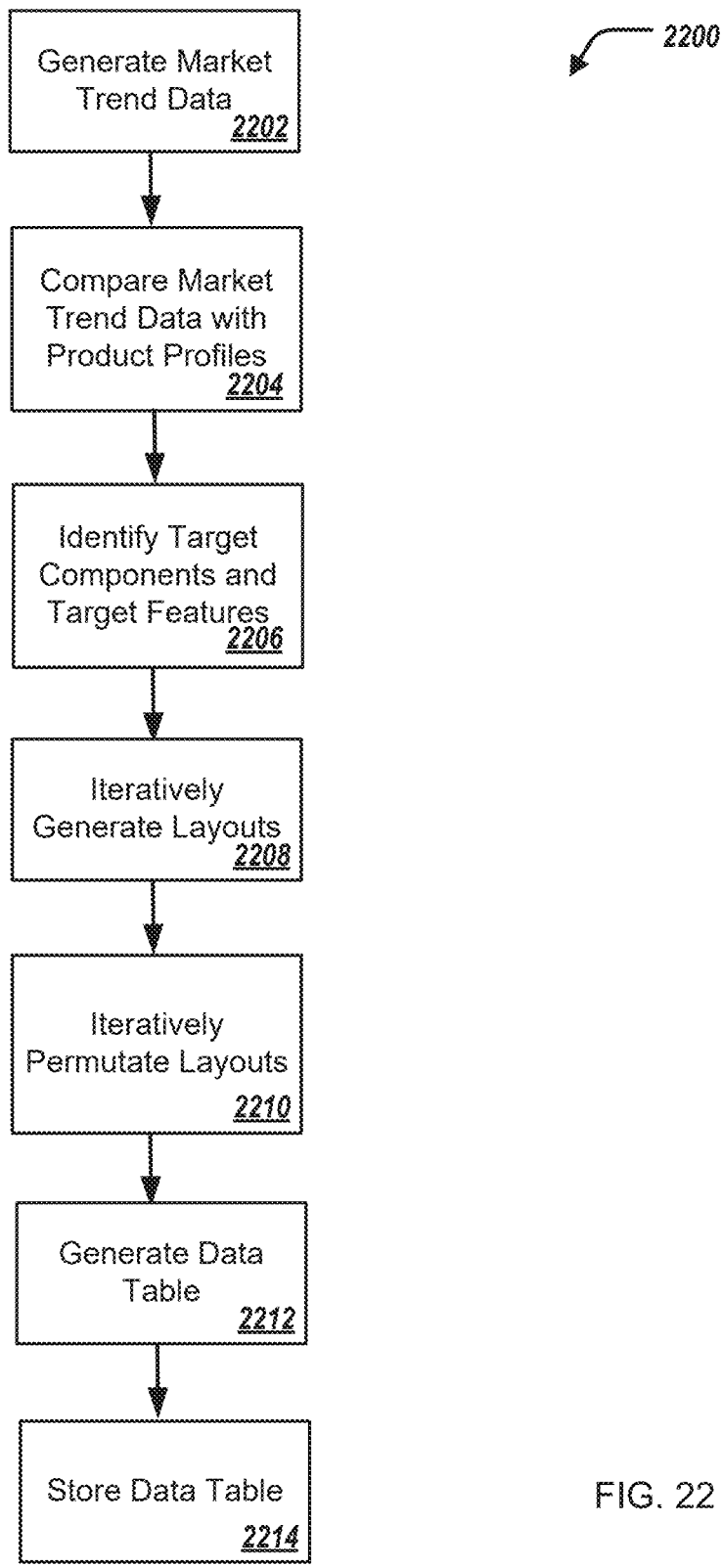
FIG. 22 illustrates a flowchart of a method for generated targeted computing products.

FIG. 22 illustrates a flowchart depicting selected elements of an embodiment of a method 2200 for generating targeted computing products. The method 2200 may be performed by the information handling system 100, the information handling system 201 and/or the automated product planning computing module 224, and with reference to FIGS. 1, 2, and 21. It is noted that certain operations described in method 2200 may be optional or may be rearranged in different embodiments.

The target computing product generation computing module 2102 generates, using the market prediction model 2104, the market trend data 2150 associated with the computing products, at 2202. The target computing product generation computing module 2102 compares the market trend data 2150 with the product profiles 2120 of each of the computing products, at 2204. The target computing product generation computing module 2102 identifies, based on the comparing, target computing components and target features of the market trend data 2150 absent from the product profiles 2120 of the computing products, at 2206. The target computing product generation computing module 2102 iteratively generates, based on the target computing components, a plurality of layouts of a targeted computing product, at 2208. The target computing product generation computing module 2102 iteratively permutates each of the plurality of layouts of the targeted computing product based on a plurality of combinations of the target features of each of the target computing components of each of the plurality of layouts, at 2210. The target computing product generation computing module 2102 generates, for the targeted computing product, a data table 2160 indicating each of the plurality of permutated layouts and each of the combinations of the target features of each of the target computing components of each of the plurality of permutated layouts, at 2212. The target computing product generation computing module 2102 stores, at the storage device 2106, the data table 2160, at 2214.

Smart Product Search Computing Module 226/"Identifying Search Terms for an Electronic Document"

Referring to FIG. 2, the smart product search computing module 226 can automatically search for missing niches/computing products in the market.

In short, the smart product search computing module 226 can identify search terms for an electronic document search engine. The smart product search computing module 226 can utilize automated product planning to expand a product database by identifying market niches not present in a current database and searching for new products and competitors. If the market niche is unfilled, the smart product search computing module 226 can suggest a new computing product with computing components and features to include. That is, the smart product search computing module 226 can find and fill gaps in the market by creating a new computing product profile that satisfies the market niche. The smart product search computing module 226 aggregates competitor investment prediction and automated product planning to identify types of products to search, and new products or niches to suggest based on the search results and market planning feature.

Figure 23:
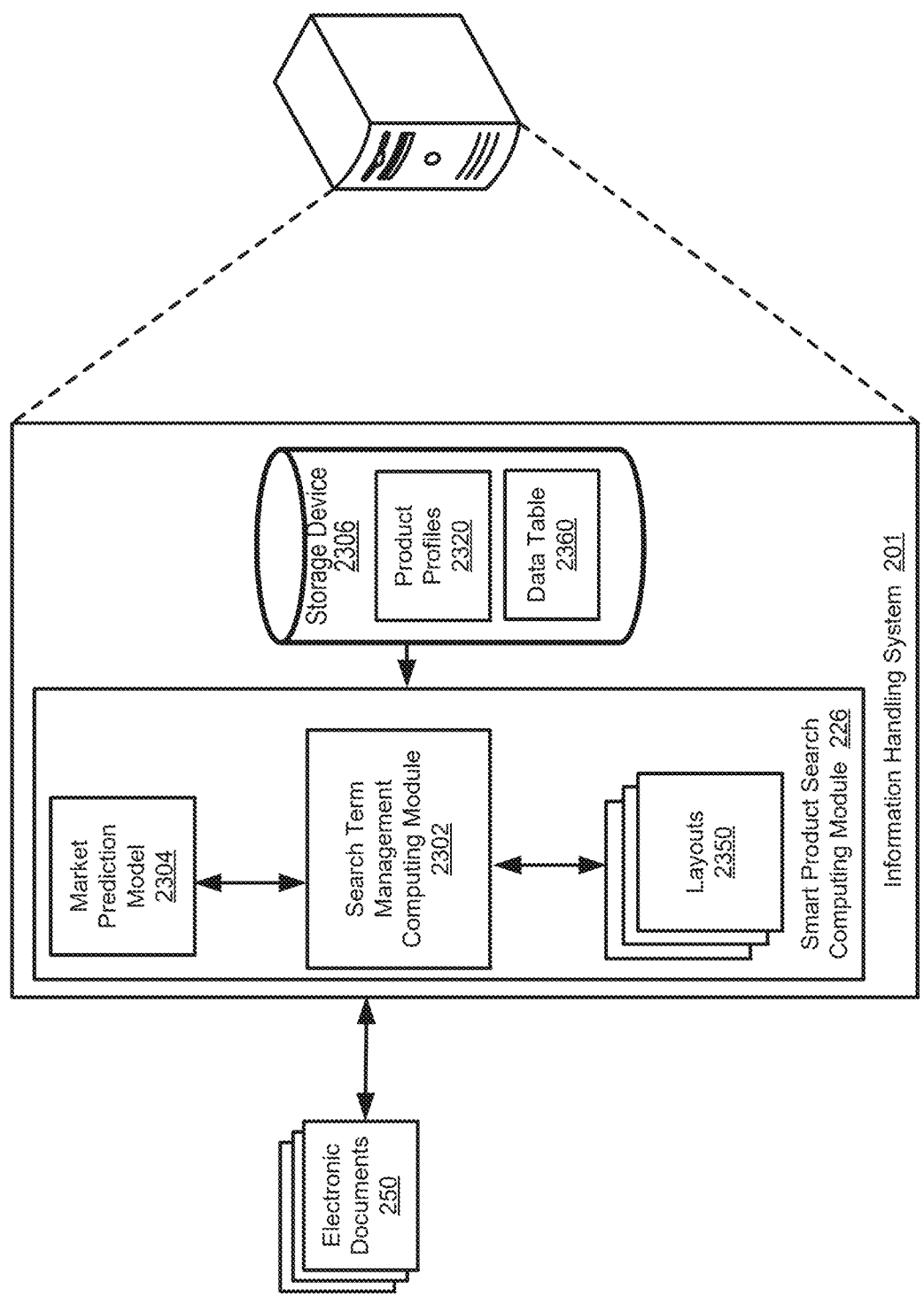
FIG. 23 illustrates a block diagram of the information handling system, and in particular, a smart product search computing module of the information handling system.

FIG. 23 illustrates the information handling system 201, and specifically, the smart product search computing module 226. Referring to FIGS. 2 and 23, the smart product search computing module 226 can include a search term management computing module 2302 and a market prediction model 2304.

The information handling system 201 can include a storage device 2306. The storage device 2306 can be the same as the storage device 230. The smart product search computing module 226 can be in communication with the storage device 2306.

The search term management computing module 2302 generates, using the market prediction model 2304, market trend data associated with the computing products. The search term management computing module 2302 generates the market trend data as a competitor investment prediction of focused segments, products, and industries where competitors are planning an investment or invested recently.

The computing products can include a third-party computing product, a server computing product, a third-party server computing product, an information handling system, or a third-party information handling system.

In short, the search term management computing module 2302 identifies, from the storage device 2306, a product profile 2320 associated with each of the computing products. The product profile includes a list of a plurality of computing components associated with the computing product. The list of the plurality of computing components includes, for each computing component, a plurality of features of the computing component. The search term management computing module 2302 determines, based on the product profile of the computing product, computational capabilities of each computing product. The search term management computing module 2302 identifies electronic documents 250 associated with the computing products. The search term management computing module 2302 calculates, based on the electronic documents 250, product sentiment, market data, and financial data results associated with the computing products. The search term management computing module 2302 generates, using the market prediction model 2304, market trend data associated with the computing products based on the product sentiment, market data, and financial data results associated with each computing product.

In some examples, the data from the electronic documents 250 can be pre-processed, filtered, and analyzed prior to receipt by the search term management computing module 2302. For example, the data from the electronic documents 250 can be pre-processed, filtered, and analyzed prior by the market predictions computing module 220, as described further herein. In some examples, the search term management computing module 2302 can receive the market trend data from the market predictions computing module 220, and/or the storage device 230.

In some examples, for each computing product, the search term management computing module 2302 calculates, based on the electronic documents 250, the product sentiment, the market data, and the financial data results associated with the computing component. In some examples, the search term management computing module 2302 can calculate the product sentiment of the computing product based on the reviews, blogs, videos, and website data of the computing products. Furthermore, the search term management computing module 2302 can calculate the product sentiment of the computing product based on a ratio of positive sentiment mentions of texts of the reviews, blogs, videos, and website data of the computing product to negative sentiment mentions of texts of the reviews, blogs, videos, and website data of the computing products. For example, the search term management computing module 2302 calculates the product sentiment as an existing overall product sentiment regarding negative and positive sentiment mentions of the computing product. The search term management computing module 2302 generates, using the market prediction model 2304, the market trend data 2150. Specifically, the target computing product generation computing module 2102 generates, using the market prediction model 2304, market trend data associated with the computing product based on the product sentiment, market data, and financial data results associated with the computing product. Specifically, the market prediction model 2304 can be a pre-trained random forest regression model. The search term management computing module 2302 generates, using the pre-trained random forest regression model, the market trend data associated with the computing product based on the product sentiment, market data, and financial data results associated with the computing product. The market prediction model 2304 can be trained on previously provided electronic documents 250. The market prediction model 2304 can be an ensemble of machine learning algorithms.

The search term management computing module 2302 compares the market trend data with the product profiles 2320 of each of the computing products. The search term management computing module 2302 identifies, based on the comparing, target computing components and target features of the market trend data absent from the product profiles 2320 of the computing products.

For example, the target computing components can include such commodities as memory, hard drives, processors, server chassis, and the like. For example, when the computing component is memory, the target features of the target computing component can include a memory size (8 GB, 16 GB, 32 GB); and a number of memory sticks. For example, when the target computing component is a hard drive, the target features of the computing component can include a type of the hard drive, a size of the hard drive, and RPM of the hard drive.

For one or more of the targeted computing products, the search term management computing module 2302 can iteratively generate a plurality of layouts 2350 of the targeted computing product based on the target computing products. The search term management computing module 2302 can create a plurality of combinations of the target computing components for each of the layouts 2350 of the targeted computing product. That is, the search term management computing module 2302 creates all possible combinations of the target computing components to generate the layouts 2350.

In some examples, for one or more of the targeted computing products, the search term management computing module 2302 can iteratively permutate each of the layouts 2350 of the targeted computing product. Specifically, the search term management computing module 2302 can iteratively permutate each of the layouts 2350 of the targeted computing product based on a plurality of combinations of the target features of each of the target components of each of the plurality of layouts 2350. The search term management computing module 2302 can create a plurality of configurations of the target computing components based on each of the combinations of target features of each of the target computing components. That is, the search term management computing module 2302 creates all possible configurations of the target computing components based on each of the combinations of target features of each of the target computing components.

In some examples, for each computing product, the search term management computing module 2302 can identify, from the storage device 2306, the product profile 2320 of the target computing product. Further, the product profile 2320 can include a list of computing components associated with the computing product. Further, the list of computing components can include, for each computing component, features of the computing component.

For each computing product, the search term management computing module 2302 compares the product profile 2320 of the computing product with each of the plurality of permutated layouts of the targeted computing product (layouts of the computing components of the computing product). The search term management computing module 2302 identifies, based on the comparing, a particular permutated layout that has a greatest difference in similarity (or similarity score) with the computing product. The similarity (or similarity score) can be based on commonalities between the particular permutated layout and the computing product, such as similarity in computing components, features of the computing components, and layouts.

The search term management computing module 2302 stores, for each computing product, a data table 2360 indicating the particular permutated layout with respect to the computing product at the storage device 2306.

In some examples, the search term management computing module 2302 generates search terms based on the particular permutated layouts for each of the computing products. The smart product search computing module 226 can provide such search terms to the dynamic web crawling computing module 204. Specifically, the dynamic web crawling computing module 204 can utilize such search terms as the self-learning web crawler dynamically seeks and gathers the data from the electronic documents 250.

In some examples, the search term management computing module 2302 determines, for each of the permutated layouts of the targeted computing product, a predicted workload of the targeted computing product. The predicated workload of the targeted computing product can include a predicted computational workload of the targeted computing product, a memory read/write workload of the predicted computing product, and the like. Additionally, the search term management computing module 2302 determines, for each of the computing products, a predicted workload of the computing product. The predicated workload of the computing product can include a predicted computational workload of the computing product, a memory read/write workload of the computing product, and the like. Furthermore, the search term management computing module 2302, for each of the computing products, compares, for each of the permutated layouts of the targeted computing product, the predicted workload of the targeted computing product with the predicted workload of the computing product. The search term management computing module 2302 identifies, based on the comparing, the particular permutated layout that has a greatest difference in predicted workload with the computing product.

Figure 24:
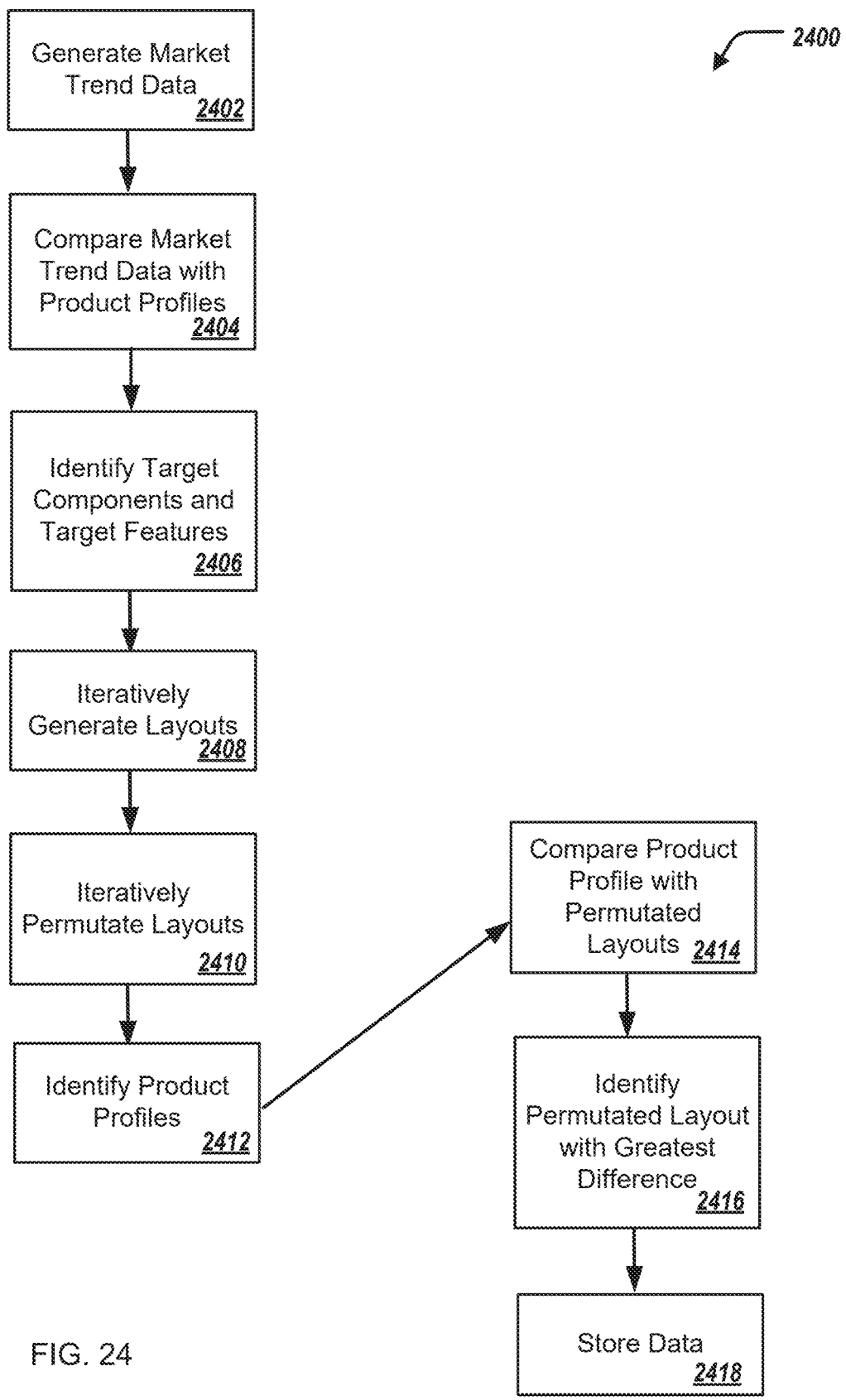
FIG. 24 illustrates a flowchart of a method for identifying search terms for an electronic document search engine.

FIG. 24 illustrates a flowchart depicting selected elements of an embodiment of a method 2400 for identifying search terms for an electronic document search engine. The method 2400 may be performed by the information handling system 100, the information handling system 201 and/or the smart product search computing module 226, and with reference to FIGS. 1, 2, and 23. It is noted that certain operations described in method 2400 may be optional or may be rearranged in different embodiments.

The search term management computing module 2302 generates, using the market prediction model 2304, market trend data associated with computing products, at 2402. The search term management computing module 2302 compares the market trend data with the product profiles 2230 of each of the computing products, at 2404. The search term management computing module 2302 identifies, based on the comparing, target computing components and target features of the market trend data absent from the product profiles 2320 of the computing products, at 2406. The search term management computing module 2302, for one or more targeted computing products, iteratively generates, based on the target computing components, a plurality of layouts 2350 of the targeted computing products, at 2408. The search term management computing module 2302, for one or more targeted computing products, iteratively permutates each of the plurality of layouts 2350 of the targeted computing product based on a plurality of combinations of the target features of each of the target computing components of each of the plurality of layouts 2350, at 2410. The search term management computing module 2302 identifies, from the storage device 2306, a respective product profile 2320 of the computing products, including a list of a plurality of computing components associated with the computing products, wherein the list of the plurality of computing components includes, for each computing component, a plurality of features of the computing component, at 2412. The search term management computing module 2302, for each computing product, compares the product profile 2320 of the computing product with each of the plurality of permutated layouts of a targeted computing product of the one or more targeted computing products, at 2414. The search term management computing module 2302 identifies, for each computing product and based on the comparing, a particular permutated layout that has a greatest difference in similarity score with the computing product, at 2416. The search term management computing module 2302, for each computing product, stores, at the storage device 2306, the table 2360 indicating the particular permutated layout with respect to the computing product, at 2418.

Inverse Product Lookup Computing Module 228/"Identifying Computing Products from a Search Query"

Referring to FIG. 2, the inverse product lookup computing module 228 can identify computing products that match with search criteria.

In short, the inverse product lookup computing module 228 can provide an output (find a particular set of products) for a given input (product specifications). The products can include server computing devices. The inverse product lookup computing module 228 can provide a unique solution-driven perspective (and, in some examples, identify applications for computing products traditionally implemented for other uses). The inverse product lookup computing module 228 can compare specification requirements to computing product solutions, and further takes a solution from one computing product and applies it to a computing product in another market. The inverse product lookup computing module 228 can utilize similarities and differences of specifications between computing products and apply inverse product look up to yield insights for an application of a computing product outside of its traditional uses to impact the perceived market segments.

Figure 25:
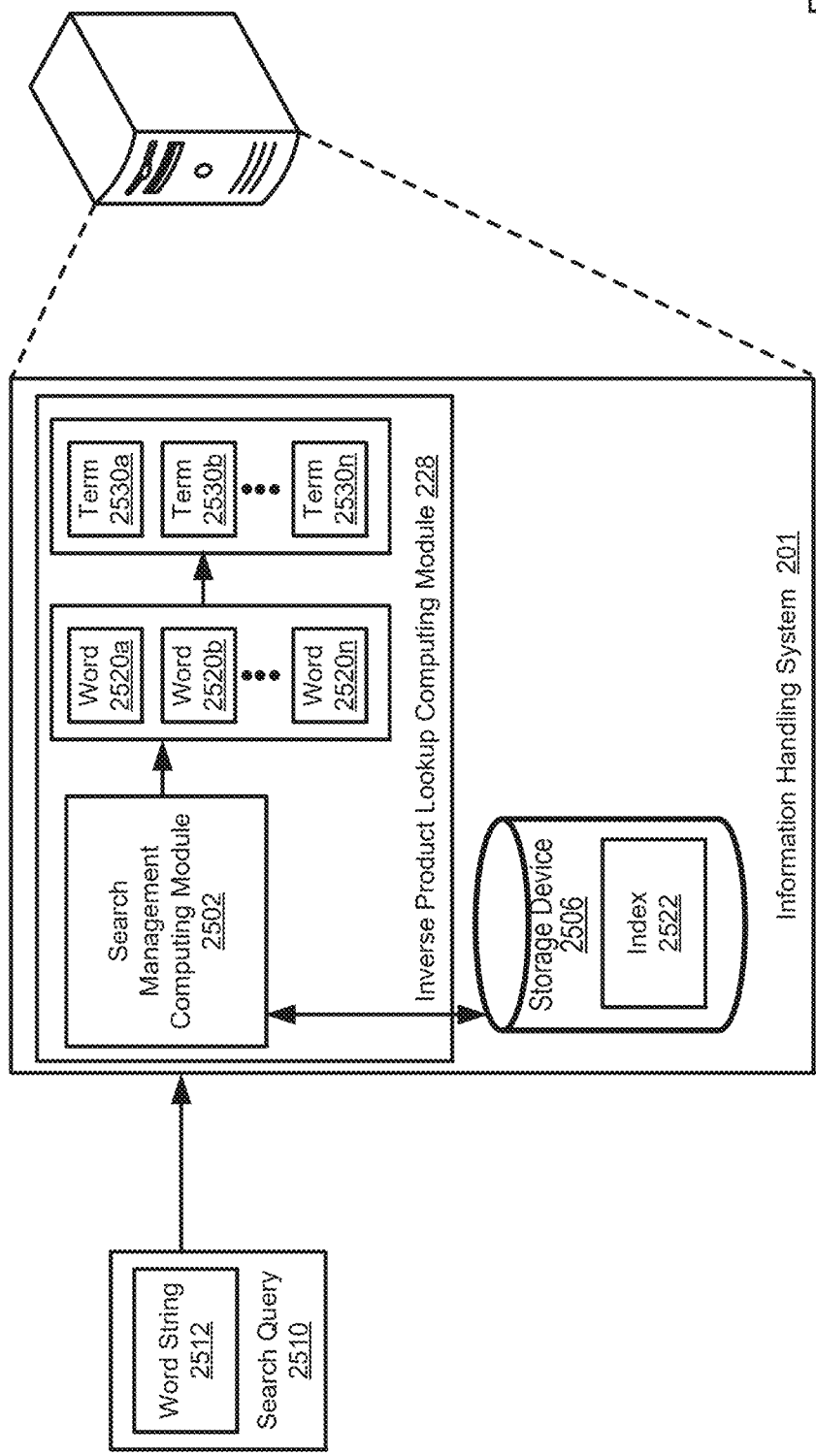
FIG. 25 illustrates a block diagram of the information handling system, and in particular, an inverse product lookup computing module of the information handling system.

FIG. 25 illustrates the information handling system 201, and specifically, the inverse product lookup computing module 228. Referring to FIGS. 2 and 25, the inverse product look up computing module 228 can include a search management computing module 2502.

The information handling system 201 can include a storage device 2506. The storage device 2506 can be the same as the storage device 230. The inverse product lookup computing module 228 can be in communication with the storage device 2506.

The inverse product lookup computing module 228 receives a search query 2510. The search query 2510 can include a word string 2512. In some examples, the search query 2510 includes a feature of a computing component—e.g., "SQL 64 GB" or "64 GB." In some examples, the search query includes a random text search.

In some examples, the inverse product lookup computing module 228 can additionally receive data from the automated product planning computing module 224. For example, the inverse product lookup computing module 228 can receive data indicating targeted computing products, including data indicating each permutated layout and each combination of the target features of each of the target computing components of each of the permutated layouts.

In some examples, the search management computing module 2502 can analyze the search query 2510 to determine that the word string 2512 does not refer to a particular computing product. The search management computing module 2502 can, in response to determining that the word string 2512 does not refer to a particular computing product, identify words 2520*a*, 2520*b*, . . . , 2520*n* (collectively referred to as words 2520) of the word string 2512. The search management computing module 2502 can identify, from an index 2522 stored at the storage device 2506, a plurality of computing components based on the words 2520 of the word string 2512.

The search management computing module 2502 can generate a plurality of search terms 2530. Specifically, the search management computing module 2502 generates the search terms 2530 based on a differing combination of the computing components and a word 2520 of the word string 2512. In some examples, the search management computing module 2502 can generate the search terms 2530 including, for each identified computing component, and for each word 2520 of the word string 2512, concatenating the identified computing component with the word 2520 to generate the search term 2530. In some examples, the search management computing module 2502 can generate the search terms 2530 including, for each identified computing component, and for each word 2520 of the word string 2512, concatenating the identified computing component with the combination of words to generate the search term 2530.

The search management computing module 2502 can identify, from the index 2522, computing products based on the search terms 2530. In other words, the search management computing module 2502 can search the index 2522 by computing product (commodity) as opposed to searching the entire index 2522. In some examples, the search management computing module 2502 can analyze the search query 2510 to determine that the word string 2512 does refer to a particular computing product. The search management computing module 2502 can, in response to determining that the word string 2512 does refer to a particular computing product, identify, from the index 2522, computing products associated with the particular computing product.

In some examples, the search management computing module 1502 provides the search terms 2530 to the indexing computing module 229 for indexing.

Figure 26:
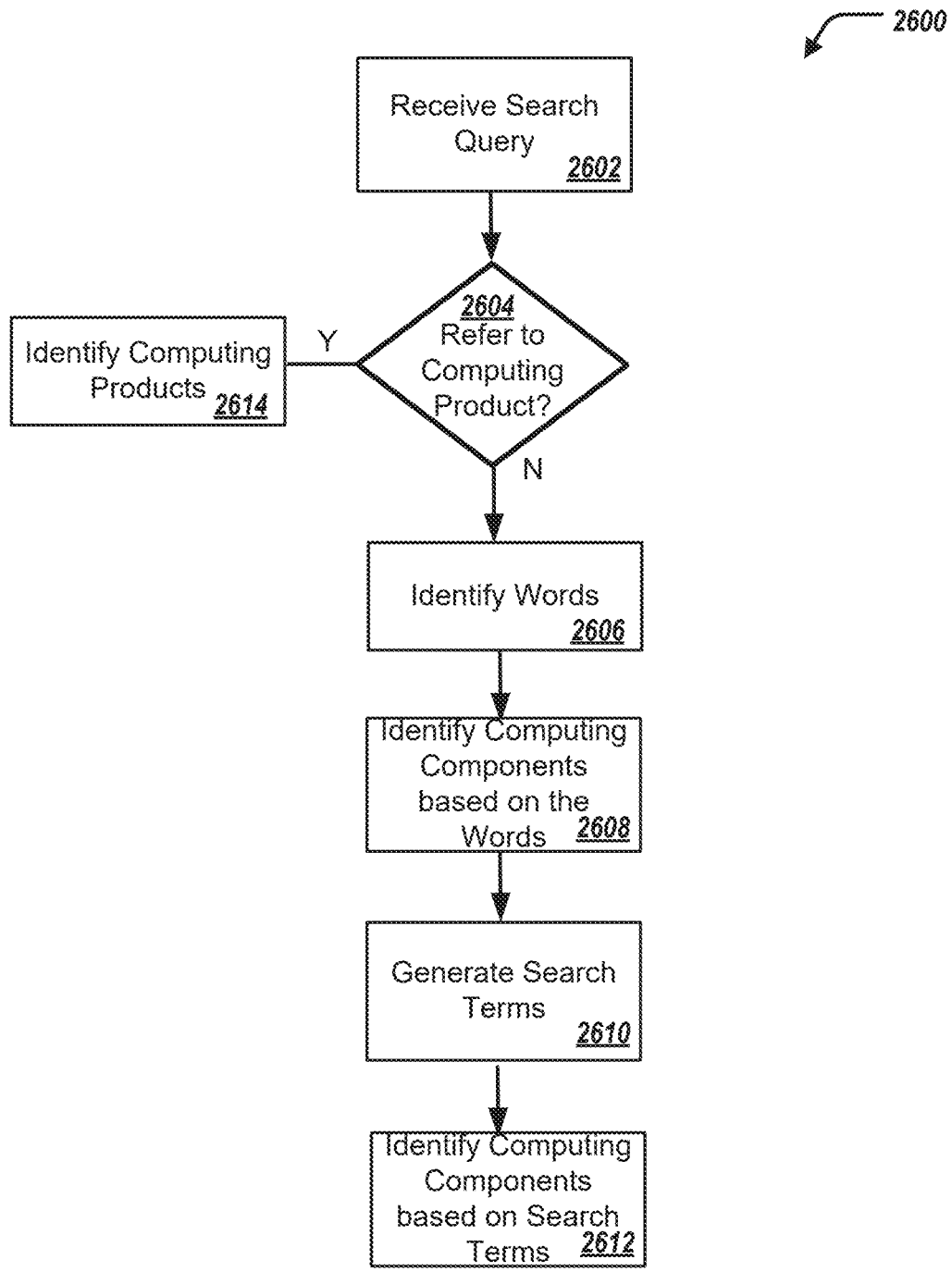
FIG. 26 illustrates a method for identifying computing products.

FIG. 26 illustrates a flowchart depicting selected elements of an embodiment of a method 2600 for identify computing products. The method 2600 may be performed by the information handling system 100, the information handling system 202 and/or the inverse product lookup computing module 228, and with reference to FIGS. 1, 2, and 25. It is noted that certain operations described in method 2600 may be optional or may be rearranged in different embodiments.

The search management computing module 2502 receives the search query 2510 including a word string 2512, at 2602. The search management computing module 2502 analyzes the search query 2510 to determine whether the search query 2510 refers to a particular computing product, at 2604. The search management computing module 2502 determines that the word string 2512 does not refer to a particular computing product, and in response identifies words 2520 of the word string 2512, at 2606. The search management computing module 2502 identifies, from the index 2522, a plurality of computing components based on the words 2520 of the word string 2512, at 2608. The search management computing module 2502 generates a plurality of search terms 2530, at 2610. Each search term 2530 is based on a differing combination of one or more computing components of the plurality of computing components and a word 2520 of the words of the word string 2512, at 2610. The search management computing module 2502 identifies, from the index 2522, one or more computing products based on the plurality of search terms 2530, at 2612. The search management computing module 2502 determines that the word string 2512 does refer to a particular computing product, at 2516, and in response, identifies computing products associated with the particular computing product, at 2614.

Front End 250/"Identifying Computing Products from a Search Query"

Referring to FIG. 2, the front end 250 can provide for display, provide data for an electronic document, or provide data for an application programming interface (API).

The front end 250 can receive data from the smart product search computing module 226 (such as data indicating/indexing, for computing products, configurations of target computing components based on combinations of target features of the target computing components); data from the automated product planning computing module 224 (such as data indicating/indexing permutated layouts of a computing product and each combination of target features of each target computing component of each of the layouts); and data from the inverse product lookup computing module 228 (such as data indicating/indexing search terms). The front end 250 can provide any portion or combination of such data for display (e.g., at a user interface of a display device), for an electronic document accessible over a network, or for an application programming interface (API).

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

What is claimed is:

1. A computer-implemented method of crawling electronic documents, including:
    training, at a first time, an electronic document crawling model based on a first set of electronic documents, including:
        for each electronic document of the first set of electronic documents:
            obtaining the electronic document including obtaining an entirety of HyperText Markup Language (HTML) of the electronic document;
            analyzing a copy of the electronic document, including:
                identifying a plurality of elements of the electronic document, each element of the plurality of elements including HTML tags, text associated with the HTML tags, HTML attributes, and scripts;
                reducing the electronic document by i) removing portions of the electronic document related to scripts that do not expose functionality of the electronic document and ii) maintaining the HTML tags, text associated with the HTML tags, HTML, attributes, and scripts that expose functionality of the electronic document;
            creating, based on the reduced electronic document, a plurality of clusters of texts based on a similarity of the HTML tags, the text associated with the HTML tags, and the HTML attributes of each of the plurality of elements;
            labeling, for each cluster of the plurality of clusters, the cluster based on the text associated with the HTML tags of one element of the cluster;
            storing, at a storage device, data indicating the plurality of clusters and the label for each cluster of the plurality of clusters;
            updating, for each cluster of the plurality of clusters, the electronic document crawling model with data indicating the label of the cluster; and
    training, at a second time after the first time, the electronic document crawling model, after being updated, based on a second set of electronic documents differing from the first set of electronic documents.

2. The computer-implemented method of claim 1, wherein analyzing the electronic document further includes, for each element of the plurality of elements, identifying a start HTML tag and an end HTML tag to define the element.

3. The computer-implemented method of claim 2, wherein the text associated with the HTML tags is defined between the start HTML tag and the end HTML tag.

4. The computer-implemented method of claim 1, wherein the HTML attributes include class and identification (ID) associated with the element.

5. The computer-implemented method of claim 1, wherein creating the plurality of clusters of texts further includes creating the clusters of texts based on a cosine similarity between the HTML tags, the text associated with the HTML tags, and the HTML attributes of each of the plurality of elements.

6. The computer-implemented method of claim 1, further including:
    reducing the electronic document by removing portions of the electronic document related to headers, footers, and navigation panes, and scripts that do not expose functionality of the electronic document.

7. The computer-implemented method of claim 1, wherein the plurality of electronic documents are associated with product datasheets.

8. An information handling system comprising a processor having access to memory media storing instructions executable by the processor to perform operations, comprising:
    training, at a first time, an electronic document crawling model based on a first set of electronic documents, including:
        for each electronic document of the first set of electronic documents:
            obtaining the electronic document including obtaining an entirety of HyperText Markup Language (HTML) of the electronic document;
            analyzing a copy of the electronic document, including:
                identifying a plurality of elements of the electronic document, each element of the plurality of elements including HTML tags, text associated with the HTML tags, HTML attributes, and scripts;
                reducing the electronic document by i) removing portions of the electronic document related to scripts that do not expose functionality of the electronic document and ii) maintaining the HTML tags, text associated with the HTML tags, HTML, attributes, and scripts that expose functionality of the electronic document;
            creating, based on the reduced electronic document, a plurality of clusters of texts based on a similarity of the HTML tags, the text associated with the HTML tags, and the HTML attributes of each of the plurality of elements;
            labeling, for each cluster of the plurality of clusters, the cluster based on the text associated with the HTML tags of one element of the cluster;
            storing, at a storage device, data indicating the plurality of clusters and the label for each cluster of the plurality of clusters;
            updating, for each cluster of the plurality of clusters, the electronic document crawling model with data indicating the label of the cluster; and
    training, at a second time after the first time, the electronic document crawling model, after being updated, based on a second set of electronic documents differing from the first set of electronic documents.

9. The information handling system of claim 8, wherein analyzing the electronic document further includes, for each element of the plurality of elements, identifying a start HTML tag and an end HTML tag to define the element.

10. The information handling system of claim 9, wherein the text associated with the HTML tags is defined between the start HTML tag and the end HTML tag.

11. The information handling system of claim 8, wherein the HTML attributes include class and identification (ID) associated with the element.

12. The information handling system of claim 8, wherein creating the plurality of clusters of texts further includes creating the clusters of texts based on a cosine similarity between the HTML tags, the text associated with the HTML tags, and the HTML attributes of each of the plurality of elements.

13. The information handling system of claim 8, the operations further including:
reducing the electronic document by removing portions of the electronic document related to headers, footers, and navigation panes, and scripts that do not expose functionality of the electronic document.

14. The information handling system of claim 8, wherein the plurality of electronic documents are associated with product datasheets.

15. A non-transitory computer-readable medium storing software comprising instructions executable by one or more computers which, upon such execution, cause the one or more computers to perform operations comprising:
training, at a first time, an electronic document crawling model based on a first set of electronic documents, including:
for each electronic document of the first set of electronic documents:
obtaining the electronic document including obtaining an entirety of HyperText Markup Language (HTML) of the electronic document;
analyzing a copy of the electronic document, including:
identifying a plurality of elements of the electronic document, each element of the plurality of elements including HTML tags, text associated with the HTML tags, HTML attributes, and scripts;
reducing the electronic document by i) removing portions of the electronic document related to scripts that do not expose functionality of the electronic document and ii) maintaining the HTML tags, text associated with the HTML tags, HTML, attributes, and scripts that expose functionality of the electronic document;
creating, based on the reduced electronic document, a plurality of clusters of texts based on a similarity of the HTML tags, the text associated with the HTML tags, and the HTML attributes of each of the plurality of elements;
labeling, for each cluster of the plurality of clusters, the cluster based on the text associated with the HTML tags of one element of the cluster;
storing, at a storage device, data indicating the plurality of clusters and the label for each cluster of the plurality of clusters;
updating, for each cluster of the plurality of clusters, the electronic document crawling model with data indicating the label of the cluster; and
training, at a second time after the first time, the electronic document crawling model, after being updated, based on a second set of electronic documents differing from the first set of electronic documents.

16. The transitory computer-readable medium of claim 15, wherein analyzing the electronic document further includes, for each element of the plurality of elements, identifying a start HTML tag and an end HTML tag to define the element.

17. The transitory computer-readable medium of claim 16, wherein the text associated with the HTML tags is defined between the start HTML tag and the end HTML tag.

18. The transitory computer-readable medium of claim 15, wherein the HTML attributes include class and identification (ID) associated with the element.

\* \* \* \* \*